US011101742B2

(12) United States Patent
Vavilpalli et al.

(10) Patent No.: US 11,101,742 B2
(45) Date of Patent: Aug. 24, 2021

(54) BUCK-CHOPPER AND BI-DIRECTIONAL CHOPPER FOR MULTILEVEL CASCADED H-BRIDGE INVERTERS

(71) Applicant: Prince Sultan University, Riyadh (SA)

(72) Inventors: Sridhar Vavilpalli, Riyadh (SA);
Umashankar Subramaniam, Riyadh (SA); Dhafer Jaber Almakhles, Riyadh (SA)

(73) Assignee: Prince Sultan University, Riyadh (SA)

( * ) Notice: Subject to any disclaimer, the term of this patent is extended or adjusted under 35 U.S.C. 154(b) by 57 days.

(21) Appl. No.: 16/733,422

(22) Filed: Jan. 3, 2020

(65) Prior Publication Data

US 2021/0211066 A1 Jul. 8, 2021

(51) Int. Cl.
*H02M 7/5387* (2007.01)
*H02J 7/00* (2006.01)
(Continued)

(52) U.S. Cl.
CPC ......... *H02M 7/53871* (2013.01); *H02J 3/381* (2013.01); *H02J 7/0048* (2020.01);
(Continued)

(58) Field of Classification Search
CPC ..... B66B 1/3423; B66B 11/0226; B66B 7/00; B66B 5/02; B66B 5/0018; B66B 1/302; B66B 1/06; H02M 2007/4835; H02M 3/1584; H02M 7/483; H02M 2001/0025; H02M 3/02; H02M 3/34; H02M 3/10;
(Continued)

(56) References Cited

U.S. PATENT DOCUMENTS

2010/0236612 A1 9/2010 Khajehoddin et al.
2010/0327659 A1 12/2010 Lisi et al.
(Continued)

OTHER PUBLICATIONS

Vavilapalli et al., A Buck-Chopper Based Energy Storage System for the Cascaded H-Bridge Inverters in PV Applications, 2017, pp. 534-541 (Year: 2017).*

(Continued)

*Primary Examiner* — Rexford N Barnie
*Assistant Examiner* — Elim Ortiz
(74) *Attorney, Agent, or Firm* — Oblon, McClelland, Maier & Neustadt, L.L.P.

(57) ABSTRACT

A cascaded H-bridge (CHB) inverter for higher rated power conditioning systems which operates at medium voltages while providing high power quality and low dv/dt. By incorporating battery energy storage, the power conditioning system operates at night to provide power to a load or grid and stabilizes the system during sudden changes in climatic conditions. Various energy storage system (ESS) configurations such as AC side coupled ESS, dual active bridge based ESS, and chopper based ESS configurations for cascaded H-bridge inverters are described. A comparison of these configurations on the basis of cost, control complexity, controller hardware requirements was performed and the advantages of chopper based ESS configurations over other ESS configurations was demonstrated. A control algorithm for the chopper based configurations was developed to operate the system in standalone and grid-connected modes of operation.

14 Claims, 35 Drawing Sheets

(51) Int. Cl.
*H02M 3/158* (2006.01)
*H02M 7/483* (2007.01)
*H02J 3/38* (2006.01)
*H02M 1/08* (2006.01)
*H02M 1/00* (2006.01)

(52) U.S. Cl.
CPC .......... *H02J 7/00712* (2020.01); *H02M 1/08* (2013.01); *H02M 3/158* (2013.01); *H02M 7/483* (2013.01); *H02J 2207/20* (2020.01); *H02J 2300/26* (2020.01); *H02M 1/007* (2021.05)

(58) Field of Classification Search
CPC ...... H02M 3/139; H02M 3/137; H02M 3/005; H02J 7/0068; H02J 7/345; H02J 50/12; H02J 2207/20; H02J 1/12; H02J 3/338; H02J 3/38; H02J 3/388; H02J 3/18; H02J 1/10; H02J 7/00
USPC .......... 307/6, 45, 58, 82, 151; 363/9, 10, 15, 363/34, 35, 37, 38, 65, 77, 108, 109, 124
See application file for complete search history.

(56) References Cited

U.S. PATENT DOCUMENTS

2012/0194003 A1 8/2012 Schmidt et al.
2018/0331625 A1* 11/2018 Somani .................. H02M 1/08

OTHER PUBLICATIONS

Gaurav, et al. ; Energy Management of PV—Battery based Microgrid System ; ScienceDirect Procedia Technology 21 ; pp. 103-111 ; SMART GRID Technologies, Aug. 6-8, 2015 ; 9 Pages.
Vavilpalli, et al. ; A Buck-Chopper Based Energy Storage System for the Cascaded H-Bridge Inverters in PV Applications ; ScienceDirect Energy Procedia 145 ; pp. 534-543 ; 2018 ; 9 Pages.
Chao, et al. ; Design and Implementation of a Bidirectional DC-DC Converter for Stand-Alone Photovoltaic Systems ; International Journal of Computer, Consumer, and Control vol. 2, No. 3 ; 2013 ; 12 Pages.
Tulasi, et al. ; Droop Control of Bi-Directional DC-DC Converter for Improved Voltage Regulation and Load Sharing in DC Microgrid ; International Journal of Intelligent Engineering & Systems ; May 20, 2017 ; 16 Pages.

* cited by examiner (curve 1864)

BUCK-CHOPPER AND BI-DIRECTIONAL CHOPPER FOR MULTILEVEL CASCADED H-BRIDGE INVERTERS

BACKGROUND

Technical Field

The present disclosure is directed to a system and method for controlling energy in an energy storage system including a multilevel cascaded H-bridge inverter connected to arrays of renewable energy power generators. Control of the mode of operation of the multilevel cascaded H-bridge inverter in either standalone or grid-connected configurations is provided.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cascaded H-bridge (CHB) inverter-based solar photovoltaic (PV) power conditioning systems are typically used for high power applications. (See V. Sridhar, S. Umashankar. "A comprehensive review on CHB MLI based PV inverter and feasibility study of CHB MLI based PV-STATCOM". Renewable and Sustainable Energy Reviews 2017; 78:138-156; F. A. Dragonas, G. Nerrati, P. Sanjeevikumar, G. Grandi. "High-Voltage High-Frequency Arbitrary Waveform Multilevel Generator for DBD Plasma Actuators". IEEE Trans. on Industry Applications, vol. 51, no. 4, pp. 3334-3342, July/August 2015; R. Chinthamalla, P. Sanjeevikumar, R. Karampuria, Sachin Jain, Ahmet H. Ertas, Viliam Fedak. "A Solar PV Water Pumping Solution Using a Three-Level Cascaded Inverter Connected Induction Motor Drive". Engineering Science and Technology: An International Journal (JESTECH), Elsevier Journal Publications, vol. 19, no. 4, pp. 1731-1741, December 2016; and P. Sanjeevikumar, Pierluigi Siano, Ahmet H. Ertas, S. Rajasekar, Kiran M. Panday. "Single-Phase Seven-Level Stack Multicell Converter Using Level Shifting SPWM Technique". Conf. Proc. of 16 IEEE Intl. Conf. on Environment and Electrical Engg., (IEEE-EEEIC'16), Florence (Italy), 7-10 Jun. 2016, each incorporated herein by reference in their entirety).

A cascaded H-bridge inverter has the following advantages in large scale systems.

1. Independent MPPT control of PV arrays can be achieved through cascaded H-bridge based PV inverters.
2. Due to the high number of levels in the output voltage of a cascaded H-bridge inverter, good total harmonic distortion (THD) and power quality can be achieved.
3. The system can be extended to higher power levels by incorporating additional H-bridge units.
4. The size of the output filter can be reduced.
5. Manufacturing and maintenance of a cascaded H-bridge inverter are simpler compared to other multi-level inverters as a cascaded H-bridge inverter is modular in structure.

During night hours, a solar power conditioning system is in an idle state as the PV array is not able to generate power. In order to provide a continuous supply of power to the load, incorporation of energy storage is necessary. In such systems, a solar PV array provides power to the grid and the power required for charging the batteries during day time, and the batteries supply power to the grid when irradiation is weak. The battery storage system also improves the dynamic response of the system during sudden changes in climatic conditions. It is also possible to provide the power to local critical loads by operating in standalone mode during grid side faults. Since the system can be made operational for all the time, the utilization factor of the solar power conditioning system can also be improved.

Energy storage systems (ESS) for large scale PV systems based on cascaded H-bridge inverters may have different ESS configurations suitable for PV power conditioning. These ESS configurations can be classified into three different categories: AC coupled ESS, dual active bridge (DAB) based ESS and chopper based ESS configurations.

In AC side coupled ESS configurations, the point of common coupling (PCC) of an AC grid PV array and the battery are connected to the PCC through suitable interfaces. FIG. 1A illustrates an AC coupled energy storage system for a cascaded H-bridge multi-level inverter (MLI) based type of PV inverter. This configuration is suitable for many types of PV power conditioning systems, since the ESS in this configuration is completely independent and isolated from the inverter. When this configuration is used with a cascaded H-bridge based system in which the PCC voltage is usually at a higher level, an additional transformer may be required to match the battery voltage with the voltage at point of common coupling (PCC). A bidirectional AC to DC converter may be used as a battery charger in this configuration. When the power is available from PV array, power is provided to the grid and the battery. When irradiation is weak, the battery provides power to the grid through a bidirectional AC-DC converter. Independent control of the battery charger and the inverter provide adjustability but the AC-DC converter and an extra transformer result in additional cost. Although this system is operational throughout the day to provide power to the grid, the utilization factor of the cascaded H-bridge inverter remains low.

Another ESS configuration with an AC side coupling is a voltage regulator based ESS for cascaded H-bridge inverters presented in Sridhar et al. (See V. Sridhar, S. Umashankar, Sanjeevikumar P, V K Ramachandaramurthy. "Design and Real-Time Simulation of an AC Voltage Regulator Based Battery Charger for Large-Scale PV-Grid Energy Storage Systems". IEEE Access Journal, vol. 5, no. 1, pp. 25158-25170, December 2017, incorporated herein by reference in its entirety). The voltage regulator in this system acts like a series compensator to regulate the voltage at the point of common coupling (PCC). The voltage regulator is an inverter fed from the battery bank. The voltage regulator output is connected to the primary winding of the regulator transformer. The secondary winding is connected in series as shown in FIG. 1B. Based on the voltage regulation required, the voltage rating of the secondary winding and the primary side ratings are determined based on the battery ratings. Battery currents in charging and discharging modes are controlled by regulating the voltage at the PCC. Power consumed/supplied by inverter, grid and the regulator are proportional to their respective voltages as the same current ($I_s$) is flowing through the inverter, the grid and the regulator. As the battery supplies/consumes only active power, the regulator output voltage should maintain a zero or a 180 degree phase shift with the current $I_s$. According to Sridhar et al., the following conditions exist:

i. Regulator output voltage=Grid Voltage−PCC Voltage.
  ii. Magnitude and frequency of the grid voltage are fixed.

iii. If the PCC Voltage is less than grid voltage, regulator output voltage and power are positive. Hence the battery is in the discharging mode of operation.

iv. If the PCC voltage is more than the grid voltage, regulator output voltage and power are negative. Hence battery is in charging mode of operation.

v. Regulator output frequency should be maintained equal to grid frequency.

This configuration helps in improving the PV operating voltage range and for fault tolerant operation of cascaded H-bridge inverter. However, the main disadvantage with this configuration is that the PV inverter and the battery charger cannot be controlled independently in this system. The regulator may introduce harmonics since it acts like a series compensator. Additional transformer requirements may increase the cost of the system. AC side coupled configurations are not suitable for higher rated energy storage systems. The multiple interfaces connected on the AC side may affect the power quality of the overall system.

DC coupled systems such as dual active bridge based energy storage systems or chopper based energy storage systems configuration are more appropriate for large scale energy storage systems and for obtaining better power quality.

In DC coupled ESS configurations, the PV array and the battery are connected to the DC bus through appropriate interfaces. In this system, the DC bus can be a common DC link or multiple isolated DC links of the cascaded H-bridge inverter. FIG. 2A, 2B show a dual active bridge (DAB) based energy storage system configurations for a cascaded H-bridge inverter. In this system, each H-bridge is connected to the battery through an independent DC-DC converter. The DAB based DC-DC converter includes two single phase H-bridges isolated by a high frequency (HF) transformer. DC Terminals of one H-bridge are connected to independent DC links of the cascaded H-bridge inverter and the DC terminals of second H-bridge are connected to a common battery bank as shown in FIG. 2A or to independent battery banks of small capacity as shown in FIG. 2B. The AC terminals of each H-bridge are connected to the primary and secondary windings of HF transformer. The power flow through the DAB converter is controlled through phase shift control. (See Dong-Keun Jeong, H S Kim, J W Baek, Ju-Yong Kim, Hee-Je Kim. "Dual active bridge converter for Energy Storage System in DC microgrid". In: Proceedings of IEEE conference publications. p. 152-156; 2016; S. Dutta, S Hazra, S Bhattacharya. "A Digital Predictive Current-Mode Controller for a Single-Phase High-Frequency Transformer-Isolated Dual-Active Bridge DC-to-DC Converter". IEEE Trans Industrial Electronics 2016; 63(9): 5943-5952; and V. Sridhar, Sanjeevikumar P, S Umashankar, Mihet-Popa Lucian. "Power Balancing Control for Grid Energy Storage System in Photovoltaic Applications-Real Time Digital Simulation Implementation". Energies Journal 2017; 10(7): 928, each incorporated herein by reference in their entirety). Independent power control through a battery charger and the PV inverter is possible with this configuration but the control is complex due to more number of power modules. The cost of the DAB based system is also greater due to more number of components [9]-[13]. (See: Sachin Jain, Ch. Ramulu, P. Sanjeevikumar, Olorunfemi Ojo, Ahmet H. Ertas. "Dual MPPT Algorithm for Dual PV Source Fed Open-End Winding Induction Motor Drive for Pumping Application". Engineering Science and Technology: An International Journal (JESTECH), Elsevier Journal Publications, Vol. 19, No. 4, pp. 1771-1780, December 2016; P. Sanjeevikumar, G. Grandi, Patrick Wheeler, Frede Blaabjerg, J. Loncarski. "A Simple MPPT Algorithm for Novel PV Power Generation system by High Output Voltage DC-DC Boost Converter". Conf. Proc., 24th IEEE International Symposium on Industrial Electronics, IEEE-ISIE'15, Rio de Janeiro (Brazil), pp. 214-220, 3-5 Jun. 2015; T. Anuradha, P. Deiva Sundari, P. Sanjeevikumar, Pierluigi Siano, Zbigniew Leonowicz. "Comparative Analysis of Common MPPT Techniques for Solar PV System with Soft Switched, Interleaved Isolated Converter". IEEE 1st Industrial and Commercial Power System Europe, 17th International Conf. on Environment and Electrical Eng., IEEE-I&CPS/IEEE-EEEIC'17, Jun. 6-9, 2017, Milan (Italy); Neeraj Priyadarshi, P. Sanjeevikumar, Amarjeet Sharma, Lucian Mihet-Popa. "An Experimental Fuzzy SVPWM based Inverter Control Realization of Grid Integrated PV-Wind System with Hybrid FPSO MPPT Using dSPACE DS 1104 Real Time Interface". Energies Journal, MDPI AG Publications, Switzerland, 2017; and S. Saravanan, N. Ramesh Babu, P. Sanjeevikumar. "Comparison and Analysis of DC/DC Converters with MPPT Techniques Based PV System". Lecture Notes in Electrical Engineering, Springer Journal Publications, 2017, each incorporated herein by reference in their entirety). Since each DAB needs eight gate pulses, the controller hardware requirement is greater. To reduce the cost, controller hardware requirements and the control complexity, chopper based energy storage system (ESS) configurations are more appropriate. However, the chopper based ESS configuration for the cascaded H-bridge inverter requires multiple isolated batteries for energy storage.

Accordingly, it is one object of the present disclosure to provide a system and method for controlling energy in a multilevel cascaded H-bridge inverter connected to a plurality of renewable energy power generators, a plurality of DC-DC converters and a plurality of batteries and regulating the mode of operation to either standalone or grid connected. It is a further object to control gate pulses for connecting and disconnecting the inverters to provide power to a grid or a load. An additional object is to control the charging or discharging of the batteries.

SUMMARY

In an exemplary embodiment, an energy control system for multilevel cascaded H-bridge inverters comprises a plurality of cascaded H-bridge inverter blocks, each cascaded H-bridge inverter block including a photovoltaic array, a battery, a DC-DC converter in parallel with the battery, wherein the DC-DC converter is configured to charge the battery. The system further includes a DC link operatively connected between the photovoltaic array and the DC-DC converter and an H-bridge inverter operatively connected to the DC link. A computing system including circuitry and at least one processor are configured to provide control signals to each H-bridge inverter block to regulate a mode of operation of the energy control system. The mode of operation may be a standalone mode or a grid-connected mode. Further, the DC-DC converters may be buck-chopper converters or bi-directional converters.

In another exemplary embodiment, a method for controlling energy in a multilevel cascaded H-bridge inverter connected to a plurality of renewable energy power generators, wherein the renewable energy power generators are any one of a wind generator, a photovoltaic (PV) generator and a wave power generator is described, comprising regulating, by a computing system including circuitry and at least one processor configured for generating control signals, a mode of operation of the energy control system, wherein the mode of operation is one of a standalone mode and a grid-connected mode.

In another exemplary embodiment, a non-transitory computer readable medium having instructions stored therein that, when executed by one or more processors, cause the one or more processors to perform a method for controlling energy in a multilevel cascaded H-bridge inverter connected to a plurality of photovoltaic arrays is described, comprising regulating, by a computing system including circuitry and at least one processor configured for generating control signals, a mode of operation of the energy control system, wherein the mode of operation is one of a standalone mode and a grid-connected mode.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
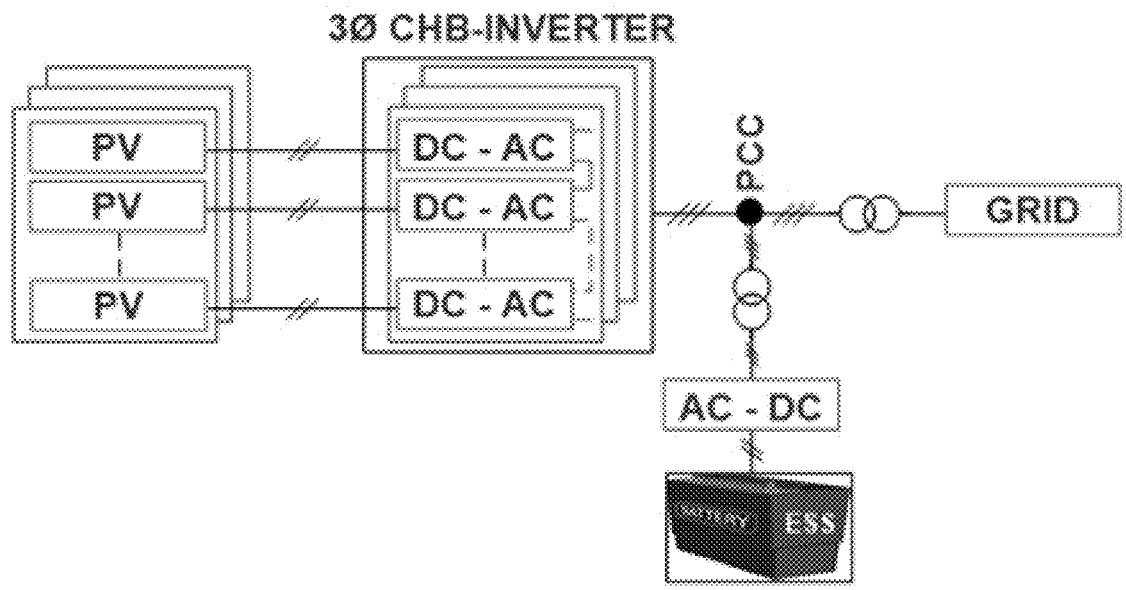
FIGS. 1A-1B are block diagrams of (A) an AC coupled energy storage system, (B) a voltage regulator based ESS for a cascaded H-bridge inverter.
Figure 1B:
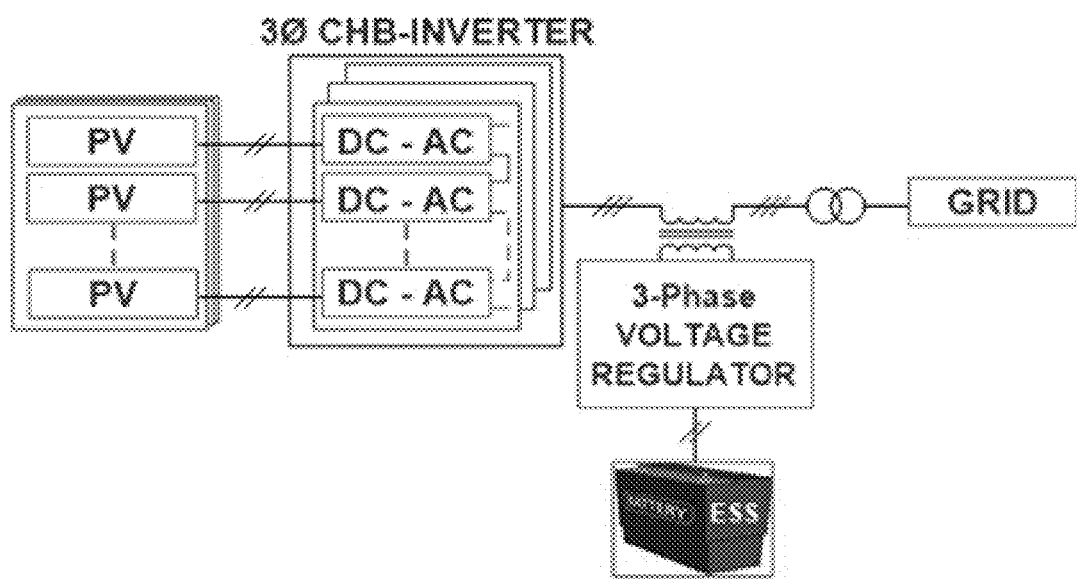
Figure 2A:
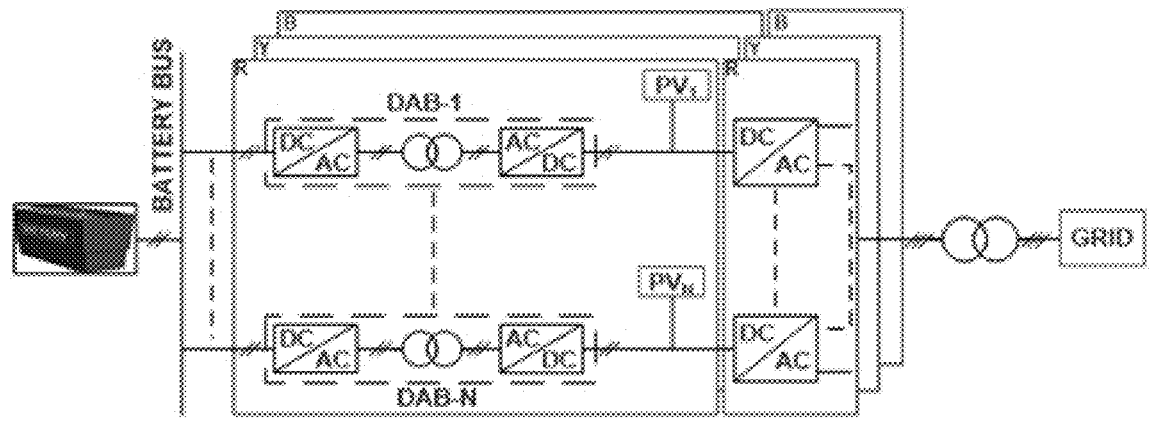
FIGS. 2A-2B illustrate (A) a DAB based ESS with a common battery bank, (B) a DAB based ESS with independent battery banks.
Figure 2B:
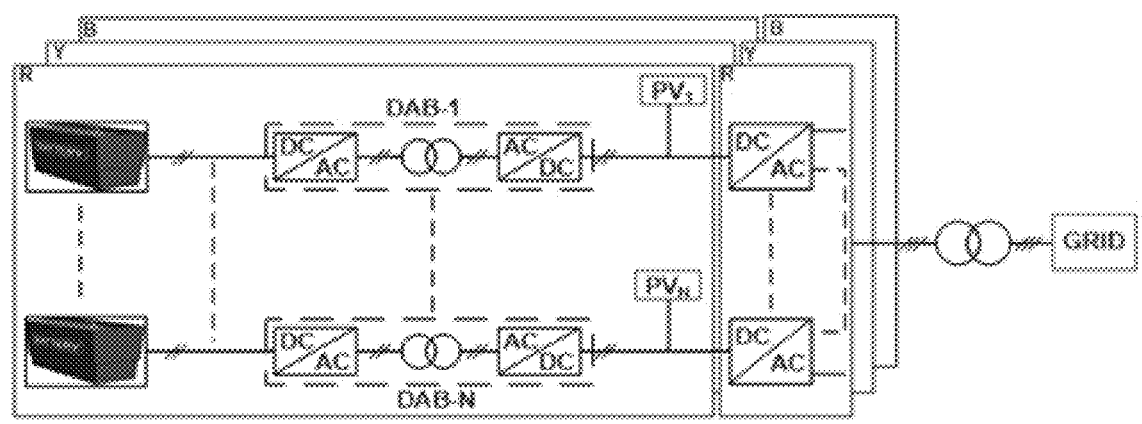

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Renewable energy refers to energy generated from various renewable energy sources of power. Non-limiting examples include, sunlight, wind and water. The renewable energy is an electrical energy produced by a wind generator, a photovoltaic (PV) array generator, a geothermal power generator, a wave power generator, or equivalents thereof. Aspects of the present disclosure are described with respect to a photovoltaic array, but the application of the cascaded multilevel H-bridge inverter control system and methods are not limited to photovoltaic arrays and may be any renewable electrical energy source.

An MPPT converter is part of every renewable energy array and extracts the maximum power from the renewable energy and converts the extracted power into a different level of an output DC power. By way of example, the output of a photovoltaic array varies nonlinearly with the amount of solar radiation and surface temperature, which is the main cause of degradation in power generation efficiency of the solar cell. An MPPT converter operates the photovoltaic array at a maximum power point. The maximum power point varies nonlinearly with the amount of solar radiation and surface temperature. DC power extracted at the maximum power point is converted into a different level of DC power and provided to the DC link.

The DC link temporarily stores the DC voltage supplied from the MPPT converter. The DC link may be a high capacity capacitor, but the present disclosure is not limited thereto. Thus, the DC link removes an alternating current (AC) component from the DC power output from the MPPT converter and stores a stable DC power. The DC link also stabilizes and temporarily stores a DC voltage supplied from a DC-DC converter.

A load may be home or industrial facility using commercial AC voltage. The load receives commercial AC power from the renewable energy source, the battery, or the electric grid.

The battery may be a secondary battery capable of charging and discharging. The battery may be, for example, a lithium-ion (Li-ion) battery, a lithium polymer (Li-poly) battery or equivalents thereof, but aspects of the present invention are not limited thereto. Further, while described as a battery, the battery can be a collection of cells and/or lower capacity batteries interconnected to form a battery array.

Aspects of this disclosure are directed to an energy control system for multilevel cascaded H-bridge inverters, a method for controlling energy in a multilevel cascaded H-bridge inverter connected to a plurality of renewable energy power generators, wherein the renewable energy power generators are any one of a wind generator, a photovoltaic (PV) generator and a wave power generator and a non-transitory computer readable medium having instructions stored therein that, when executed by one or more processor, cause the one or more processors to perform a method for method for controlling energy in a multilevel cascaded H-bridge inverter.

Figure 3A:
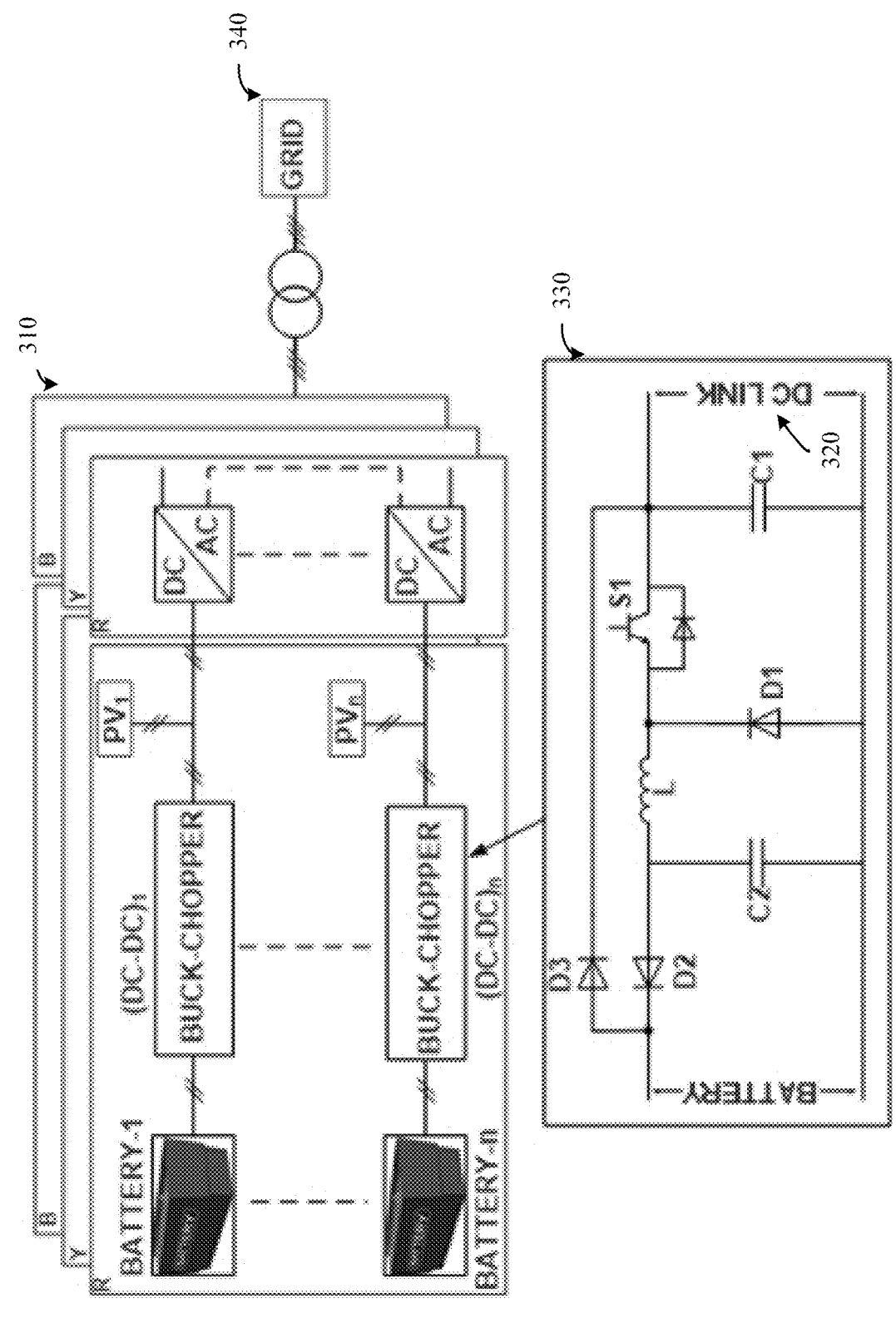
FIG. 3A illustrates a unidirectional buck-chopper based ESS for cascaded H-bridge connected to PV arrays.

A buck-chopper based ESS configuration 300 for a cascaded H-bridge inverter 310 which reduces cost and control complexity is shown in FIG. 3A. In this system, each H-bridge of the cascaded H-bridge inverter 310 is fed by an independent PV array ($PV_1$-$PV_n$) and is also connected to a battery ($Battery_1$-$Battery_n$) through the independent buck-chopper based DC-DC converter 330 ($(DC-DC)_1$-$(DC-DC)_n$). In the dual active bridge based system, a common battery bank may be used. But in the buck-chopper based ESS configuration, a common battery bank cannot be used as there is no isolation transformer in the DC-DC converter and a cascaded H-bridge requires isolated DC links. This configuration includes independent power control through the battery charger and the PV inverter.

Maximum battery voltage should always be less than the minimum operating PV voltage in this system. The PV voltage is stepped down (not shown) to match the battery voltage during the charging operation. Inset 330 illustrates the circuit details of a single buck-chopper inverter. When irradiation is weak, PV voltage is less than the battery voltage, therefore diode $D_3$ starts conducting and the battery provides power to the DC link 320 through diode $D_3$. Since the buck chopper operates only during charging mode, the battery charger and filter inductor, L, must be rated for the battery charging current which is usually less than the battery rated current. Diode $D_3$ should also be rated for the maximum battery current in order to handle the discharging mode current. Since each battery charger requires only one gate pulse, the controller hardware requirement is also reduced. Hence the cost and the control complexity of this system are reduced. The changeover from PV source to the battery source is instantaneous, hence the dynamic response of the system is very good during sudden changes in the irradiance on the PV array or during partial shading.

Figure 4A:
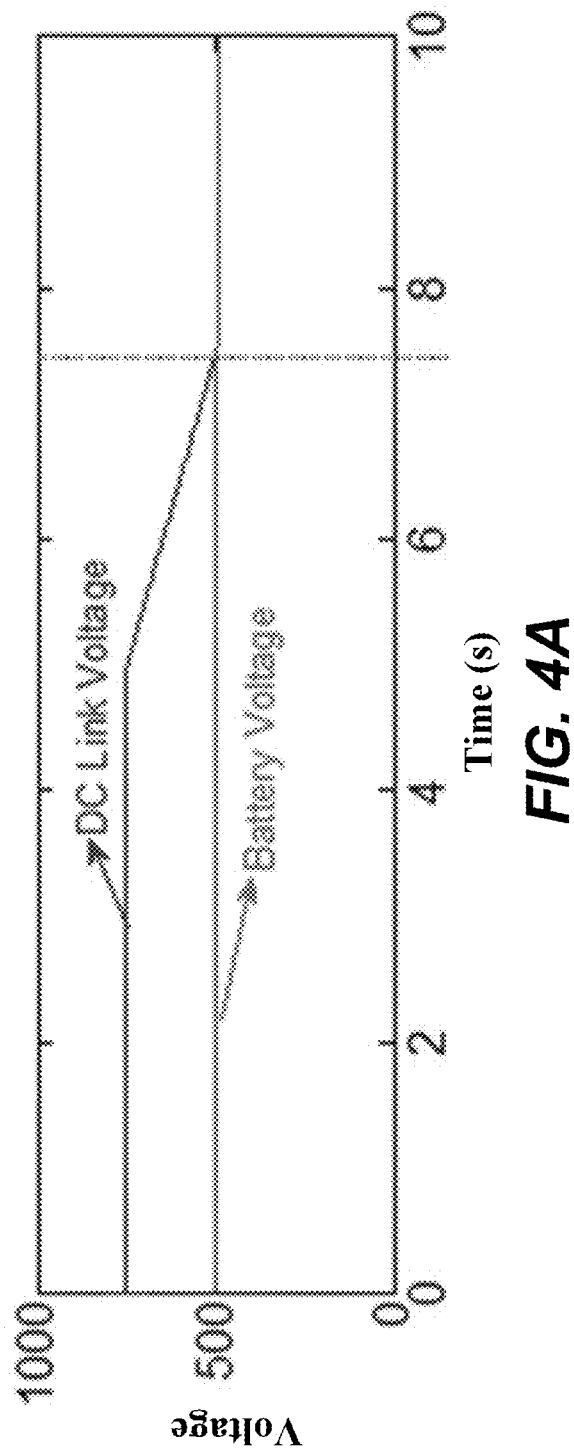
FIG. 4A-4B illustrate (A) the voltage and (B) the current waveforms of battery in a buck-chopper based battery charger.
Figure 4B:
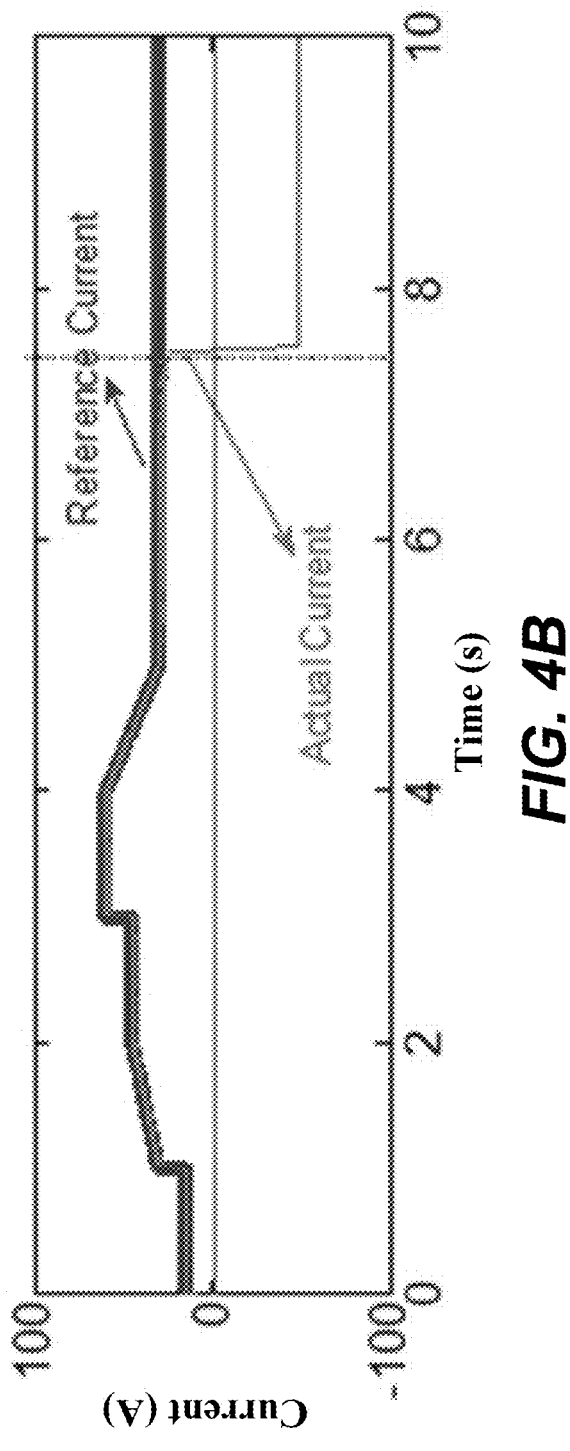

Current control is used when charging the battery through the buck-chopper based battery charger and there is no control over the battery discharge current. When the PV voltage is less than or equal to the battery voltage, the battery is in discharge mode and starts discharging through diode $D_3$ shown in FIG. 3A. A buck-chopper with current control was simulated to validate the steady state and transient response as shown in FIGS. 4A and 4B. FIG. 4A shows the DC link 320 voltage and battery voltage versus time. FIG. 4B illustrates the variation in the reference and actual currents at different time intervals It can be observed that the system achieved good transient and steady state response. When the DC source voltage was below the battery voltage, the battery charging controls were disabled and the battery started discharging to meet the load requirement. As shown in FIG. 3A, each buck-chopper converter 330 is connected to a DC/AC inverter 310 to provide three phase current (R, Y, B) to a grid 340.

The main drawback in buck-chopper based ESS configurations is that the battery starts discharging only when the PV voltage becomes less than the battery voltage, i.e. when the irradiation is weak. In a grid connected mode, the battery cannot supply power to the grid even when the local load requirement is greater than the available PV power, since the PV array operates at its maximum power point (MPP) voltage which is greater than the battery voltage. In this situation, the power required for the local load must be taken from the grid. However, in order to meet the load requirements in a standalone mode, the battery must provide power along with the PV source to supply the local critical load requirement in the absence of the grid. In this situation, the PV array cannot be operated at its MPP voltage but instead operates at the battery voltage level. Thus, the buck-chopper based system is more appropriate for grid-connected systems. For standalone PV systems, it is necessary to have control during the discharge mode of operation also. This control is possible by using a bi-directional chopper based ESS.

Figure 3B:
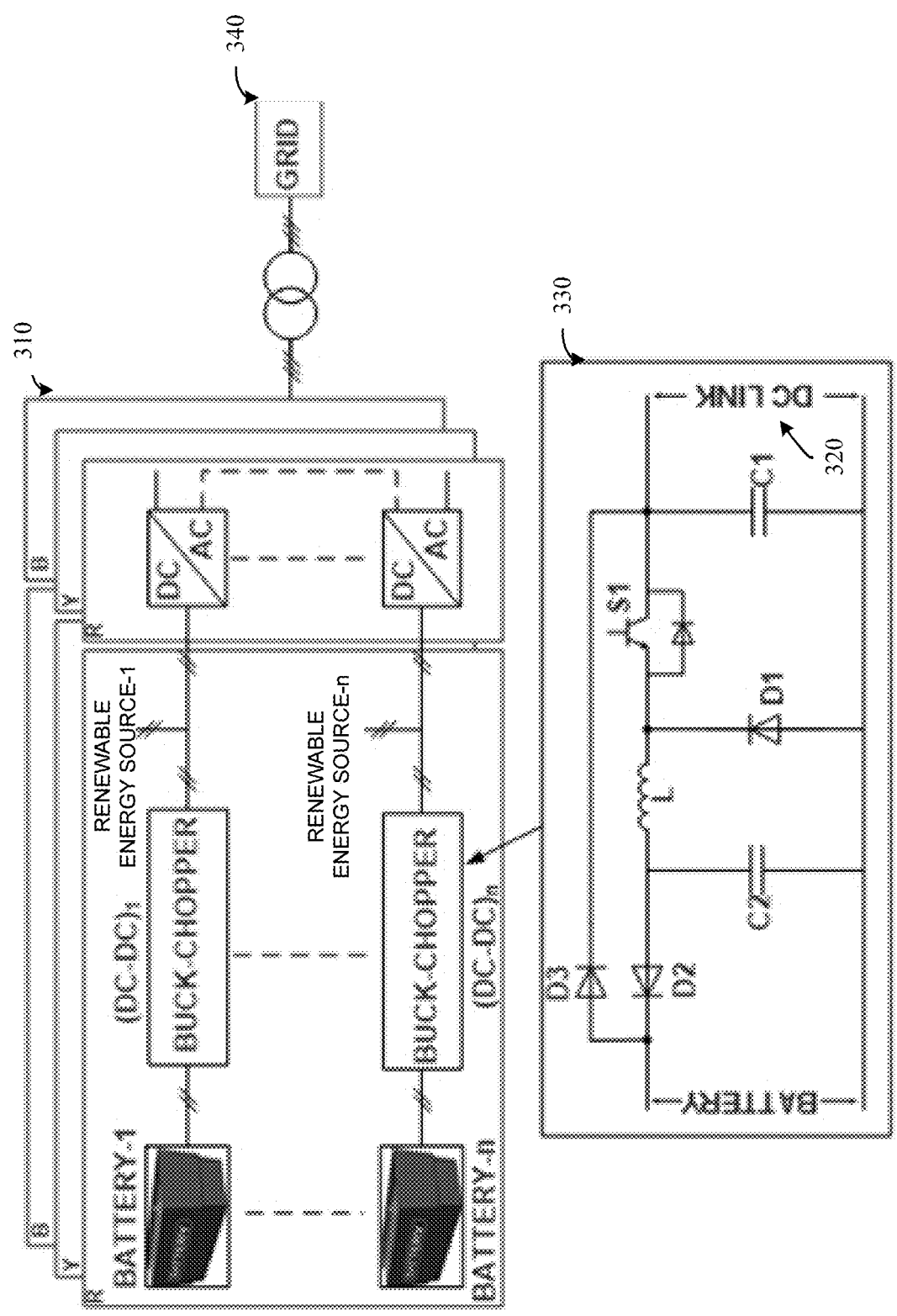
FIG. 3B illustrates a unidirectional buck-chopper based ESS for cascaded H-bridge connected to renewable energy sources.

FIG. 3B shows the system of FIG. 3A may be connected to a plurality of renewable energy power generators, wherein the renewable energy power generators are any one of a wind generator, a photovoltaic (PV) generator and a wave power generator. All electronic circuits and algorithms of the present disclosure may equally be applied to the use of renewable energy power generators as the energy source.

Figure 5A:
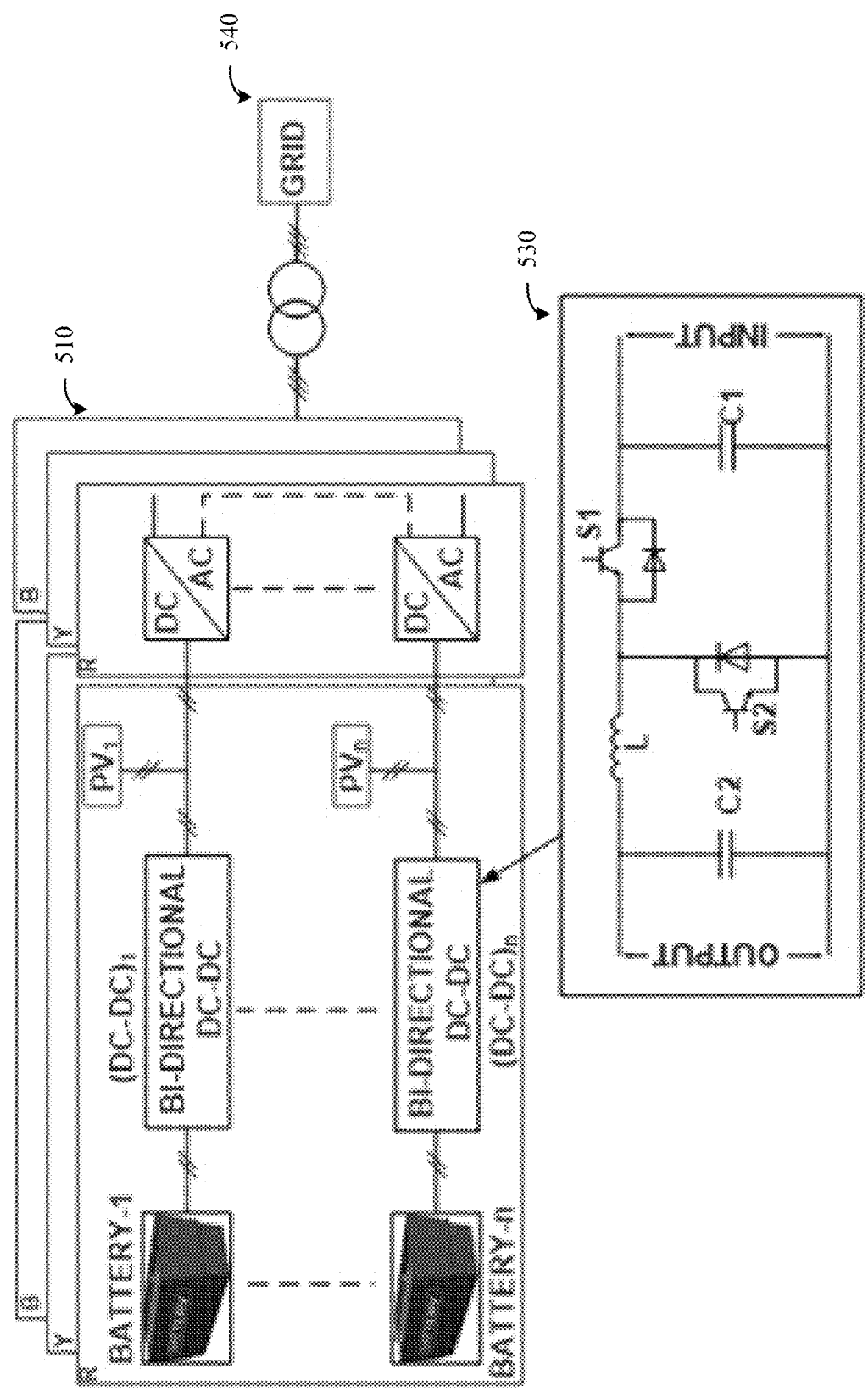
FIG. 5A illustrates a bi-directional chopper based ESS for cascaded H-bridge.

FIG. 5A shows a bidirectional chopper based ESS configuration 500 for a cascaded H-bridge inverter 510 and the block diagram of each bidirectional DC-DC converter 530 (shown in inset).

A bidirectional chopper converter of each block converts the DC power provided by the DC link into commercial AC power and outputs the commercial AC power. More specifically, the bidirectional inverter converts a DC voltage from the renewable energy or the battery into commercial AC power suited for home use. The inverter is also bidirectional and is capable of converting commercial AC power provided by the electric power system into DC power and feeding the DC power into the DC link. The power stored in the DC link is provided to the battery through the plurality of bidirectional converters.

The plurality of bidirectional chopper converters are connected in parallel to the plurality of batteries, respectively. During discharging of the plurality of batteries, the plurality of DC-DC converters convert DC power from each of the plurality of batteries into a different level of DC power and then provide the converted power to the plurality of DC links. During charging of the plurality of batteries, the plurality of bidirectional converters convert DC power from each of the plurality of DC links into a different level of DC power and then provide the converted power to each of the plurality of batteries.

A plurality of DC links are connected in parallel to the plurality of bidirectional chopper converters. During discharging of the plurality of batteries, the plurality of DC links store DC power provided by the plurality of bidirectional converters. During charging of the plurality of batteries, the plurality of DC links store DC power provided from the plurality of bidirectional inverters.

Figure 5B:
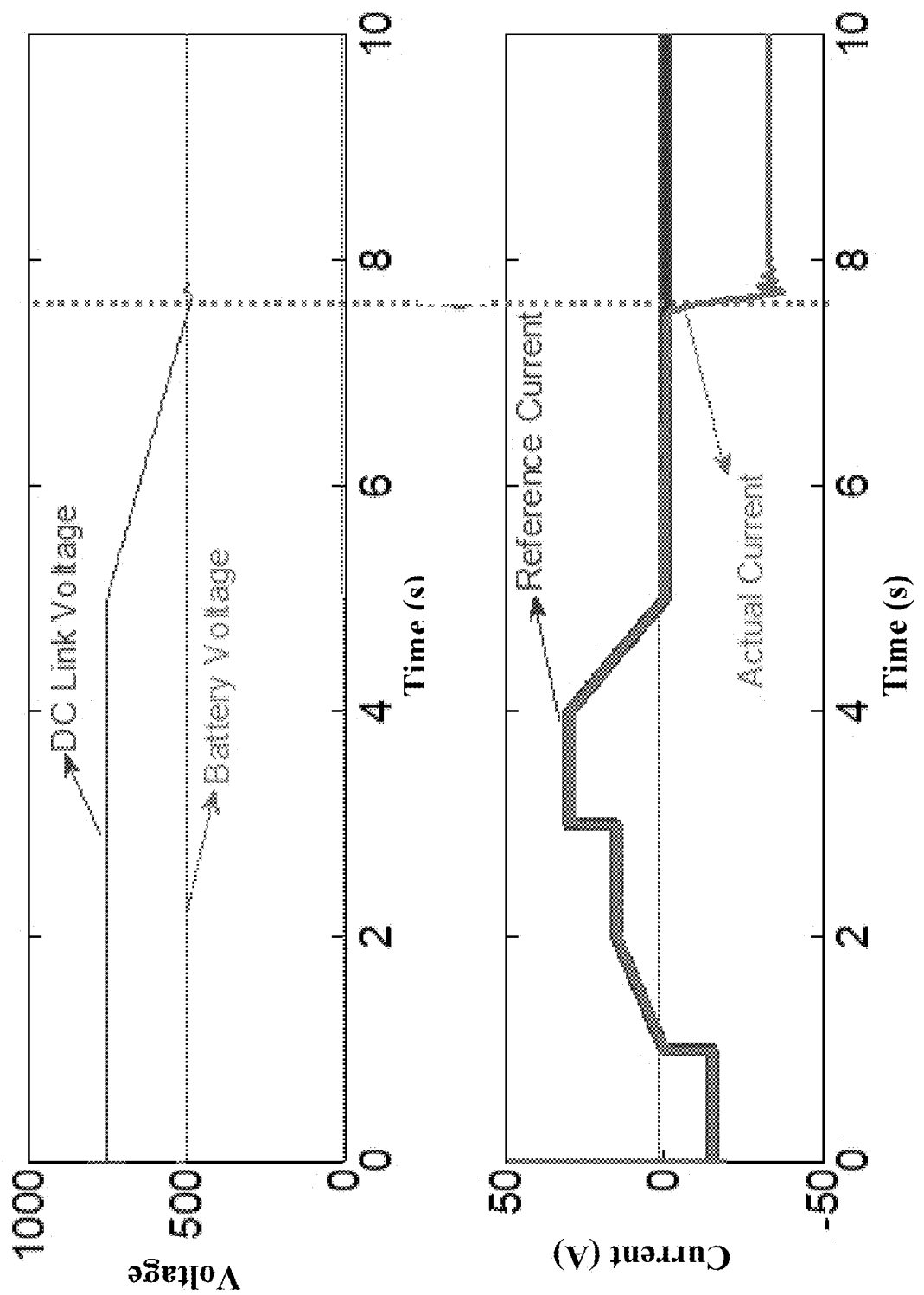
FIG. 5B illustrates the voltage and current waveforms of a battery in a bi-directional chopper based battery charger.

Similar to a buck-chopper based ESS system, a common battery bank cannot be used in the configuration of FIG. 5A as there is no isolation transformer in the DC-DC converter. In this system, each H-bridge of the cascaded H-bridge inverter 510 is fed by an independent PV array ($PV_1$-$PV_n$) and also connected to a battery ($Battery_1$-$Battery_n$) through an independent DC-DC converter 530 (($DC-DC)_1$-($DC-DC)_n$). Unlike the buck-chopper based system, the battery voltage may also be greater than the DC link voltage in this configuration. When the battery voltage is less than the DC link voltage, the input terminals of the DC-DC converter are connected to independent DC links of the cascaded H-bridge inverter and the output terminals of DC-DC converter are connected to independent battery banks of small capacity. When the battery voltage is more than the DC link voltage, the input terminals are connected to the battery and output terminal is connected to the DC link. This DC-DC converter requires two gate pulses (see inputs of $S_1$ and $S_2$) whereas the buck-chopper based system needs only one gate pulse. The cost of the bidirectional chopper based system is lower than the DAB based system but slightly more than the buck-chopper based system, since the battery charger is required to be rated for the full battery current. As shown in FIG. 5A, each buck-chopper converter 530 is connected to a DC/AC inverter 510 to provide three phase current (R, Y, B) to a grid 540. With this configuration, the PV source can be operated at its MPP voltage in both grid-connected and standalone modes of operations. A bi-directional chopper system with the battery voltage lower than DC link voltage was as shown in FIG. 5B. Current control is adopted and the reference current is varied at different time intervals. From the results shown in FIG. 5B, it may be observed that the battery current in discharging mode can also be controlled with this configuration. Similar to a buck-chopper, when the DC source voltage is below the battery voltage then the battery charging control is disabled and the battery discharged through inductor, L, and the diode across IGBT $S_1$ shown in FIG. 5A.

A comparison of energy storage system configurations for cascaded H-bridge inverters is summarized below.

1. AC side coupled ESS is the simplest ESS configuration. Control of this system is simple compared to any other configuration and the controller hardware requirement is also less. But this configuration is not appropriate for very high power applications and additional transformer requirement may increase the cost.

2. Voltage regulator based ESS improves the operating voltage range of PV. Fault tolerant operation of cascaded H-bridge is also possible with this configuration. Control of the system is simple and the controller hardware requirement is reduced. However, the voltage regulator may introduce additional voltage harmonics to the system, which is not appropriate for high power applications. An additional boosting transformer requirement may increase the cost and size of the system. Independent control of battery charger and PV-inverter is not possible with this configuration.

3. Dual active bridge based ESS is a DC coupled system. This configuration can be used with a single Battery bank or with independent battery banks of smaller capacities. Independent control of battery charger and PV-inverter is possible with this configuration. But due to the higher number of components in DAB, cost of the system is more. Controller hardware requirement is also more compared to any other configuration due to higher number of IGBT switches.

4. For systems having a single battery bank, AC coupled ESS, voltage regulator based ESS or the DAB based ESS configurations are more appropriate. If multiple independent battery banks are available, then the chopper based configurations are more appropriate.

5. Bi-direction chopper based ESS and the buck-chopper based ESS configurations are most suited to high power applications. These configurations require independent battery banks due to non-isolated DC-DC converters. Controller hardware requirement is also less compared to DAB based systems.

6. Buck-Chopper based systems are mainly needed for night time operation when the PV array loses its capability of generation. During this time battery is directly connected to the DC-link. This system improves the utilization factor of the PV inverter and improves the dynamics of the system during sudden changes in irradiance or during partial shading on PV arrays.

7. Buck-chopper based systems are better suited to grid connected systems. As long as PV is active, the system operates at the MPP of the PV array to transfer power to the grid and the battery will be in charging mode. When the irradiation is weak, battery transfers power to the grid.

8. To meet the load requirement in a standalone buck-chopper based system, the battery may need to provide power to the load along with PV when the power requirement is greater. In this case the PV may not be operated at its MPP.

9. In a bi-directional DC-DC converter based system, power can be extracted from both the battery and the PV when required. When there is a power requirement greater than the PV capacity, the battery can feed the additional power required for the load. Hence this configuration is also appropriate for standalone systems and the system always operates at the MPP of the PV array.

9. The bi-directional DC-DC converter requires two gate pulses from a controller whereas the buck-chopper needs only one gate pulse.

10. A bi-directional DC-DC converter must be designed for rated battery power whereas the buck-chopper based system only needs to be designed for the rated charging current of the battery. Therefore, the cost of the buck-chopper based system is comparatively lower. 11. A bi-directional DC-DC converter needs to be controlled both in charging and discharging modes of operation whereas the buck-chopper control is required only during charging mode as discharging is through diode $D_3$.

12. A buck-chopper based system is more appropriate for grid-connected operations whereas the bi-directional chopper based system is appropriate for both grid-connected and standalone modes of operation.

A comparison between various ESS configurations is listed in Table 1.

TABLE 1

Comparison of Different ESS Configurations appropriate for cascaded H-bridge inverter.

| Parameter | Voltage Regulator Based ESS | DAB based ESS | Bi-directional Chopper based ESS | Buck-Chopper based ESS |
|---|---|---|---|---|
| Requirement of Independent DC Sources | Not required | Not Required | Required | Required |
| Isolation between PV and Battery | Isolated | Isolated | Not Isolated | Not Isolated |
| Components required for ESS | Isolation Transformer and Voltage Regulator | Independent DAB with HF Transformers | Independent DC-DC Converter | Independent DC-DC Converter |
| Rated Current of Charger | Equal to Battery Current | Equal to Battery Current | Equal to Battery Current | Equal to Battery Charging Current |
| Cost | More due to Additional Transformer | More due to more number of components | Comparatively less | Comparatively less |
| Control Complexity | Moderate | Complex | Moderate | Moderate |
| Controller Hardware Requirement | Less | More | Moderate | Moderate |
| Advantages | Improves operating range of PV Voltage Fault tolerant operation of cascaded H-bridge can be achieved | Can be operated with independent DC sources and a common DC Source. | Suitable for Grid connected and Standalone modes of operation. | No control is required during discharging mode. Improves the dynamic response of the system for sudden changes in climatic conditions. |
| Limitations | Not appropriate for High power Applications. May introduce additional Harmonics | Controller hardware requirement is more | Independent DC sources are required | Not Preferable for Standalone system |

Figure 6:
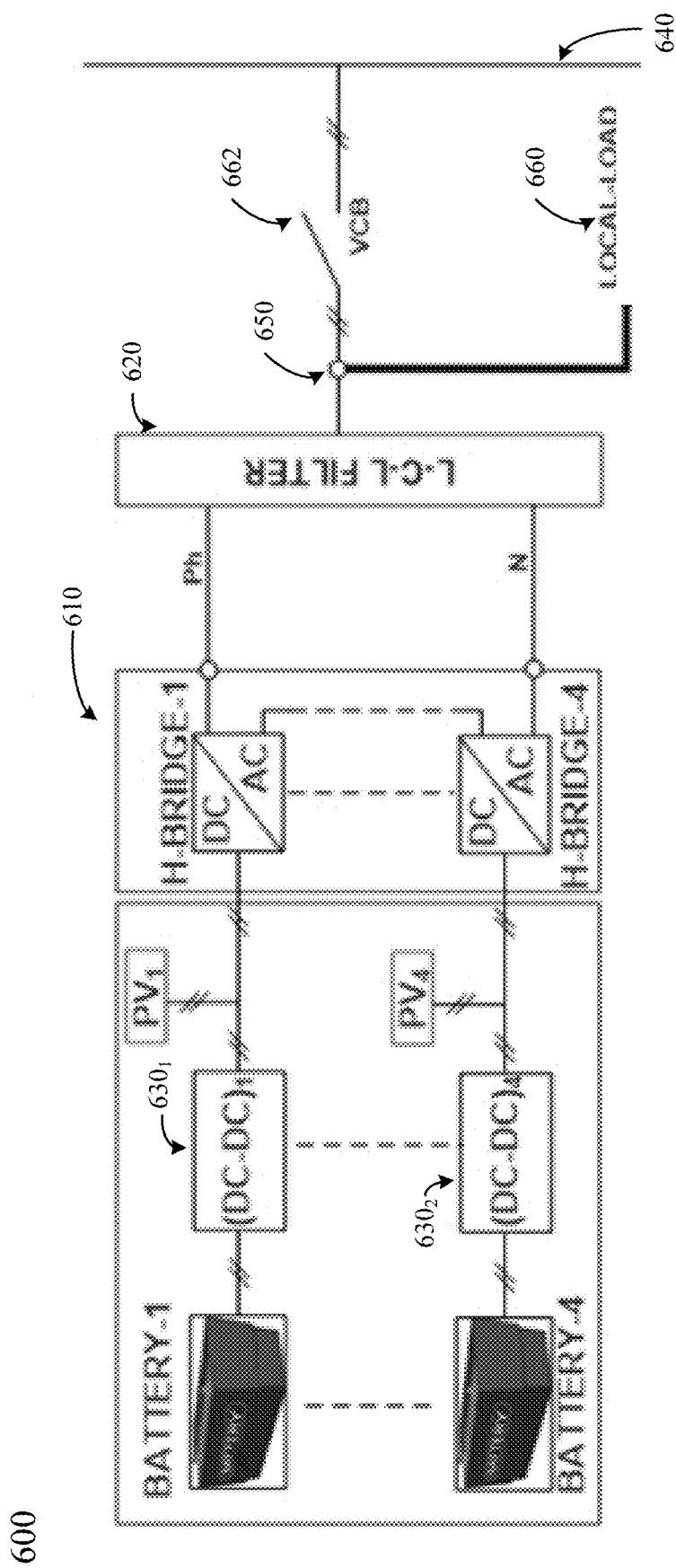
FIG. 6 illustrates the energy storage system for a cascaded H-bridge based PV inverter for grid connected and standalone systems.

From the above, it is observed that Buck-Chopper based ESS and bi-directional chopper based ESS configurations are more appropriate for cascaded H-bridge based PV power conditioning systems when independent batteries are available. Design, operation and control of the both these topologies during grid connected mode and standalone mode are described and compared below. A non-limiting example is illustrated in FIG. 6, which is used to describe the design calculations, procedure for the selection of components, operation of the system at various operating points, the operations during grid connected and standalone modes. FIG. 6 shows an example of an energy storage system for CHB based PV inverter single phase system with four inverters (H-bridge$_1$-H-bridge$_4$) and with power and current ratings. The system of FIG. 6 may be either a grid connected or a stand-alone system (note switch 662). A single phase CHB inverter 610 is connected to an LCL filter 620. The point of common coupling 620 (PCC) is the point at which the inverter is connected to a local load 66 and the grid 640. The grid 640 is a 1.25 kV, 50 Hz, single phase grid. The power requirements are: PV power to the grid of 250 kWp, local critical load of 100 kW, battery back-up power of 100 kW and battery back-up time of 8 hours.

Design calculations and selection of components for the PV Array, the cascaded H-bridge inverter, the batteries, the battery charger, the filters etc. are described below.

The procedure for the selection of the cascaded H-bridge inverter and AC side LCL filter components is shown in Table 2. To meet the power requirement of the local load and the power to be transferred to the grid, the minimum power rating of cascaded H-bridge inverter required is 350 kW. In the non-limiting example of FIG. 6, four H-bridge modules are used, thus the number of levels on the output PWM voltage is nine. The voltage and the power ratings of each H-bridge are ¼th of cascaded H-bridge ratings and the current rating is equal to the rated inverter output current, i.e. 280 amperes. The minimum DC link voltage required for each H-bridge is calculated based on the AC voltage output of each H-bridge. In this work, level shifted pulse width modulation technique is adopted with a carrier frequency of 1 kHz. An LCL filter 620 is used at the AC terminals of cascaded H-bridge inverter for obtaining better voltage and current total harmonic distortions (THD).

TABLE 2

Design calculations for CHB Inverter and LCL Filter

| Electrical parameter | Value | Units | Remarks |
|---|---|---|---|
| CHB inverter Power rating ($P_{CHB}$) | 350 | kW | Grid + Local Load |
| Inverter Phase Voltage | 1250 | V | Vac |
| Number of H-bridges selected | 4 | No's | $N_H$ |
| Power Rating of each H-bridge | 87.5 | kW | CHB Rating/$N_H$ |
| AC Output voltage of H-bridge | 312.5 | V | $V_H$ = Vac/$N_H$ |
| AC Output Current (Iac) | 280 | A | $P_{CHB}$/Vac |

TABLE 2-continued

Design calculations for CHB Inverter and LCL Filter

| Electrical parameter | Value | Units | Remarks |
|---|---|---|---|
| Minimum DC Link Voltage | 422 | V | 1.35 X $V_H$ |
| Carrier Frequency (Fcr) selected | 1 | kHz | |
| Switching Frequency of CHB Inverter (Fsw) | 8 | kHZ | 2 X $N_H$X Fcr |
| Corner Frequency (Fc) of the Filter selected | 2 | kHZ | Fsw/4 |
| L-C-L Filter Component Selection | | | |
| Maximum % Reactive Power Allowed | 5 | % | Max reactive power of Filter Capacitor |
| Maximum Filter Voltage Drop | 3 | % | Max voltage drop across filter inductors |
| Maximum Reactive Power (Qc) | 17.5 | kW | 5% of 350 kW |
| Current Rating of capacitor (Ic) | 14 | A | Qc/Grid Voltage |
| Maximum Capacitance of Filter Capacitor | 35.67 | uF | Ic/(2 X pi X F X Grid Voltage) |
| Capacitance of Filter Capacitor selected | 30 | uF | |
| Inductance of Filter Inductor L1 | 211 | uH | From Fc = 1/[2 X pi x √(LC)] |
| % Voltage drop in L1 | 1.49 | % | (Iac X 2 X pi X F X L1)/Grid Voltage |
| Maximum Drop allowed in L2 | 1.51 | % | Max % voltage drop - % drop across L1 |
| Filter Inductance L2 | 215 | uH | |

In this system, minimum battery backup power is selected as 100 kW so that the critical load requirement can be met during standalone mode of operation also. As discussed above in a buck-chopper based system, the battery voltage should always be less than the nominal voltage of PV array, whereas in a bi-directional chopper based system, battery voltage can be more than the PV Voltage. However, in this example, the battery is selected so that the maximum battery voltage is always less than the nominal PV voltage, which is appropriate for both types of chopper based ESS configurations. The battery is a lithium-ion battery. The minimum battery voltage of about 87% of the nominal battery voltage was determined based on the minimum DC link voltage required for each H-bridge. The procedure for obtaining the ampere-hour rating of battery is shown in Table 3. After selecting the battery, the PV array is selected by considering that the nominal PV voltage must always be more than maximum battery voltage. Open circuit voltage and short circuit currents of PV module were obtained from the PV array datasheet. Ten series PV modules were selected by considering the minimum MPP voltage of PV array at the maximum operating temperature range, i.e. at 75° C. The procedure for the selection of PV array is also shown in Table 3.

TABLE 3

Selection of Battery and PV Sources

| Electrical parameter | Value | Units | Remarks |
|---|---|---|---|
| Battery Ratings | | | |
| Battery Backup Power | 100 | kW | Equal to Critical load |
| Battery Back Up Time (T) | 8 | Hour | |
| Number of Battery Banks (Nb) | 4 | No's | Equal to Number of H-bridges |

TABLE 3-continued

Selection of Battery and PV Sources

| Electrical parameter | Value | Units | Remarks |
|---|---|---|---|
| Power rating of each Battery Bank (Pnom) | 25 | kW | Total Power/Nb |
| Type of Battery Selected | | | Lithium-Ion |
| Minimum Battery Voltage (Vmin) | 422 | V | Equal to minimum DC link voltage |
| Nominal Battery Voltage (Vnom) | 482 | V | In Li-Ion Battery Vmin = 87.5% of Vnom |
| Maximum Battery Voltage (Vmax) | 560 | V | Vmax = 116% of Vnom |
| Nominal Battery Current (Inom) | 52 | A | Pnom/Vnom |
| Ah Rating of each Battery | 416 | AH | Inom X T |
| PV Array Ratings | | | |
| Total PV Array Power Rating | 450 | kW | Grid + Local Load + Battery Power |
| No of isolated PV Arrays | 4 | No's | Equal to Number of H-bridges |
| Power Rating of Each PV Array | 112.5 | kW | Total Power/No. of PV arrays |
| Minimum PV Voltage required | 560 | V | More than maximum Battery voltage |
| Selected PV Module | | | M/s Sunpower make SPR-435NE-WHT-D |
| PV Module power rating (Pmodule) | 435 | W | From Datasheet |
| Short circuit current of PV array | 6.43 | A | From Datasheet |
| Open circuit voltage of PV array | 85.6 | V | From Datasheet |
| MPP voltage of PV array (Vmpp_25) | 72.9 | V | From Datasheet |
| MPP Voltage at 75° C. (Vmpp_75) | 61.2 | V | From Datasheet |
| No of series PV modules selected (Nse) | 10 | No's | For each PV Array |
| No of Parallel PV modules selected (Np) | 26 | No's | For each PV Array |
| Nominal PV Voltage (Vnom_PV) | 729 | V | Vmpp_25 X Nse |
| Minimum MPP Voltage at operating range | 612 | V | Vmpp_75 X Nse |
| Maximum PV Current (Imax_PV) | 167 | A | Isc X Np |
| Maximum Power rating of each PV Array | 113 | kW | Nse X Np X Pmodule |

The input source of the battery charger is a PV array and the output terminals are connected to the battery. In the buck-chopper based system, the battery charger 660 rating is determined based on charging current which is obtained from the charging time. Ratings of bi-directional chopper based battery chargers are obtained from the maximum of the battery charging and discharging currents. In the present disclosure, the battery charging and discharging times were selected to be equal, to maintain equal ratings for buck-chopper and bi-directional chopper based battery chargers, in order to make comparisons of the equal rated battery chargers. A switching frequency of 5 kHz is selected for the IGBT based battery chargers. An LC filter is used on the output side of the chopper as shown in FIG. 5A. Since the ratings for both the types of battery chargers are same, the LC filter parameters are also the same. Design calculations for filter inductance and capacitance are shown in Table 4.

TABLE 4

Design Calculations for Battery Charger

| Electrical parameter | Value | Units | Remarks |
|---|---|---|---|
| Selected Battery Ratings | | | |
| Ampere Hour Rating of each Battery | 416 | AH | $I_{nom}$ times T |
| Battery Back Up Time (Tb) | 8 | Hour | |
| Charging Time (Tch) | 8 | Hour | |
| Nominal Battery Voltage ($V_{nom}$) | 482 | V | |
| Battery Charging Current ($I_{ch}$) | 52 | A | AH Rating/Time $T_{ch}$ |
| Battery discharging Current ($I_{disc}$) | 52 | A | AH Rating/Time $T_b$ |
| Battery Charger Ratings | | | |
| Power Rating of Buck Chopper | 25 | kW | $V_{nom}$ times $I_{ch}$ |
| Power rating of Bi-directional chopper | 25 | kW | Vnom times Maximum of ($I_{ch}$ and $I_{disc}$) |
| Input Side Nominal voltage ($V_{in\_}$dc) | 856 | V | PV Open circuit Voltage |
| Minimum Output Voltage ($V_{out\_}$dc) | 422 | V | Minimum Battery Voltage |
| L-C Filter Design for Chopper | | | |
| Minimum Duty cycle (D) | 0.49 | | $V_{out\_}$dc/$V_{in\_}$dc |
| Switching Frequency selected ($F_{sw\_}$brc) | 5 | kHz | |
| Maximum Off time of Chopper ($T_{off}$) | 101 | us | Calculated from D and $F_{sw\_}$brc |
| Ripple Current Allowed ($d_i$) | 2.5 | A | 5% of Rated Current is selected |
| Inductance of Filter inductor | 16 | mH | L = Vout_dc * $T_{off}$/di |
| Ripple voltage allowed (dv) | 24 | V | 5% of Rated output voltage |
| Capacitance of Filter Capacitor C | 270 | uF | C = (dv/Toff)/Output Current |

Figure 7:
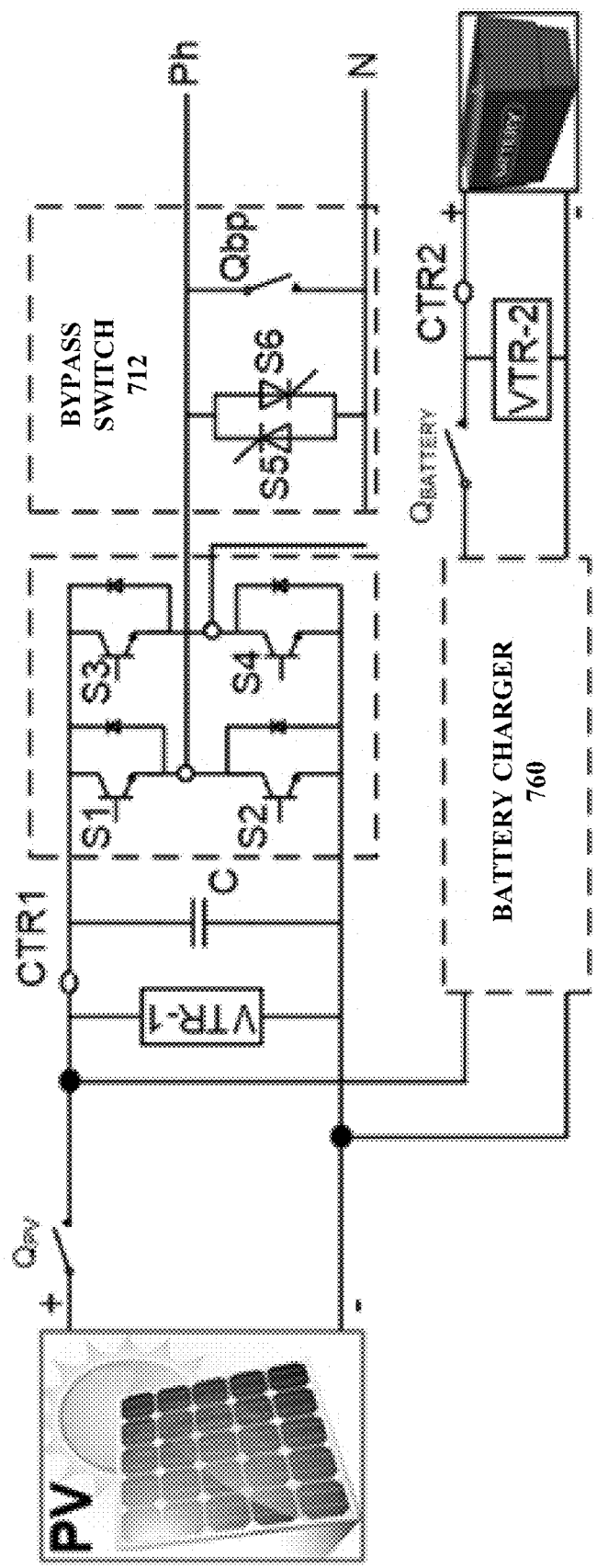
FIG. 7 is a block diagram of a basic building block.

Based on Table 4, a basic building block was developed which is connected across three power sources, i.e. one PV array, one battery, and the grid as shown in FIG. 7. Each building block consists of DC terminals for the PV array connection, DC terminals for battery connections, and terminals for the AC side. Referring to FIG. 7, VTR-1 is the voltage transducer to measure the DC link voltage of each module and VTR-2 is the voltage transducer to measure the battery voltage.

VTR-1 is connected across DC link 320 of module 330 in FIG. 3A and FIG. 3B. VTR-2 is connected across the battery terminals of module 330 in FIG. 3A and FIG. 3B. Similarly, VTR-1 and VTR-2 are connected across the INPUT and OUTPUT terminals of module 530 in FIG. 5A. A bypass switch module 712 consisting of anti-parallel thyristors $S_5$ and $S_6$ and a bypass contactor $Q_{bp}$ is used along with the H-bridge to bypass the H-bridge during fault conditions, so that the system can continue to be operated at a reduced power rating. The battery charger 660 may be a buck-chopper based battery charger as shown in FIG. 3A or a bi-directional chopper based battery charger shown in FIG. 5A. Four such building blocks are used to meet the specifications of Tables 2, 3 and 4 and as shown in FIG. 6.

Design calculations and selection of components for the system shown in FIG. 6 have been presented in detail. Associated controls for the PV inverter, battery chargers in grid-connected and standalone modes of operation are explained below.

Figure 8:
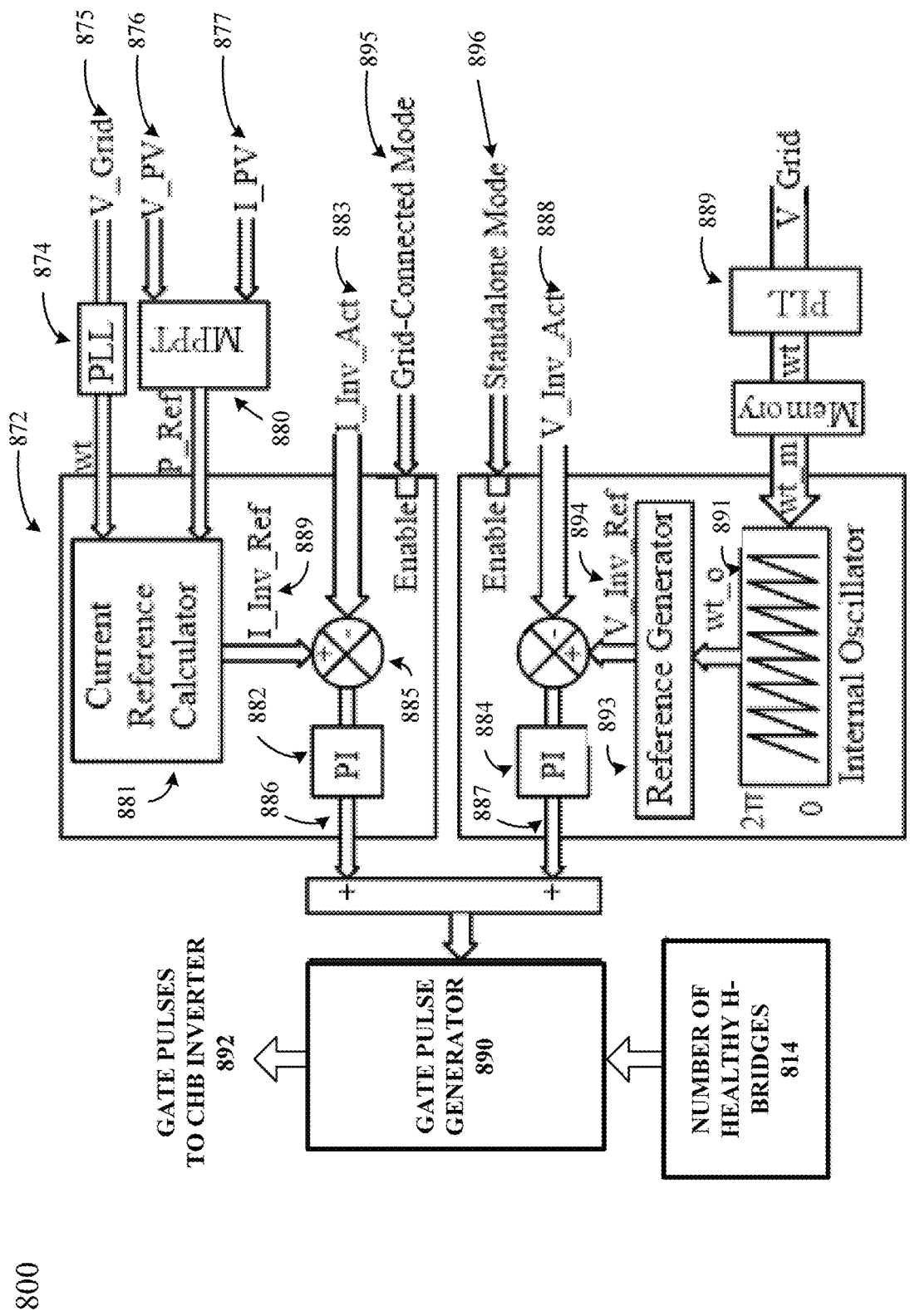
FIG. 8 is a control block diagram for a cascaded H-bridge based PV inverter.

A block diagram for the inverter controller 872 for PV applications is shown in FIG. 8. Closed loop current control is used for the cascaded H-bridge inverter in grid-connected mode and a closed loop voltage control is adapted during standalone mode.

When the system is in grid-connected mode 895:

a) a current control loop is enabled and the voltage control loop is disabled.

b) Since the voltage control loop is disabled, the reference inverter voltage is zero in this mode of operation.

c) The grid voltage 875 is monitored to obtain the phase angle (cot) using a phase locked loop 874 (PLL).

d) The PV voltage (V_PV) 876 and PV current (I_PV) 877 are monitored for the maximum power point tracker 880 (MPPT) to obtain a power reference for the inverter.

e) From the reference power and the phase angle of grid voltage, a reference inverter current 889 (I_Inv_Ref) is obtained.

f) In the current control loop, the actual inverter current 883 (I_Inv_Act) is compared with the reference inverter current 889 (I_Inv_Ref) and the error is applied to proportional integral (PI) controller 882 to obtain a modulating signal 886.

g) Based on the number 814 of healthy H-bridges, carrier waves are generated in the gate pulse generator module 890 and compared with the modulating signal 886 to generate gate pulses 892 for the cascaded H-bridge inverter.

The PI controller is a feedback control loop that integrates difference signals between the output of a system and its set point and generates a modulating error signal.

Figure 16:
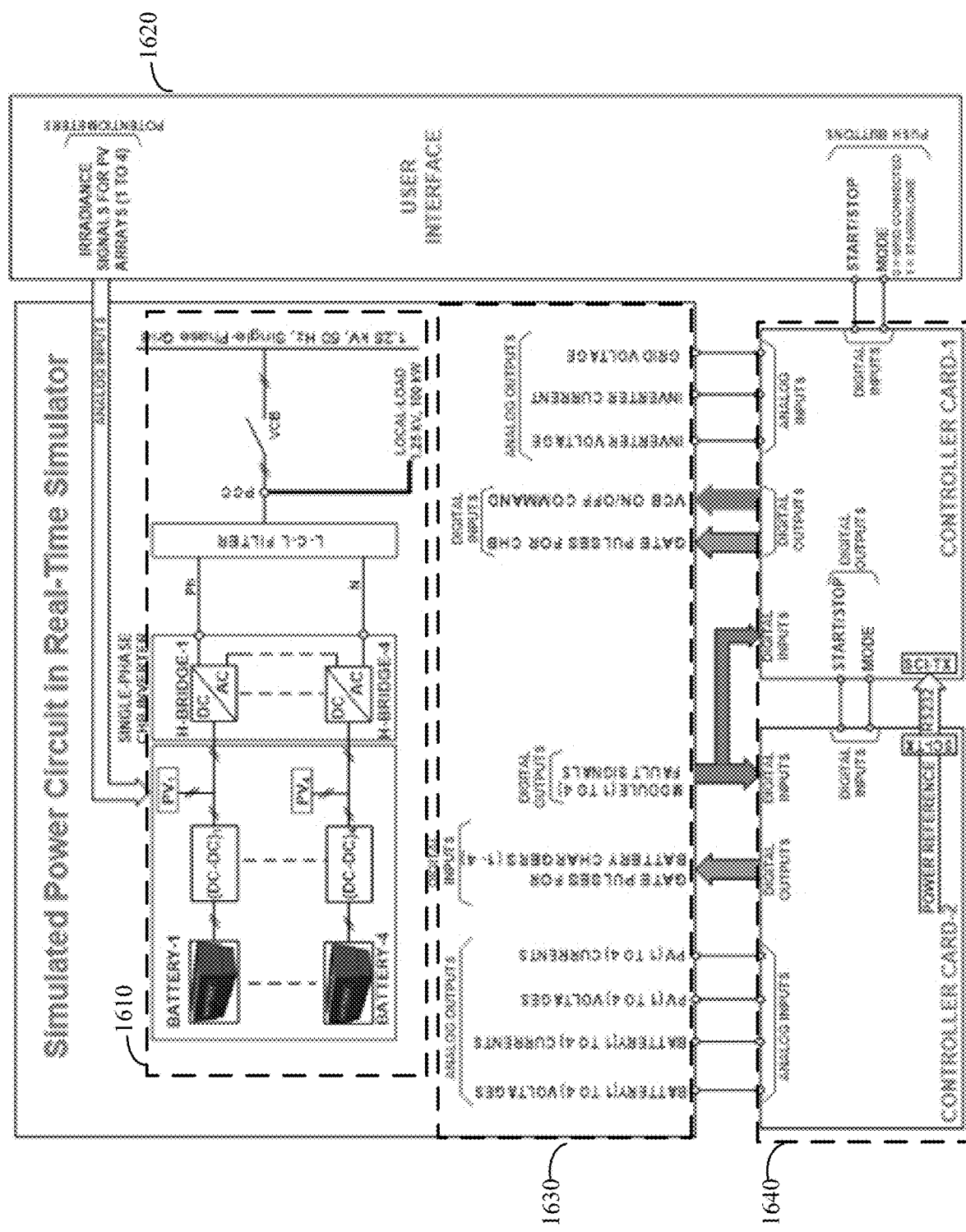
FIG. 16 is a simulation of the chopper based system in the standalone mode of operation.

A healthy H-bridge is one in which the H-bridge inverter is producing a power output at its load terminals which is greater than a minimum reference power output. The minimum reference power output may be programmed into the computing system an/or may be received from a user/operator from a computer interface 1620 as shown in FIG. 16.

In standalone mode 896, closed loop voltage control is used to provide the rated voltage to the load. For smooth changeover from grid connected mode 895 to standalone mode 896, it is required to match the phase angle of reference inverter output voltage 894 with the earlier grid voltage 888. The following procedure is carried out in standalone Mode.

h) Grid voltage is monitored and the phase angle 'wt' of grid voltage is obtained through phase locked loop (PLL).

i) At the instant of occurrence of grid fault, the latest value of angle 'ωt_m' of grid voltage is stored and internal oscillator is enabled.

j) Internal oscillator generates a phase angle (ωt_o) which starts from the value of stored phase angle ωt_m.

k) Upon receiving the phase angle input, reference generator gives inverter reference voltage signal to the closed loop voltage controller.

l) In the voltage control loop, the actual inverter voltage is compared with the reference inverter voltage and the error is applied to PI controller to obtain a modulating signal.

m) Based on the number of healthy H-bridges, carrier waves are generated in gate pulse generator module and compared with the modulating signal to generate gate pulses for the cascaded H-bridge inverter.

A cascaded H-bridge inverter fed from four independent, isolated DC sources was simulated to validate the controls proposed. The simulation results are shown in FIG. 9.

Figure 9:
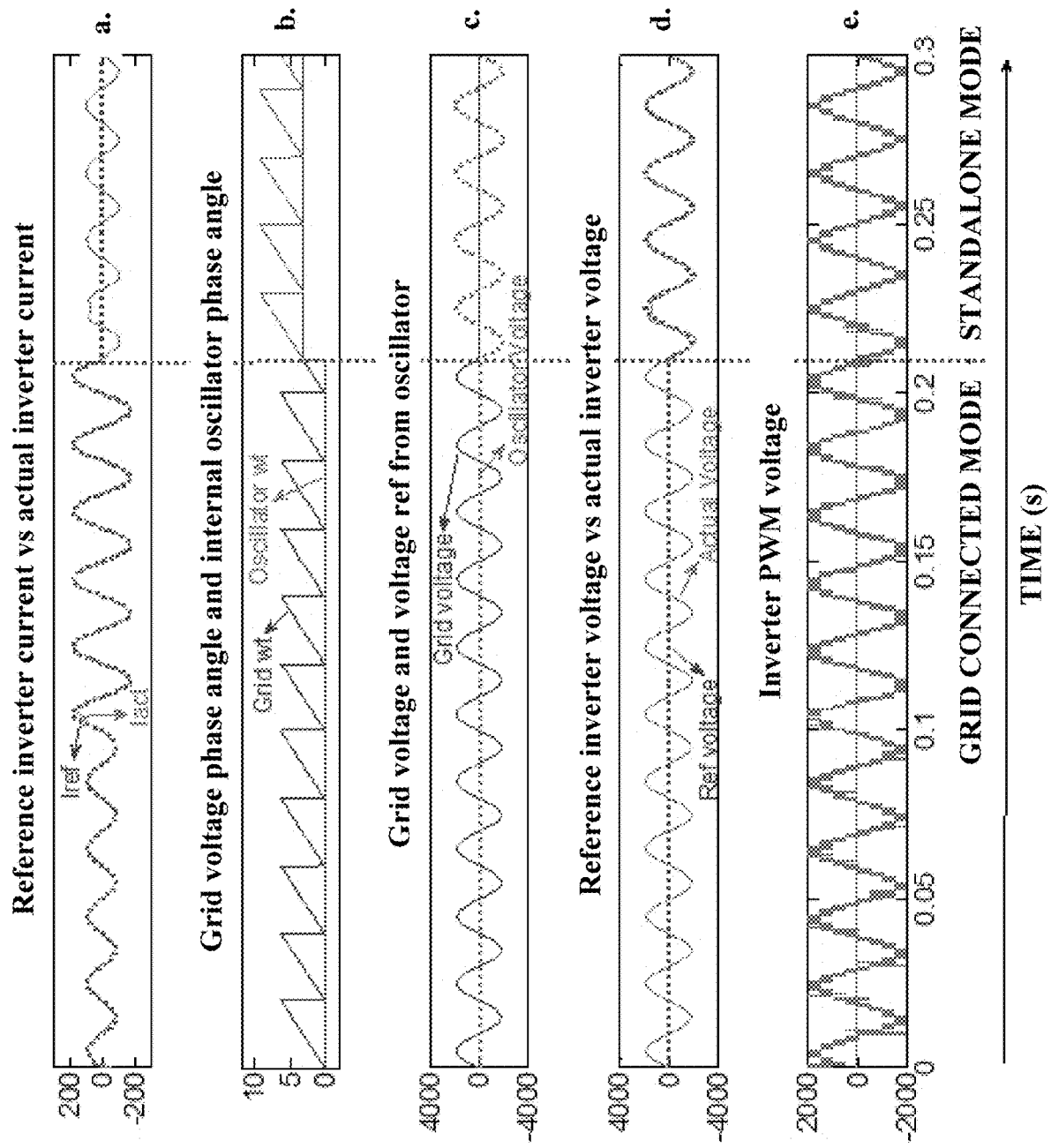
FIG. 9 illustrates the inverter voltage and current waveforms during grid-connected and standalone modes.

In FIG. 9, within the time interval of 0 to 0.21 second, the system was in grid connected mode, hence the current control loop was enabled and provided a current reference.

A step change in power reference was applied at time 0.1 second and it was observed that the reference current increased in-line with the reference current.

It is also observed that the actual current followed the reference current in steady state and the dynamic response of the system was satisfactory.

At 0.21 second, the system was transferred to standalone mode hence the voltage control loop is enabled. At this instant, current control loop was disabled and the reference current was made zero.

At time 0.21 s, the phase angle '$\omega t$' of grid voltage was clamped at 3.14 (i.e. $\omega t\_m$ is PI radian or 180 degree) and the phase angle of internal oscillator ($\omega t\_o$) started from that stored value ($\omega t\_m$).

From the simulation results, it was observed that the oscillator output voltage (c.) is in-phase with the earlier grid voltage hence the smooth transition was obtained.

Transient and steady state responses of the voltage control loop were also found to be as expected.

Since four H-bridges were used in the cascaded H-bridge, the number of voltage levels obtained at the inverter AC terminals is nine as shown in FIG. 9(e).

Details of battery charger controls are explained below.

A. Control of a Buck-Chopper Based Battery Charger

Figure 10:
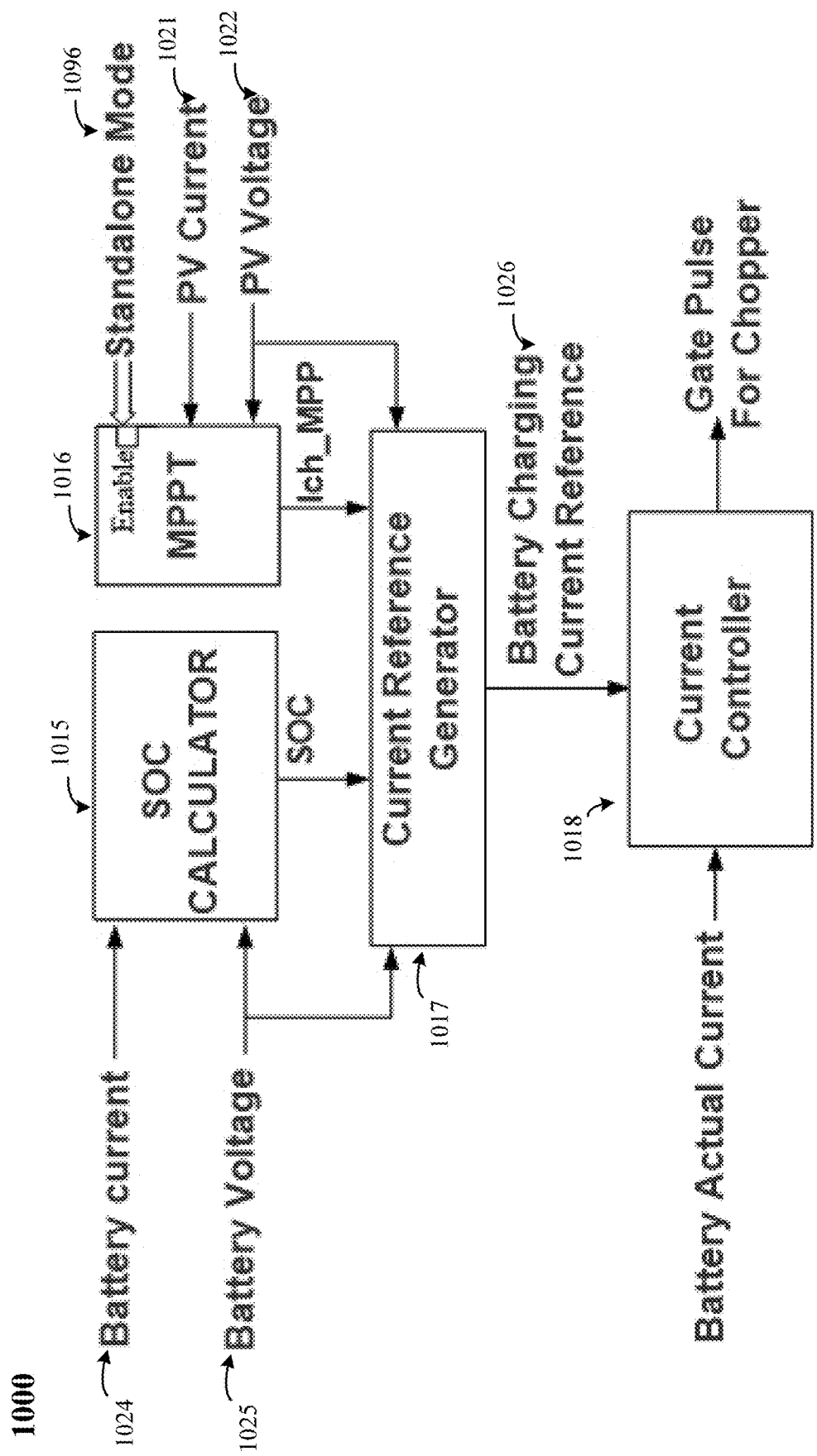
FIG. 10 is a control block diagram for a buck-chopper based battery charger.

In the grid connected mode of operation, the PV array feeds power to the battery and the remaining power is given to the grid and/or load. When the PV array is not able to generate power due to poor irradiance, the battery supplies power to the grid and/or load. In the standalone mode of operation, the PV array supplies power to the local load and the remaining power is transferred to charge the battery. The PV inverter operates in voltage control mode, thus the maximum power point control of the PV array cannot be used in the inverter controls. The the maximum power point is carried out in battery charger controls during this mode. The control block diagram for the buck-chopper based battery charger is shown in FIG. 10.

The following battery charger controls are performed in the buck-chopper battery controls when the system is in grid connected mode:

The MPPT 1016 of the PV array inside the battery control is disabled.

The SOC calculator 1015 calculates the state of charge (SOC) of battery by integrating the battery current.

If the PV voltage is larger than the battery voltage, the charging current reference (Ich_soc) is based on the SOC.

The current controller 1018 compares the actual battery current with the reference battery current (see 1017) and generates a gate pulse for the buck-chopper.

If irradiation is weak, the PV array may not be able to supply the full charging current required for the battery. In this case, the chopper is operated at 100% duty cycle by the current controller as the reference current remains larger than the battery charging current.

After providing the power required for battery charging, the remaining power of PV array is supplied to the grid. Maximum power point controls are carried out in the inverter controls.

When the irradiance is zero, PV voltage becomes less than the battery voltage. In this case, gate pulse for the buck-chopper is blocked and the reference inverter power is adjusted to the rated battery power. The battery starts discharging through diode $D_3$ shown in FIG. 3A.

In the standalone mode of operation,

The MPPT of the PV array is enabled in battery charger controls and disabled in inverter controls.

If the PV voltage is greater than the battery voltage, the current reference generator obtains the charging current reference (Ich_soc) based on SOC of the battery. The current reference generator obtains one more charging current reference (Ich_mpp) through the maximum power point controls.

The minimum value of Ich_soc and Ich_mpp is provided as a battery charging current reference.

The current controller compares the actual battery current with the reference battery current and generates a gate pulse to the buck-chopper.

With local load requirements and with the changes in irradiance on the PV array, the reference charging current to the battery charger varies through the maximum power point controls.

In the situation where the charging current reference is reduced gradually to zero through the maximum power point controls, and the PV voltage continues to reduce, the irradiation is not sufficient for the PV array to supply the local load requirement. In this case, the PV array voltage reduces gradually and when it reaches the value of battery voltage, the battery starts discharging through diode $D_3$ shown in FIG. 3Z. The PV array is not operating at its the maximum power point and the DC link voltage is clamped to the value of battery voltage.

Figure 11:
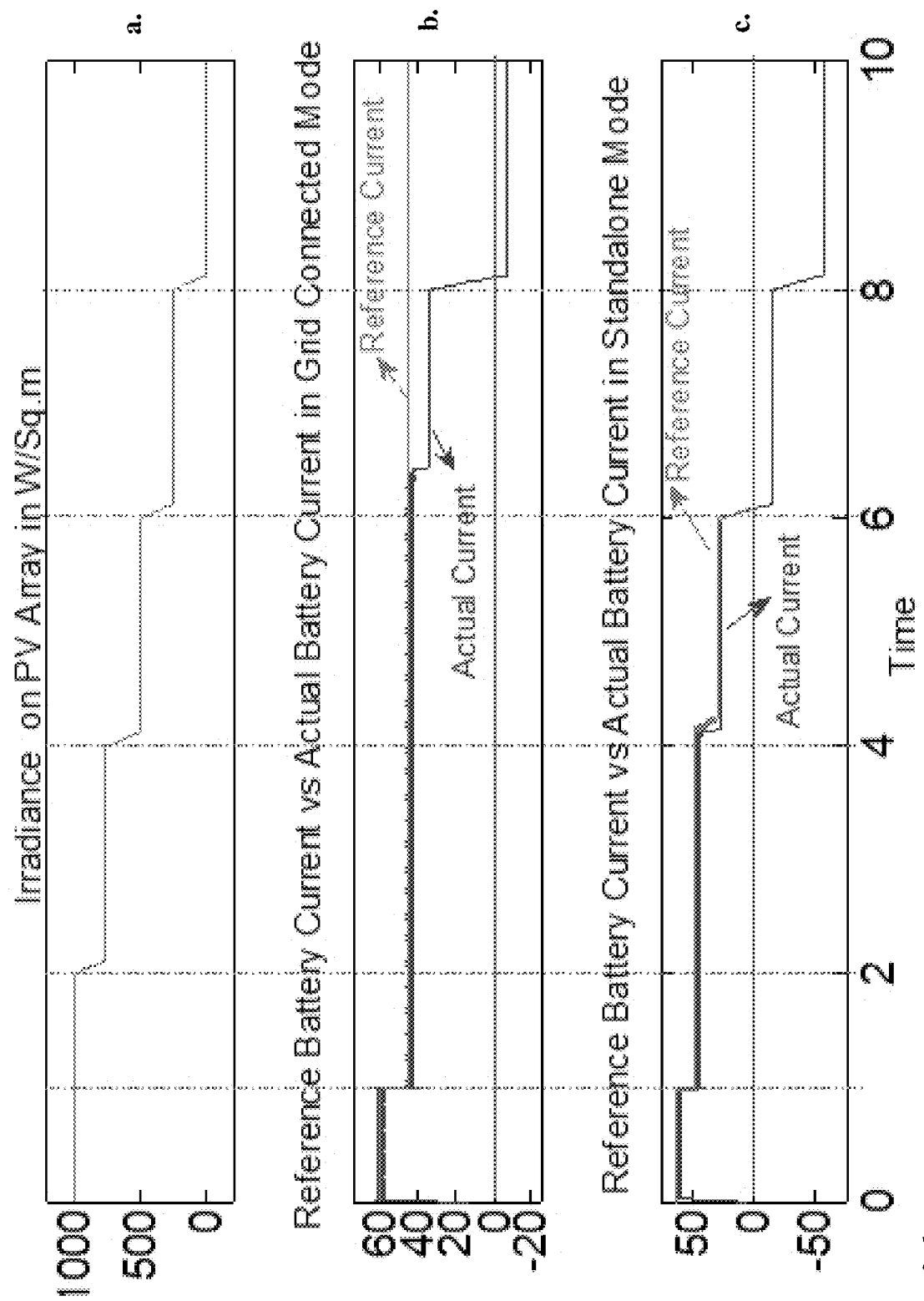
FIG. 11 illustrates the buck-chopper based battery charger waveforms during grid-connected and standalone modes.

A buck-chopper based battery charger system was simulated and the operation of battery charger controls in grid connected and standalone modes is explained through the simulation graphs shown FIG. 11(a)-(c).

The system was simulated in grid connected mode (FIG. 11(a), (b)):

During the time interval of 0 to 2 sec, the irradiance is maximum hence the PV array is able to supply the full current required for charging the battery. (See irradiance graph, FIG. 11(a).

At time 1 second, a step change in reference current was applied and it was observed that the actual current followed the reference current (FIG. 11(b). Good dynamic and steady state response was observed.

After six seconds, the irradiance on the PV array decreased to a level where the PV array could not supply sufficient battery charging current, therefore the chopper operated on a 100% duty cycle and the maximum possible current was received by the battery.

After 8 seconds, when the irradiance decreased to zero, the battery started discharging. The discharge current depends on the PV inverter reference current, as seen in FIG. 11(b)

The system was simulated in standalone mode (FIGS. 11(a), (c)):

During the time interval of 0 to 2 sec, irradiance was maximum hence the PV array was able to supply the full current required for charging the battery.

At time equal to one second, a step change in reference current was applied and it was observed that the actual current followed the reference current (FIG. 11(c). Good dynamic and steady state response is observed.

During the time interval from 2 to 4 second, the PV array was able to supply both power to the local load and the full current required to charge the battery.

At time equal to four seconds, the irradiance was dropped from 600 to 400 W/m². The power remaining at PV array after supplying to local load not sufficient to supply the full current required for charging the battery, hence the charging current was reduced based on the MPP of PV array.

After time equal to six seconds, the irradiance on PV array has dropped to a level which was not sufficient to meet the local load requirements, thus the battery started discharging to meet the load requirement.

After time equal to eight seconds, since the power from PV array was zero, the full current was supplied by the battery alone.

B. Control of the Bi-Directional Chopper Based Battery Charger

With a bi-directional chopper based battery charger, control of battery current in both charge and discharge modes allows the PV array to operate at its maximum power point under all operating conditions. Similar to a buck-chopper based system, in grid connected mode, the PV array feeds the power to battery charging and remaining power is transferred to the grid and/or load as long as irradiance is available. In the standalone mode of operation, the PV array supplies power to the local load and the remaining power is transferred to charge the battery. In both of these modes, if the battery is fully charged or if the power demand on the grid side is greater than available from the PV array, the battery can also feed the additional power to the grid along with the PV Array, which is not possible with a buck-chopper based system.

Figure 12:
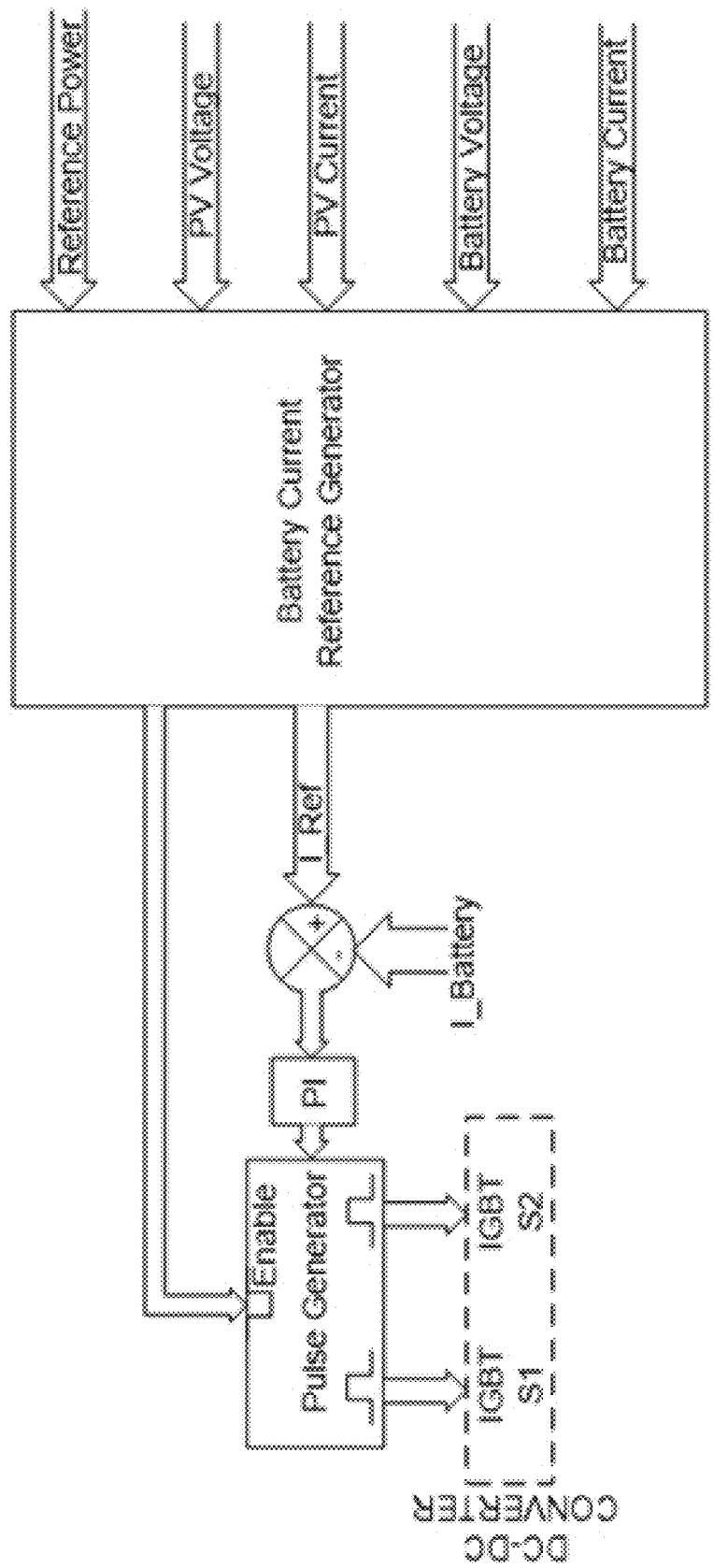
FIG. 12 is a control block diagram for a buck-chopper based battery charger.

In the system of the present disclosure, since the battery voltage has been selected to be less than the PV nominal voltage, the battery charger operates like a buck-chopper during charging mode and acts like a boost-converter during discharging mode. Battery charging is always through the current controller whereas discharging of the battery can be carried out either through the current controller or may be uncontrolled. The control block diagram for the battery charger is shown in FIG. 12.

The following battery charger controls are performed in the bi-directional chopper battery charger controls when the system is in grid connected mode:

When PV voltage is greater than the minimum nominal voltage of PV array, the battery charging/discharging current reference is obtained based on battery SOC.

The convention of the battery current is taken as positive during charge mode and taken as negative during discharge mode.

During charging mode, i.e. when the battery current is positive, the bi-directional chopper controls are similar to that of buck-chopper described in section A above.

When the reference battery current is negative and the PV voltage is greater than the minimum nominal voltage of the PV array, the battery discharge current is controlled through the current controller.

When the reference battery current is negative, and the PV voltage is lower than the minimum nominal voltage of PV array, then the pulse generator is disabled. No gate pulse is given to IGBTs and the battery discharges through inductor L and the diode across IGBT $S_1$ shown in FIG. 5A. Current through the battery charger varies based on the reference inverter power.

In the standalone mode of operation:

If PV voltage is greater than the minimum nominal voltage of PV Array, the battery charging current reference (Ibatt_SOC) is obtained based on the battery SOC and another current reference (Ibatt_MPP) is generated through the maximum power point controls. The minimum value of Ibatt_SOC and Ibatt_MPP is selected as current reference for the charger.

While charging the battery, the maximum power point controls are carried out in the battery charger and adjust the battery reference current to maintain the maximum power point of the PV array.

The current reference may become negative to supply power from the battery when the irradiance on the PV array is poor. Therefore, the PV array operates at its maximum power point voltage.

When the irradiance falls to zero and the PV voltage becomes less than the minimum nominal voltage of PV Array, the pulse generator module is disabled. The battery then discharges through inductor L and the diode across IGBT $S_1$ shown in FIG. 5A. Based on the load on the AC side, the battery current varies.

The first embodiment is illustrated with respect to FIGS. 3, 5A, 6, 7, 8, 10, 12, 14A-14C, and 15A-15B, 24-27. The first embodiment describes an energy control system (300 or 500, FIG. 3, 5A) for multilevel cascaded H-bridge inverters comprising a plurality of cascaded H-bridge inverter blocks, each cascaded H-bridge inverter block including a photovoltaic array ($PV_1$-$PV_n$, FIG. 3), a battery ($Battery_1$-$Battery_n$), a DC-DC converter ($(DC\text{-}DC)_1$-$(DC\text{-}DC)_n$) in parallel with the battery, wherein the DC-DC converter is configured to charge the battery. The system further includes a DC link 320 operatively connected between the photovoltaic array and the DC-DC converter and an H-bridge inverter 310 operatively connected to the DC link. A computing system (800, 1000, FIG. 8, 10, 24-27) including circuitry and at least one processor are configured to provide control signals to each H-bridge inverter block to regulate a mode of operation of the energy control system. The mode of operation may be a standalone mode or a grid-connected mode. Further, the DC-DC converters may be buck-chopper converters (FIG. 3) or bi-directional converters (FIG. 5A).

Each H-bridge inverter 310 includes four insulated-gate bipolar transistor (IGBT) inverter switches ($S_1$-$S_4$, FIG. 7) arranged in an H-bridge configuration, each inverter switch having a controllable gate. Each cascaded H-bridge inverter block is operatively connected to a bypass switch 712, each bypass switch including a controllable bipolar switch ($Q_{bp}$) and two anti-parallel insulated-gate bipolar transistors ($S_5$, $S_6$) (IGBT), each IGBT including a controllable gate.

An LCL filter 620 is operatively connected to the plurality of cascaded H-bridge inverter blocks, wherein each bypass switch in a block is configured to connect the H-bridge inverter in the block to the LCL filter. The computing system is configured to generate first gate pulses to each inverter switch controllable gate to provide power to the bypass switch. The computing system is further configured to compare the power generated at each H-bridge inverter to a minimum power level and generate second gate pulses to actuate the controllable bipolar switch and each IGBT controllable gate switch of the bypass switch, based on the minimum power level, to connect or disconnect the H-bridge inverter to the LCL filter.

Each photovoltaic array generates DC current, wherein each DC-DC converter includes at least one IGBT switch having a pulsed gate, wherein the computing system is configured to provide gate pulses to the at least one pulsed gate, causing the DC-DC converter to either provide current to charge the battery or to discharge the battery.

In an alternative as shown in FIG. 8, the DC-DC converter is a bi-directional chopper including two IGBT switches, each having a controllable gate, wherein the computing system further includes a closed loop current controller for grid connected mode, the closed loop current controller including a first enable input configured to receive a grid-connected mode signal 895 from a user interface, a maximum power point tracker 880, MPPT, configured to monitor voltage 876 and current signals 877 from each photovoltaic panel and generate power reference signals, a first phase locked loop 874, PLL, configured to monitor a grid voltage and calculate phase angles, an inverter current monitor 888 configured to generate actual inverter current signals, a current reference calculator 881 configured to receive the power reference signals and the phase angles and generate inverter current reference signals 889, a first comparator configured to compare the actual inverter current signals 883 to the inverter current reference signals 889 and generate current error signals. The system further includes a first proportional integral controller 882 configured to integrate the current error signals and generate current modulating signals 886.

In this alternative as shown in FIG. 8, the system further includes a closed loop voltage controller for standalone mode, the closed loop voltage controller including a second enable input configured to receive a standalone mode signal 896 from one of a user interface and the closed loop current controller, a second phase locked loop 889, PLL, including a memory, the second PLL configured to monitor grid voltages, calculate phase angles, store a current phase angle and generate a current phase angle signal, an inverter voltage monitor configured to generate actual inverter voltage signals 888, an oscillator 891 configured to receive the current phase angle and generate a next phase angle signal, a reference generator 893 configured to receive the next phase angle signal and generate an inverter voltage reference signal 894, a second comparator 886 configured to compare the actual inverter voltage signals 888 to the inverter voltage reference signals 894 and generate voltage error signals, a second proportional integral controller 884 configured to integrate the voltage error signals and generate voltage modulating signals 887.

This alternative further includes a healthy H-bridge monitor 814 which monitors each H-bridge inverter of the plurality of cascaded H-bridges inverter blocks, calculates a number of the healthy blocks and generates a number of healthy H-bridges signal, a gate pulse generator module 890 which receives the current modulating signals 886, the voltage modulating signals 887 and the number of healthy H-bridges signal, generates carrier waves, compares the carrier waves to the modulating signals, and generates gate pulses 892 to the cascaded H-bridge inverters.

The computing system may receive the phase angle from the PLL, compare the phase angle to a reference phase angle and generate a standalone mode signal to the second enable input based on the comparison when the phase angle is not equal to the reference phase angle.

Alternatively, the computing system may receive the second enable signal from a user interface.

In a second alternative illustrated in FIG. 10, the DC-DC converter is a unidirectional buck chopper including one IGBT switch, wherein each photovoltaic array includes an MPPT circuit 1016 having an enable input for standalone mode, wherein the MPPT monitors the current 1021 and voltage 1022 values generated by the photovoltaic array, compares the voltage and current values to voltage and current reference values and generates a charging current control signal, Ich_MPP, based on the comparison.

A state of charge (SOC) calculator 1015 operatively connected to the battery to receive battery current 1024 and voltage 1025 measurements, integrate the current and voltage measurements and generate a state of charge signal, SOC.

A current reference generator 1017 is operatively connected to receive the charging current control signal Ich_MPP and the state of charge signal SOC, compare the charging current control signal and the state of charge signal, and generate a battery charging current reference 1026 based on the minimum of the charging current control signal and the state of charge signal.

A current controller 1018 receives a battery actual current and the battery charging current reference 1026 and generates a gate pulse to the one IGBT switch to either charge the battery or discharge the battery.

The second embodiment is illustrated with respect to FIGS. 3A, 3B, 5A, 6, 7, 8, 10, 12, 14A-14C, and 15A-15B, 24-27. The second embodiment describes a method for controlling energy in a multilevel cascaded H-bridge inverter connected to a plurality of renewable energy power generators (see FIG. 3B), wherein the renewable energy power generators are any one of a wind generator, a photovoltaic (PV) generator and a wave power generator, comprising regulating, by a computing system including circuitry and at least one processor configured for generating control signals, a mode of operation of the energy control system, wherein the mode of operation is one of a standalone mode (896, 1096) and a grid-connected mode 895 (FIG. 8, 10).

The method comprises generating, by each the plurality of renewable energy generators, electrical current and voltage (an example is shown as PV voltage, but may be a renewable energy generator), monitoring, by the computing system (in MPPT module 880), amplitudes of the electrical current 877 and voltage 876, connecting a DC-DC converter (330, 530, FIG. 3B, 5A) to each of the plurality of renewable energy generators, connecting a battery (Battery$_1$-Battery$_n$), to each DC-DC converter ((DC-DC)$_1$-(DC-DC)$_n$).

The method includes comparing, by the computing system, the amplitudes to reference electrical current and voltage amplitudes, calculating, by the computing system, gate pulse signals 892 based on the comparisons, generating, by the computing system, the gate pulse signals, switching, by the gate pulse signals, controllable gates of the DC-DC converter, and charging and discharging the battery based on the switching.

As shown in FIG. 3B and FIG. 10, an alternative comprises receiving an enable signal for a standalone mode of operation of the multilevel cascaded H-bridge inverter, wherein the DC-DC converter is a buck-chopper converter including an IGBT switch S1 having a controllable gate, monitoring, by a maximum power point tracker circuit 1016, MPPT, the current 1021 and voltage values 1022 generated by the renewable energy generator, comparing, by the MPPT, the voltage and current values to voltage and current reference values and generating a charging current control signal, Ich_MPP, based on the comparison.

The method includes receiving, by a state of charge, SOC calculator 1015, the battery current 1024 and voltage values 1025, integrating, by the SOC calculator, the current and voltage measurements, generating, by the SOC calculator, a state of charge signal based on the integrating.

The method includes receiving, by a current reference generator 1017, the charging current control signal and the state of charge signal, comparing, by the current reference generator, the charging current control signal and the state of charge signal, generating, by the current reference generator, a battery charging current reference 1026 based on the minimum of the charging current control signal and the state of charge signal, and receiving, by a current controller 1018, a battery actual current and the battery charging current reference and generating a gate pulse to the controllable gate of the DC-DC converter to either charge the battery or discharge the battery. The method includes receiving the enable signal from a user input at a user interface.

In an alternative shown in FIG. 5A, FIG. 8, the method includes receiving, from a user input at a user interface, an enable signal for a grid-connected mode of operation of the multilevel cascaded H-bridge inverter, wherein each DC-DC converter is a bi-directional converter including two IGBT switches (S1, S2), each having a controllable gate, monitoring, by a maximum power point tracker 880, MPPT, voltage 876 and current signals 877 from each renewable energy power generator and generating power reference signals, monitoring a grid voltage, by a first phase locked loop 874, PLL, and calculating phase angles ($\omega t$), generating, by an inverter current monitor, actual inverter current signals 883, receiving, by a current reference calculator 872, the power reference signals and the phase angles and generating inverter current reference signals 889, comparing, by a first comparator, the actual inverter current signals to the inverter current reference signals and generating current error signals, integrating, by a first proportional integral controller, the current error signals and generating current modulating signals 886.

The method includes receiving, at a second enable input, a standalone mode signal 896 from one of a user interface and the MPPT, monitoring grid voltages 875, by a second phase locked loop 889 including a memory, and calculating phase angles, storing a current phase angle and generating a current phase angle signal ($\omega t\_m$), generating, by an inverter voltage monitor, actual inverter voltage signals 888, receiving, by an oscillator 891, the current phase angle and generating a next phase angle signal, ($\omega t\_o$), receiving, by a reference generator 893, the next phase angle signal and generating an inverter voltage reference signal 894, comparing, by a second comparator, the actual inverter voltage signals to the inverter voltage reference signals and generating voltage error signals, integrating, by a second proportional integral controller 884, the voltage error signals and generating voltage modulating signals 887.

The method includes monitoring, by a healthy H-bridge monitor 814, each H-bridge inverter of the multilevel cascaded H-bridge inverter, and calculating a number of healthy blocks and generating a number of healthy H-bridges signal, receiving, by a gate pulse generator module 890, the current modulating signals 886, the voltage modulating signals 887 and the number of healthy H-bridges signal, and generating carrier waves, comparing the carrier waves to the modulating signals, and generating gate pulses 892 to the cascaded H-bridge inverters.

The method includes monitoring, by the first phase locked loop 874, grid voltages 875 and phase angles ($\omega t$), comparing, by the current reference generator 872, the grid voltages and phase angles to reference grid voltages and phase angles, generating, by the computing system, a grid fault signal when the grid voltages and phase angles do not equal the reference grid voltages and phase angles, providing, by the computing system, a standalone mode enable signal 896 based on the grid fault signal.

The method includes receiving a first gate pulse signal at a first IGBT controllable gate $S_1$ of each bi-directional converter 530 (FIG. 5A), charging the battery based on the first gate pulse signal, receiving a second gate pulse signal at a second IGBT controllable gate ($S_2$) of each bi-directional converter, discharging the battery based on the second gate pulse signal.

The third embodiment is illustrated with respect to FIGS. 3A, 3B, 5A, 6, 7, 8, 10, 12, 14A-14C, and 15A-15B, 24-27. The third embodiment describes a non-transitory computer readable medium having instructions stored therein that, when executed by one or more processors, cause the one or more processors to perform a method for controlling energy in a multilevel cascaded H-bridge inverter connected to a plurality of photovoltaic arrays (FIG. 3A, FIG. 5A), comprising regulating, by a computing system including circuitry and at least one processor configured for generating control signals, a mode of operation of the energy control system, wherein the mode of operation is one of a standalone mode (896, 1096) and a grid-connected mode 895 (FIG. 8, 10).

The non-transitory computer readable medium method further comprises generating, by each the plurality of photovoltaic arrays, electrical current and voltage, monitoring, by the computing system, amplitudes of the electrical current and voltage, connecting a DC-DC converter to each of the plurality of photovoltaic arrays, connecting a battery to each DC-DC converter, comparing, by the computing system, the amplitudes to reference electrical current and voltage amplitudes, calculating, by the computing system, gate pulse signals based on the comparisons, generating, by the computing system, the gate pulse signals, switching, by the gate pulse signals, controllable gates of the DC-DC converter, and charging and discharging the battery based on the switching.

As shown in FIG. 10, the method alternatively includes receiving an enable signal for a standalone mode of operation of the multilevel cascaded H-bridge inverter, wherein the DC-DC converter is a buck-chopper converter including an IGBT switch having a controllable gate, monitoring, by a maximum power point tracker circuit, MPPT, the current and voltage values generated by the photovoltaic array, comparing, by the MPPT, the voltage and current values to voltage and current reference values and generating a charging current control signal based on the comparison, receiving, by a state of charge, SOC calculator, the battery current and voltage values, integrating, by the SOC calculator, the current and voltage measurements, generating, by the SOC calculator, a state of charge signal based on the integrating, receiving, by a current reference generator, the charging current control signal and the state of charge signal, comparing, by the current reference generator, the charging current control signal and the state of charge signal, generating, by the current reference generator, a battery charging current reference based on the minimum of the charging current control signal and the state of charge signal, receiving, by a current controller, a battery actual current and the battery charging current reference and generating a gate pulse to the controllable gate of the DC-DC converter to either charge the battery or discharge the battery.

As shown in FIG. 8, the method alternatively includes receiving, from a user input at a user interface, an enable signal for a grid-connected mode of operation of the multilevel cascaded H-bridge inverter, wherein each DC-DC converter is a bi-directional converter including two IGBT switches, each having a controllable gate, monitoring, by a maximum power point tracker, MPPT, voltage and current signals from each photovoltaic array and generating power reference signals, monitoring a grid voltage, by a first phase locked loop, PLL, and calculating phase angles, generating, by an inverter current monitor, actual inverter current signals, receiving, by a current reference calculator, the power reference signals and the phase angles and generating inverter current reference signals, comparing, by a first comparator, the actual inverter current signals to the inverter current reference signals and generating current error signals, integrating, by a first proportional integral controller, the current error signals and generating current modulating signals, integrating, by first proportional integral controller, the current error signals and generating current modulating signals, receiving, at a second enable input, a standalone mode signal from one of a user interface and the MPPT, monitoring grid voltages, by a second phase locked loop including a memory, and calculating phase angles, storing a current phase angle and generating a current phase angle signal, generating, by an inverter voltage monitor, actual inverter voltage signals, receiving, by an oscillator, the current phase angle and generating a next phase angle signal, receiving, by a reference generator, the next phase angle signal and generating an inverter voltage reference signal, comparing, by a second comparator, the actual inverter voltage signals to the inverter voltage reference signals and generating voltage error signals, integrating, by a second proportional integral controller, the voltage error signals and generating voltage modulating signals, monitoring, by a healthy H-bridge monitor, each H-bridge inverter of the multilevel cascaded H-bridge inverter, and calculating a number of healthy blocks and generating a number of healthy H-bridges signal, and receiving, by a gate pulse generator module, the current modulating signals, the voltage modulating signals and the number of healthy H-bridges signal, and generating carrier waves, comparing the carrier waves to the modulating signals, and generating gate pulses to the cascaded H-bridge inverters.

The non-transitory computer readable medium method further includes monitoring, by the first phase locked loop, grid voltages and phase angles, comparing, by the current reference generator, the grid voltages and phase angles to reference grid voltages and phase angles, generating, by the computing system, a grid fault signal when the grid voltages and phase angles do not equal the reference grid voltages and phase angles, providing, by the computing system, a standalone mode enable signal based on the grid fault signal, receiving a first gate pulse signal at a first IGBT controllable gate of each bi-directional converter, charging the battery based on the first gate pulse signal, receiving a second gate pulse signal at a second IGBT controllable gate of each bi-directional converter, and discharging the battery based on the second gate pulse signal.

Figure 13:
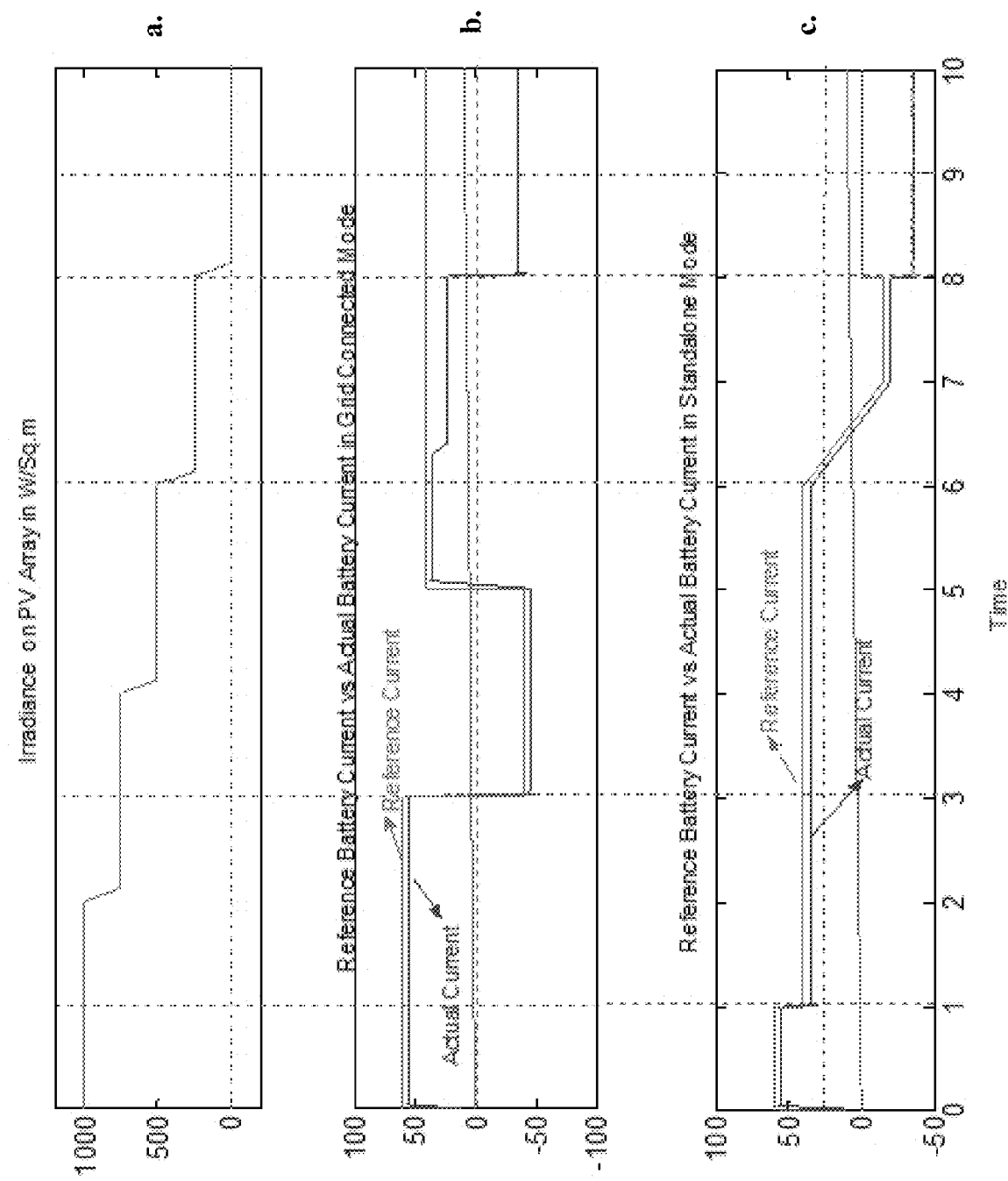
FIG. 13 illustrates waveforms of a bi-directional chopper based battery charger during grid-connected and standalone modes.

A bi-directional chopper based battery charger system was simulated and the operation of the battery charger controls in grid connected and standalone modes are explained through the simulation results shown FIGS. 13 (a)-(c).

When system was simulated in grid connected mode (FIGS. 13 (a), (b)):
In the time interval of 0 to 3 sec, irradiance was high, thus the PV array can supply the full current required for charging the battery.
At time equal to 3 seconds, the reference current was negative and at time equal to 5 seconds, the battery reference current was adjusted to positive to check the response of the system. Good dynamic and steady state response was observed.
After a time equal to six seconds, the irradiance on PV array has reduced to a level where the PV array is unable to supply the full battery reference current. The chopper operates at 100% duty cycle at this point. Based on the available power at the PV, a current less than the reference current was supplied to the battery.
After time equal or greater than six seconds, since the irradiance is zero, the reference charging current was also zero and the gate pulses for the chopper were blocked. Based on the PV inverter reference current, the battery started discharging.

In the standalone mode of operation (FIGS. 13 (a), (c)):
In the time interval of 0 to 2 sec, the irradiance is maximum, hence the PV array could supply the full current required for charging the battery.
At time equal to 1 second, a step change in reference current was applied and it was observed that the actual current followed the reference current. Good dynamic and steady state response was observed.
During the time interval from 2 to 6 seconds, the PV array was able to supply power to the local load and the full current required for battery charging.
At time equal to 6 seconds, when the irradiance was dropped from 400 to 200 W/m$^2$, the power at the PV array was not sufficient to meet the local load requirements, hence the battery current reference was reduced gradually to a negative value so that the battery could provide the additional power required for the load. Thus, current control was active for the chopper controls.
At time equal to 8 seconds, since the power from PV array was zero, the battery charger controls were disabled and the full current for the load was supplied from the battery alone.

Figure 14A:
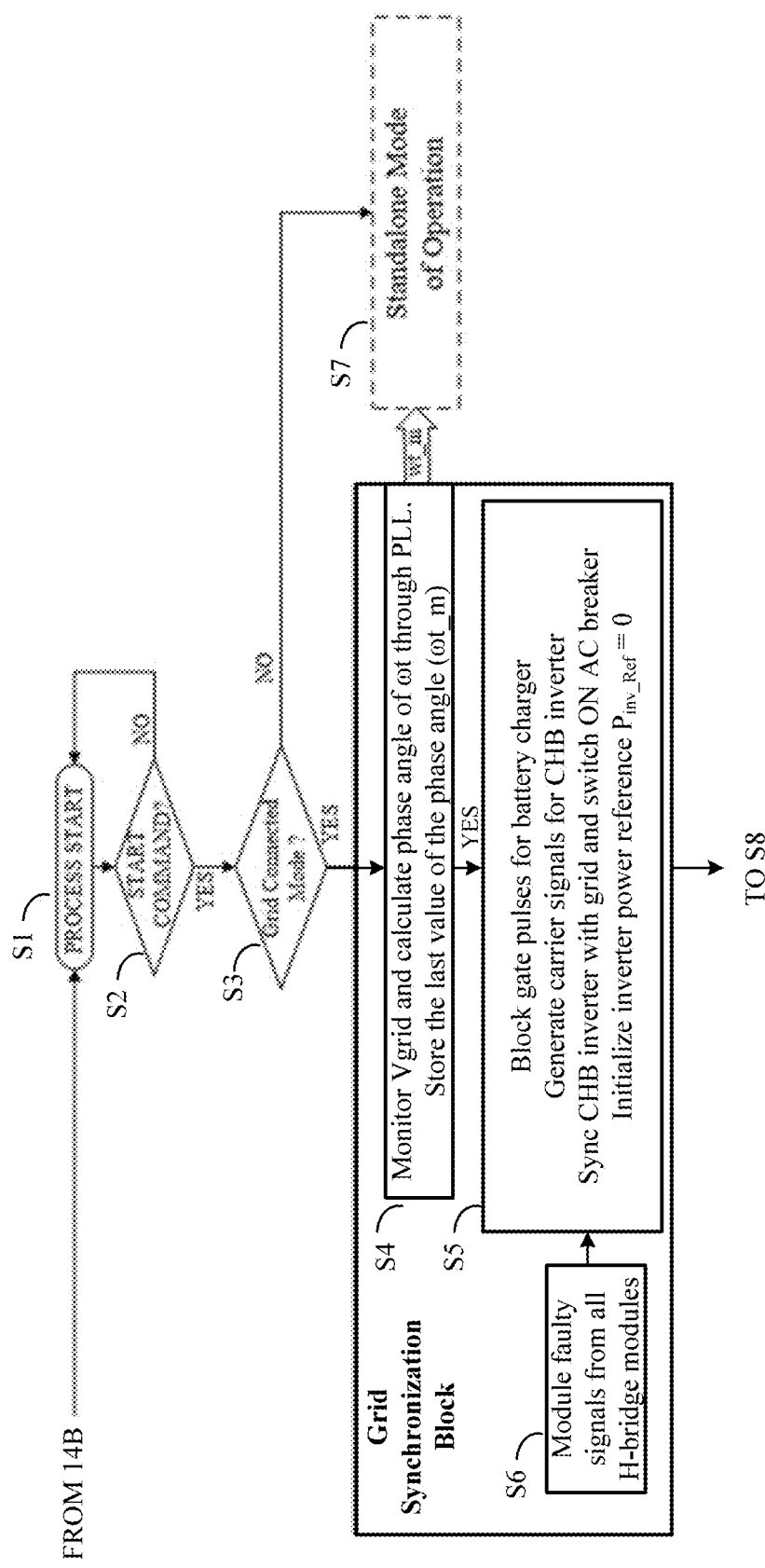
FIG. 14A-14C illustrate a control algorithm for the buck-chopper based system in a grid-connected mode of operation.
Figure 14B:
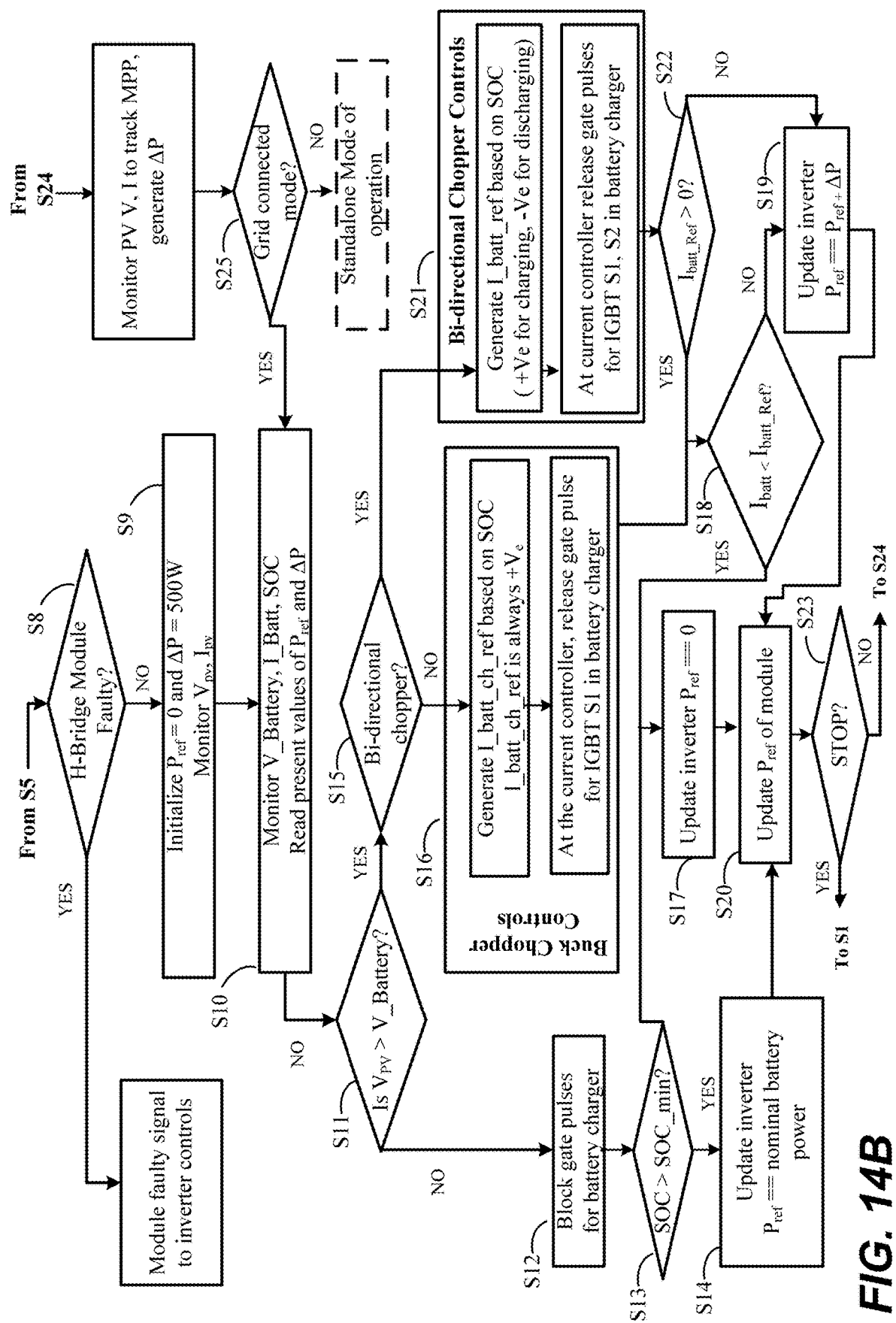
Figure 14C:
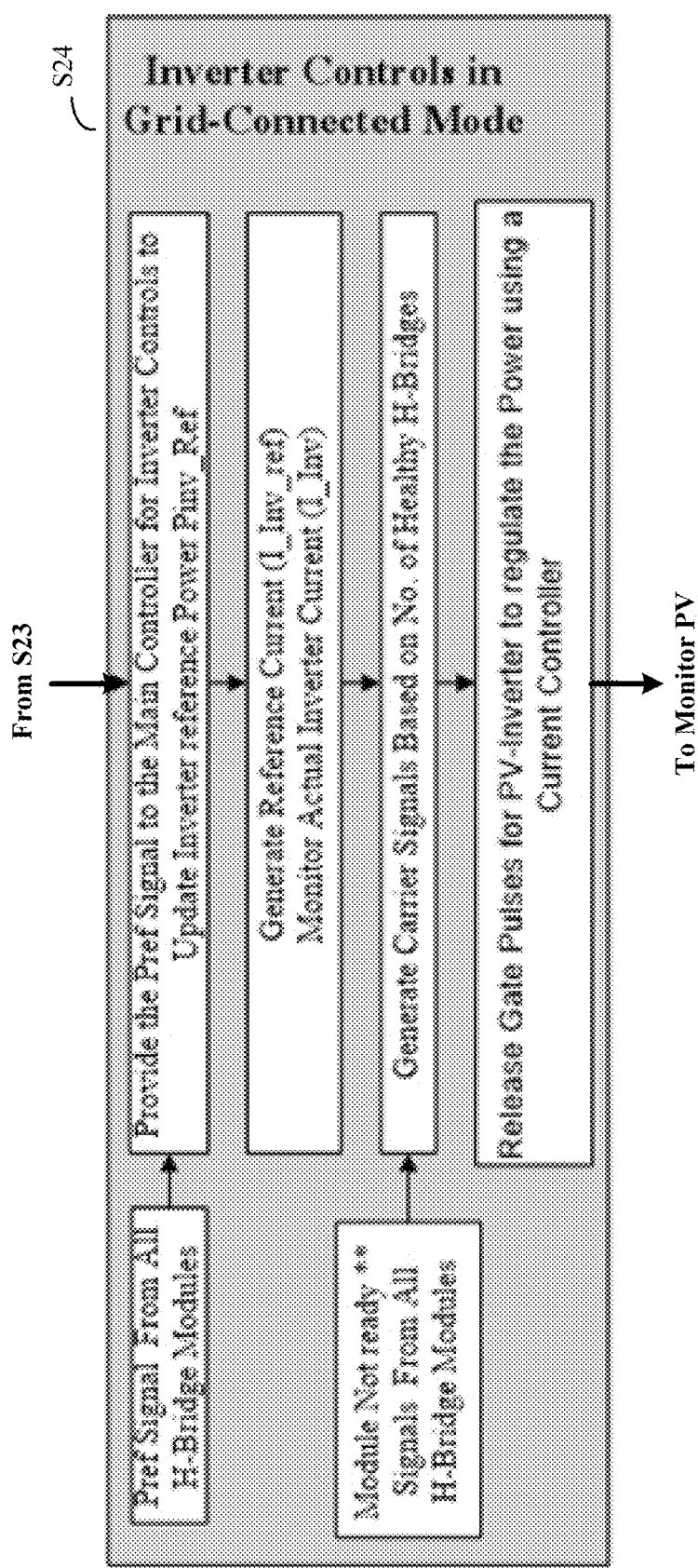

In an aspect of the present disclosure, a generalized control algorithm for buck-chopper and boost-chopper based PV cascaded inverter systems is illustrated in FIG. 14A-FIG. 14C. For ease of understanding, the algorithm is divided into two parts: one for the grid-connected operation and one for the controls in standalone mode. FIG. 14A shows the initialization of the system, FIG. 14B shows the controls at the module level and FIG. 14C illustrates the inverter controls in the grid-connected mode.

C. Control Algorithm During the Grid-Connected Mode of Operation

A generalized control algorithm for chopper based ESS configurations in the grid-connected mode is shown in FIGS. 14A, 14B and 14C, and the sequence of operations is explained below. The grid synchronization is shown in FIG. 14A.

S1: Process start: A stop command has been received from the module level controls, so the system must be restarted.

S2: Start command: A start command is received from a user/operator. If no start command is received, the control passes back to S1 to await the process start. On receiving the start command, the controller checks for the existence of grid-side faults.

S3: Mode of operation: If a fault is on the grid side, the standalone mode S7 is enabled. If grid side is healthy, the operator can adjust the system operation either for grid connected mode or for standalone mode of operation. By default, the system operation is set for grid-connected operation. The process proceeds to the grid synchronization block.

S4: Phase angle of grid voltage through phase locked loop (PLL): the grid voltage is monitored and the phase angle of the grid voltage is obtained through the phase locked loop (PLL). This phase angle is required during synchronization of the PV inverter with the grid and is also required for current controller. The latest value of the grid phase angle is stored each cycle for smooth transitioning from the grid connected mode to the standalone mode.

S4: Synchronization of PV inverter with the grid: To synchronize the PV inverter to the grid, the phase angle of grid voltage is monitored and stored.

S5: Initial gate pulses for the battery charger are blocked, so the DC link voltage is supplied either from the PV source or from the battery.
   a. Module faulty signals determined at S6 from all the H-bridges are received by the controller and generate carrier signals for each H-bridge.
   b. Based on the PLL output, an inverter voltage reference is generated and releases the gate pulses to the cascaded H-bridge inverter.
   c. Once the inverter is synchronized, the input AC breaker is switched ON.
   d. The initial inverter power reference is adjusted to zero. The inverter power reference is updated based on the output from the battery charger controls in each H-bridge module.

Control passes to block S8 in the module level as illustrated in FIG. 14B.

S8: Module faulty: When there is a fault in a basic building block of the cascaded H-bridges, a common fault signal is generated in the module and transmitted to the main controller. Based on this signal, the main controller blocks the gate pulses for that H-bridge inverter and switches on the bypass switch for continuous operation.

S9: Initialization of Module reference power: In grid connected mode, the first priority of the system is to charge the batteries and then to supply power to the grid/load. Hence initially the reference power of the module ($P_{ref}$) that can be transferred to the grid is adjusted to zero. In the system of the present disclosure, a 500 watt step in the reference power ($\Delta P$) is selected so that the power reference for the inverter per module can be incremented or decremented in steps of $\Delta P$ which is initialized at a value of 500 W.

S10: Monitoring of Battery Parameters: Battery voltage and current are monitored in every cycle. The state of charge (SOC) of the battery is obtained by integrating the battery current:

$$\% \ SOC = 100 \times \{1 - [(I^*T)/Q]\} \quad (1)$$

where '$I^*T$' is the discharge capacity (Ah) obtained by integrating the current and 'Q' is ampere-hour rating.

S11: When PV voltage is less than battery voltage as during the night when the irradiance on the PV array is very poor, then the PV array voltage will be less than or equal to the battery voltage. In this case, power to the grid can be supplied only from the battery and gate pulses for the battery charger are blocked at S12.

S13: If the SOC of the battery is less than the minimum battery SOC, then the module is not ready to transfer power. A Module Not Ready signal is transmitted to the controller.

S14: If SOC of the battery is greater than the minimum battery SOC, the reference inverter power is adjusted to the nominal battery power.

S15: If the PV voltage measured at S11 is greater than the battery voltage, the determination is made whether the CHB inverters are buck choppers or bi-directional choppers.

Once the irradiance starts to increase, the PV array will be able to supply power to the battery and the grid. The amount of the power that can be transferred depends on the irradiance on PV array.

Initially during the early hours of a day, irradiance increases and the voltage of PV array reaches its open circuit voltage. Since the PV array voltage is now greater than the battery voltage, the battery charger controls are enabled.

S16: Controls on the buck-chopper based battery charger: The buck-chopper is controlled only in charging mode of operation.

The charging current reference for the buck-chopper is generated from the battery SOC. I_batt_ch_ref is always+$V_e$ or positive voltage.

The current controller is enabled to regulate the battery current. Gate pulses are sent to S1 in the IGBT of the battery charger.

S17, S18: If the battery current is still less than the reference current in steady state as determined at S18, the irradiance on the PV array is not sufficient to supply that current, thus the current reference is adjusted. The reference inverter power for the module is adjusted to zero at S17. In this case, the chopper operates at 100% duty cycle.

S19, S20: When the irradiance improves further, the battery current reaches the reference charging current. Once the battery current reaches its reference current, then the power flow through the inverter can be allowed to increase in steps of 500 watt per module and the power reference is updated at S20.

S21: Controls on the bi-directional chopper based battery charger: since the current through the bi-directional chopper is regulated bi-directionally, charging and discharging current are regulated based on the battery SOC. The charge/discharge current references for the chopper are obtained from the battery SOC. The current controller is enabled to regulate the battery current.

During charging mode, the operation of the bi-directional chopper is similar to that of the buck-chopper.

S22: When current reference is negative, then battery supplies power to the grid based on its SOC. Since the battery is supplying some power, the PV current will reduce for the same inverter power. Next, control passes to S19, where the reference module power (Pref) is adjusted in steps of 500 watt to reach its MPP through the maximum power point controls and the inverter power control is updated. Based on the battery controls, the reference module power is updated at S20.

S23: The controller checks whether a STOP command has been received. If YES, the process returns to S1. If NO, the process proceeds to block S24.

The inverter controls in the grid-connected mode are illustrated in FIG. 14C.

S24: The controller receives the reference power (Pref) signals from all the healthy H-bridge modules and updates the reference inverter power (P_inv_ref). Through the current controller, the inverter power reference is regulated. Powers flowing through all the H-bridge modules are not equal and are proportional to their individual reference module powers. Therefore, independent voltage control is adapted in this mode of operation.

Maximum Power Point Tracking (MPPT): MPPT is carried out in the module level by increasing the reference value of the module power that can be transferred to the grid. Once the inverter starts supplying power to the grid, PV voltage and currents are monitored in each H-bridge module. Based on the power difference from previous cycle time to the current cycle time, the increment/decrement power signal ($\Delta P$) is updated.

The process flow repeats until the controller receives a stop command or when there is a transfer of mode from grid-Connected to standalone operation.

Figure 15A:
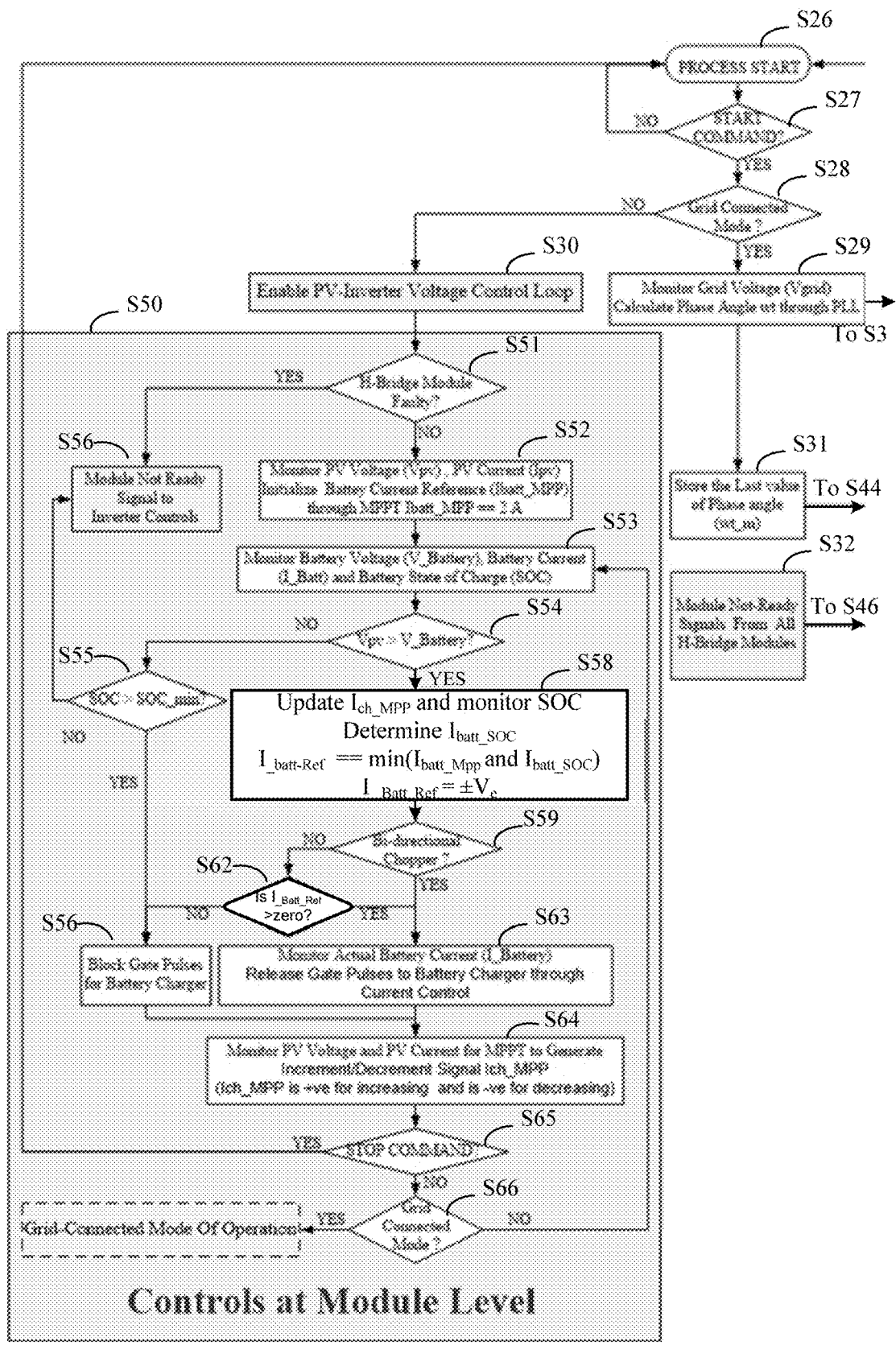
FIG. 15A-15B illustrate a control algorithm for the chopper based system in the standalone mode of operation.
Figure 15B:
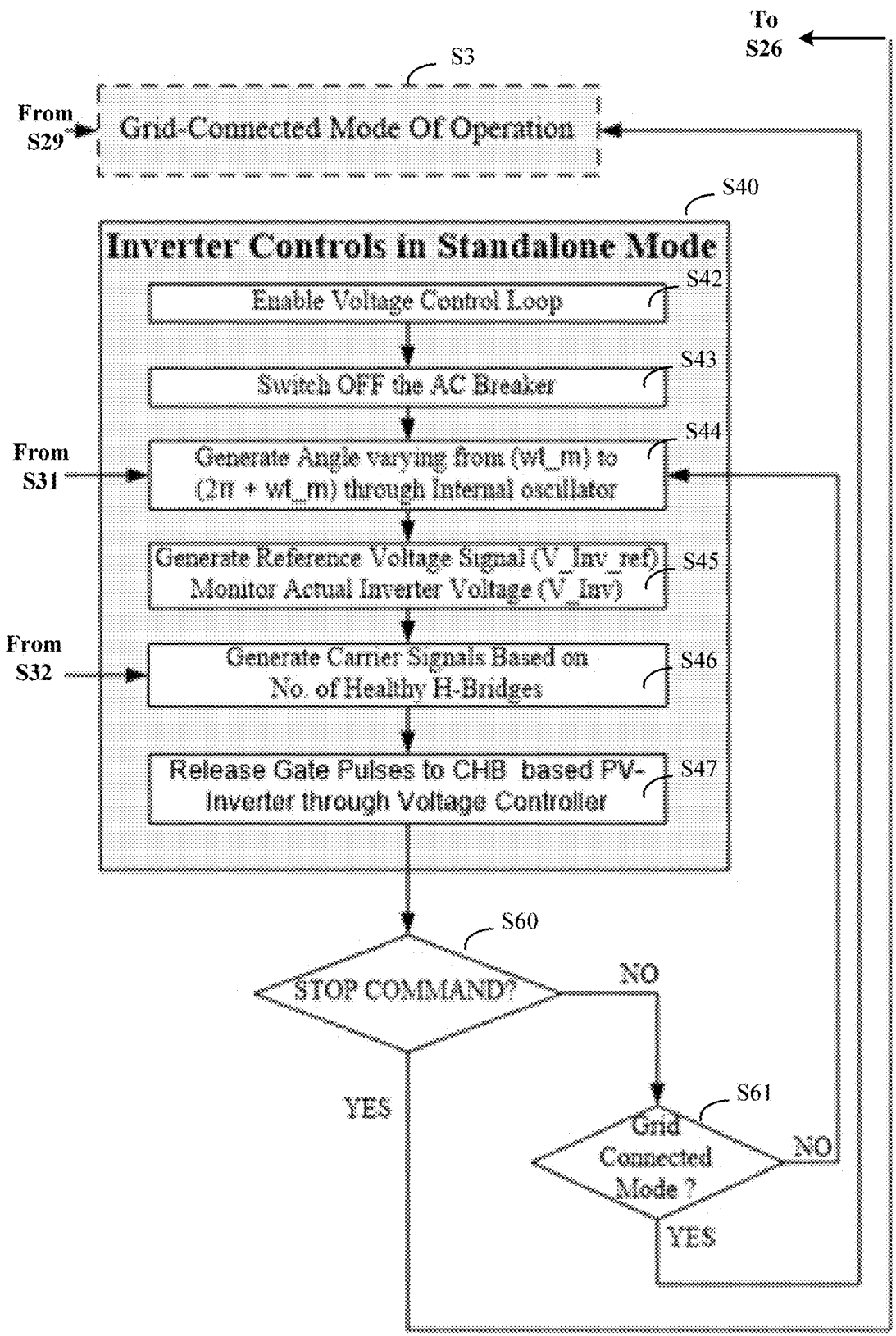

A generalized control flowchart for chopper based ESS configurations in standalone mode is shown in FIG. 15A, 15B.

S26, S27: A START command is received from a user. On receiving the START command the controller checks for the existence of grid side faults.

S28, S30: Mode of Operation: Standalone mode may be enabled when the system is in grid-connected mode, but there is a fault on the grid side or the operator changes the mode of operation. This also enables the voltage control loop of the inverter controls at S42. If the system is not in grid-connected mode, the process moves to S30 to enable the PV inverter voltage control loop S50.

S29, S31: Phase angle of Oscillator Voltage: Internal oscillator generates a saw tooth waveform varying from values zero to $2\pi$ for the internal phase angle. During changeover from grid-connected mode to standalone mode, the last value of phase angle is stored (S31) and added to the value of saw tooth waveform for smooth transition.

S32: Module NOT READY: When there is a fault in a basic building block of the cascaded H-bridge or if the PV voltage and battery SOC are less than minimum limits, then the module is declared as NOT READY and that particular module is bypassed. Charging of the battery is still possible if the module is not faulty but the SOC is less than minimum value.

S40: Inverter voltage controls in standalone mode:

S42, S43: The voltage control loop is enabled and the AC breaker is turned OFF.

S44, S45: The internal oscillator generates a phase angle and the inverter voltage reference V_Inv_Ref signal is generated in the controller. V_Inv_Ref is compared with the actual inverter voltage and the error signal is given to a PI controller to generate carrier signals.

S46: The PI controller generates modulating signals as an output. Based on the number of healthy H-bridge modules, the carrier signals are generated and compared with the modulating signal to generate gate pulses for cascaded H-bridge inverter.

S47: Gate pulses are released to the CHB based PV inverter through the voltage controller.

S60: The system checks for a STOP command. If there is a STOP command, the process returns to process start S26.

S61: If there is no STOP command, the system checks whether it is possible to reconnect to the grid. If NO, then the process returns to S44. If YES, then the process returns to the grid connected mode of operation, S3.

If the system is not in grid connected mode as determined at S28, the process flows to enable the PV-inverter voltage control loop S30 to start the MPPT controls S50. Power flowing through all the H-bridge modules is equal in the standalone mode of operation. DC power through an H-bridge module is supplied from the corresponding PV array and/or from the battery. Since the power through the inverter completely depends on the load requirement, current control is not possible. Therefore, the maximum power point of the PV array is carried out through the battery charger controls at the module level.

S51: Initialization of the reference battery current: In the standalone mode, the first priority of the system is to provide power to the local load and the remaining power from the PV array is used for charging the battery. If the PV array is not able to generate sufficient power required by the load (is faulty), the battery must provide the required power to the load. Hence the maximum power point of PV array can be controlled simply by controlling the battery current (Ibatt_MPP) in steps of 2 amps (S52). The initial value of Ibatt_MPP is adjusted to 2 amps.

S52, S53: When PV voltage is less than battery voltage: Initially, during the night or when the irradiance on the PV array is very poor, the PV array voltage will be less than or equal to the battery voltage and power to the load can be supplied only from the battery. In this case, the gate pulses for the battery charger are blocked.

S54 (NO), S55, S56: If the SOC of the battery is less than minimum battery SOC (S55, NO), then the module is not ready for transferring power and the module Not READY signal (S56) is given to the controller. If the SOC of the battery is greater than the minimum battery SOC (S55, YES), then the complete load current is supplied from the battery. The gate pulses for the battery charger are blocked (S56) since the battery is supplying current, not charging.

S54 (YES): The PV voltage is greater than the battery voltage: Once the irradiance starts increasing, the PV array will be able to supply power to the battery and/or to the load. The amount of the power that can be transferred depends on the irradiance on PV array.

Initially during early hours of the day, irradiance increases and the voltage of PV array reaches its open circuit voltage. Since the PV array voltage is greater than the battery voltage, the battery charger controls are enabled.

S58: Controls on buck-chopper based battery charger: The buck-chopper is controlled only in charging mode of operation, when the PV array voltage is greater than the battery voltage. The charging current reference ($I_{batt\_SOC}$) for buck-chopper is obtained from the battery SOC.

S59(NO), S62: Latest value of charging current reference (Ibatt_MPP) is compared with Ibatt_SOC and whichever is minimum is given as the reference current ($I_{batt\_Ref}$).

S56: If the reference battery current is negative, then the gate pulse for the buck-chopper are blocked.

S59(YES), S62(YES), S63: If the reference battery current is positive, then the gate pulses for buck-chopper are generated through current controller. The PV voltage and PV current are monitored for the MPPT and the latest value of Ibatt$_{MPP}$ is updated.

S58, S59(YES): Controls on bi-directional chopper based battery charger: Since the current through the bi-directional chopper can be regulated in both the directions, charging and discharging current is regulated based on the battery SOC. The charge/discharge current reference for chopper is obtained from the battery SOC. The current value of the charging current reference ($I_{batt\_MPP}$) is compared with $I_{batt\_SOC}$ and the minimum value is set as the reference current ($I_{batt\_Ref}$).

S63: The current controller is enabled to regulate the battery current and the gate pulses for bi-directional chopper are released.

S64: The PV voltage and PV current are monitored and through the MPPT the latest value of $I_{batt\_MPP}$ is updated. The maximum power point tracking (MPPT) is carried out in the module level by increasing/decreasing the value of $I_{batt\_MPP}$.

S65, S66: The flow repeats until the controller receives a STOP command or when there is a transfer of mode from standalone to grid-connected operation.

To validate the controls, a controller in loop simulation validation was designed. FIG. 16 illustrates a plant 1610 which includes a grid, input breaker, local load, cascaded H-bridge inverter, PV array, batteries and battery chargers were simulated in a real-time simulator 1640 and controller cards programmed with the algorithm of the present disclosure were interfaced with the simulated plant through I/O channels 1630 of the real-time simulator. A user interface 1620 included pushbuttons to provide start/stop commands and for mode selection. Potentiometers on the user interface were used for varying the irradiance value on PV arrays. The setup for the controller loop simulations is shown in FIG. 16 and the details of hardware used for controller in the loop simulations is explained in Table 5.

Due to the limitations in the analog input channels of the controller card used, two numbers of controller cards were used. In controller card-1, the controls for the inverter were programmed. It received the start command and mode selection from the user and received module faulty signals from the plant as digital inputs. Analog inputs such as grid voltage, inverter voltage and currents are received from the simulated plant.

Controller card-2 received analog inputs such as voltage, current signals of battery and PV arrays from the plant. Based on the mode of operation, MPPT was carried out. Battery charger controls were programmed in this controller card. When system was in grid-connected mode, based on MPPT of PV arrays, the reference power signal was communicated to the controller card-1 through a serial communication interface (SCI). Transmission of data was through the RS232 protocol. The control algorithm in the processor cards was programmed through a Matlab embedded coder.

Initially the plant was simulated, compiled and run in the high speed processors of the real time simulator. The controller card input/output (I/O) channels were connected to the corresponding I/O channels of the simulator. When the start command was given, the controller processed the algorithm to control the battery chargers and the cascaded H-bridge inverter. Table 5 shows the hardware details for the real-time simulation. However, the system of the present disclosure is not limited to the values or equipment shown in Table 5 which is presented as a non-limiting example.

TABLE 5

Hardware details of the Real-Time Simulation setup

| Electrical parameter | Value |
| --- | --- |
| Real Time Simulator | |
| Manufacturer Name | Opal RT |
| Processor | Intel Xeon Quad core, 2.5 GHz |
| Modeling platform | Matlab-Simulink |
| I/O channels of Real Time Simulator | |
| Analog Channels Voltage range | −10 V to +10 V |
| Digital Channels Voltage range | 0 V: Logic Low, +15 V: Logic High |
| Controller Cards 1 & 2 | |
| DSP Processor | TI Make TMS320F2812 |
| Analog Input (AI) Channels Voltage range | −7.5 V to +7.5 V |
| Digital Input Channels Voltage range | 0 V: Logic Low, +15 V: Logic High |
| Digital Output Channels Voltage range | 0 V: Logic Low, +15 V: Logic High |
| Number of Analog Input Channels | 16 |
| Number of Digital Input Channels | 8 |
| Number of Digital Output | 22 (Including PWM outputs) |
| User Interface | |
| Potentiometers | To provide variable voltage to AI channels |
| Pushbuttons | To provide Digital inputs |

FIG. 16 shows the control algorithm and controller in the loop simulation setup which is suited to both buck-chopper and bi-directional chopper based ESS configurations is described below. Real time simulation results for these systems are presented to validate the control algorithm, to explain the operation of the system and to observe the steady state and transient state responses.

Controller loop simulations were performed to validate the control algorithm and the results are presented below.

Figure 17:
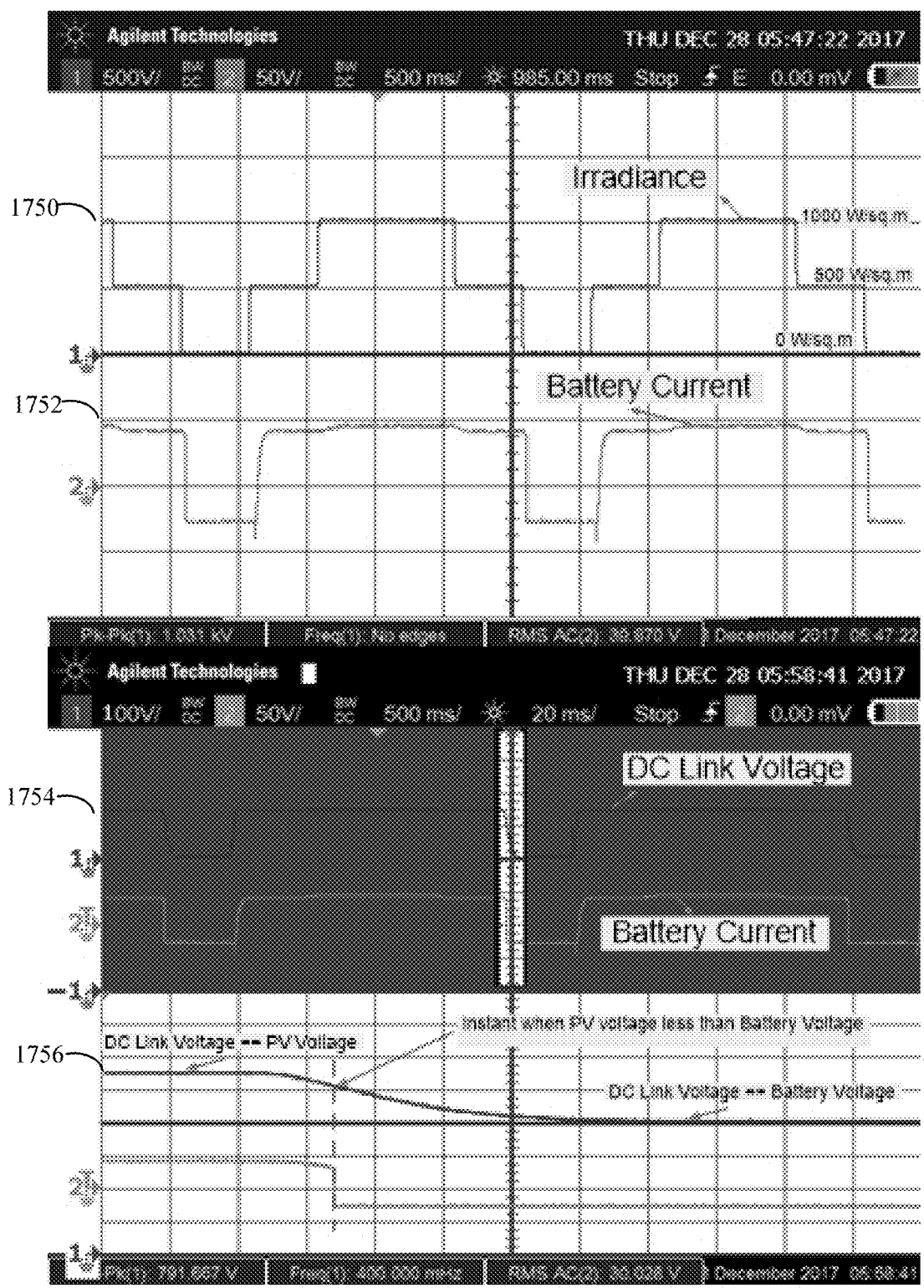
FIG. 17 illustrates the steady state and transient response of battery current with changes in irradiance value.

As shown in FIG. 17, initially the buck-chopper based ESS system was operated in the grid-connected mode. Irradiance (curve 1750) on the PV arrays was varied from 1000 W/m$^2$ to zero W/m$^2$ in steps of 500 W/m$^2$ and the response of the battery current and the PV voltage were observed. When the irradiance was high, the battery current (curve 1752) was positive and when the irradiance dropped to zero, the PV voltage tended to zero (curve 1756) and hence the DC link (curve 1754) clamped to the battery voltage and the battery started discharging. Therefore, the battery current was negative. The dynamic response of the battery current during sudden changes in irradiance was also satisfactory.

Figure 18:
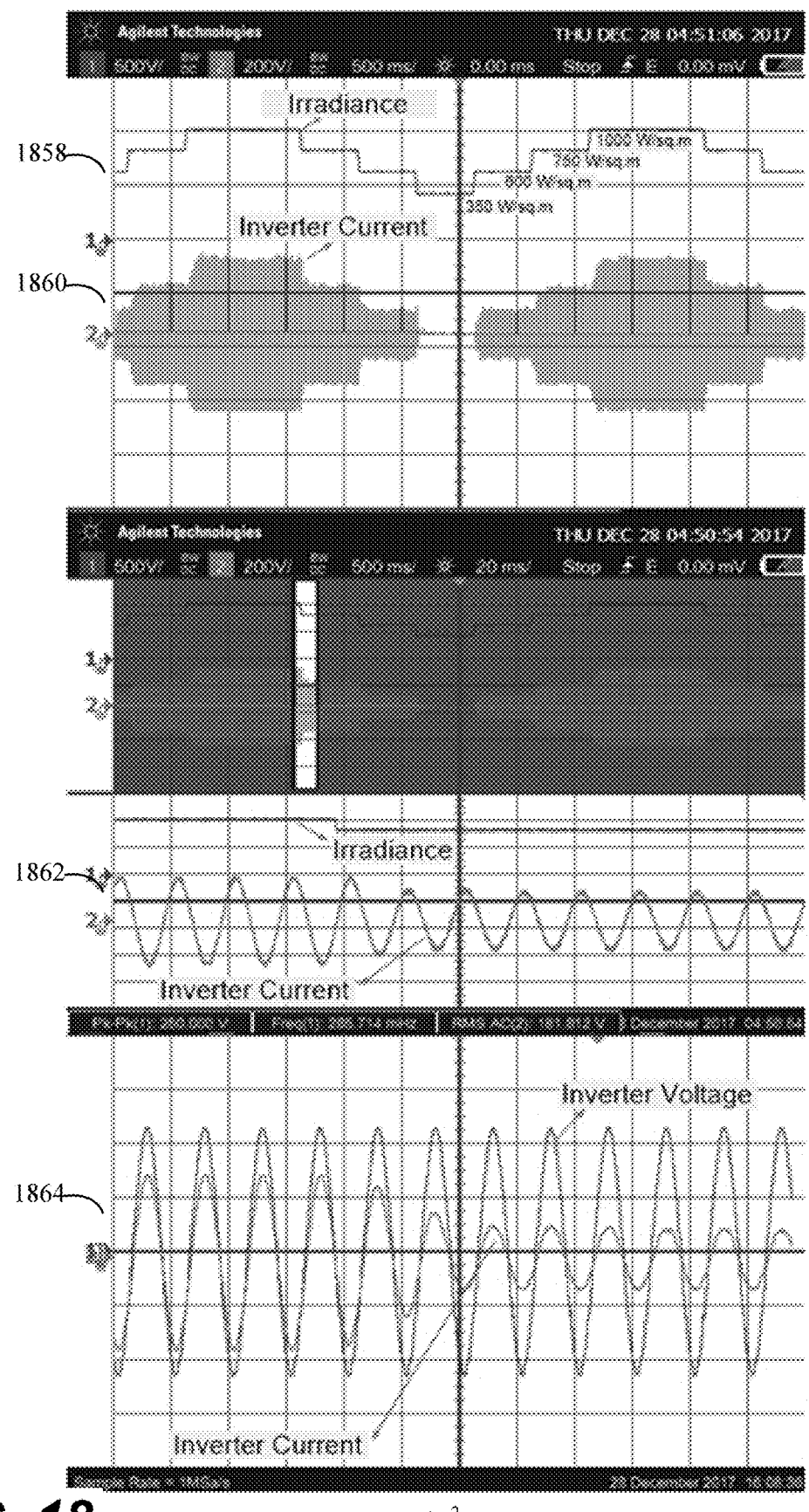
FIG. 18 illustrates the steady state and transient response of inverter current with changes in irradiance value.

As shown in FIG. 18, irradiance (curve 1858) on the PV arrays was varied from 1000 W/sq.m to 350 W/m$^2$ in steps and the inverter current (curve 1860) was observed. In grid-connected mode, the battery charging current was provided by PV array and the remaining power was supplied to the grid through the PV inverter. Therefore, the current through the inverter reduced with the reduction in irradiance. When irradiance was 350 W/m$^2$, the power available at PV was less than the power required for the battery charging. Hence the inverter current (curve 1862) was zero as shown in FIG. 18. Curve 1864 illustrates that the inverter output voltage and current were in phase with each other and the dynamic response was also satisfactory during sudden changes in irradiance input.

Figure 19:
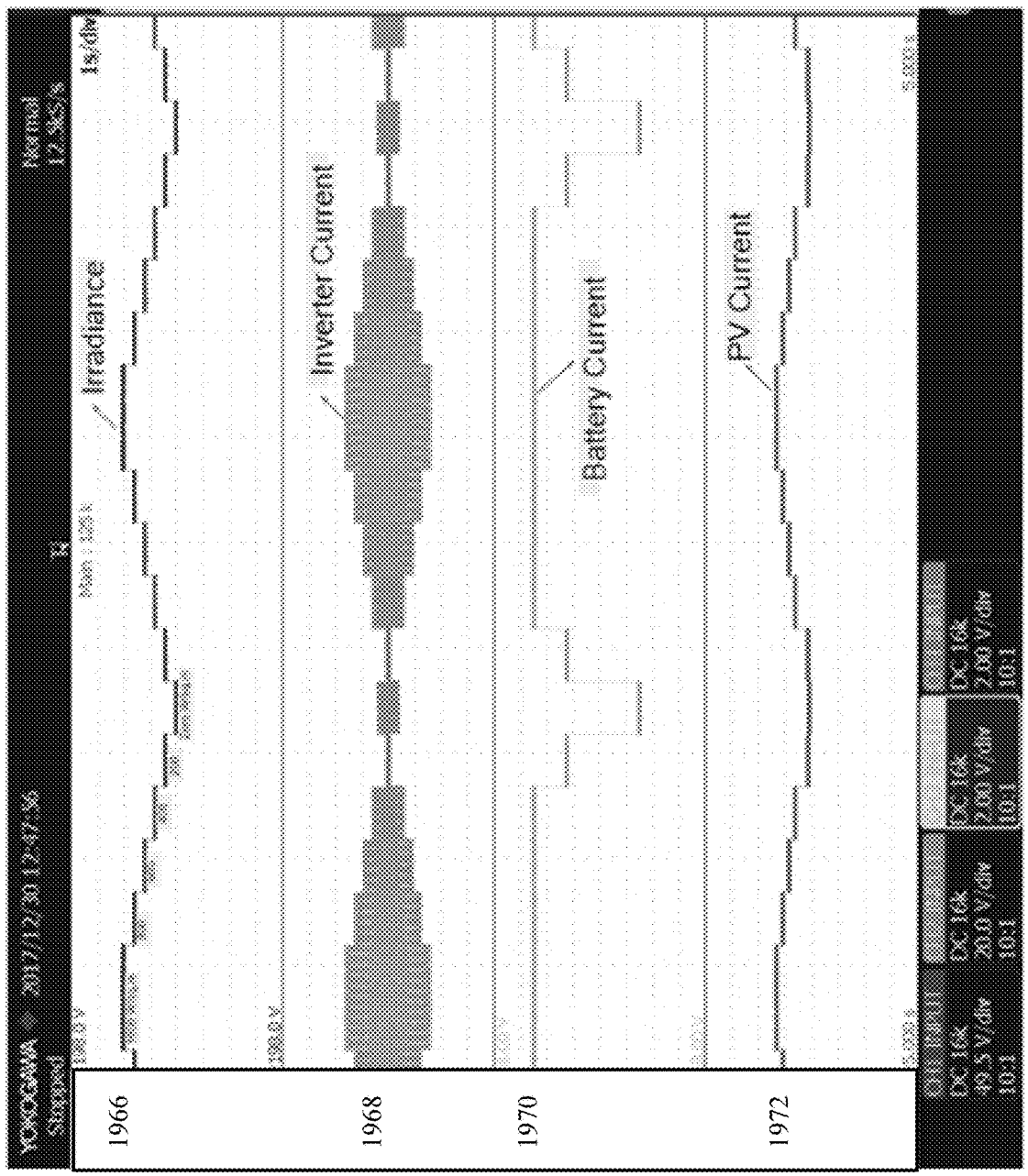
FIG. 19 illustrates the steady state and transient response of inverter current, battery current and PV current with change in the irradiance value.

As shown in FIG. 19, irradiance (curve 1966) on the PV arrays was varied from 1000 W/m$^2$ to zero W/m$^2$ in steps of 200 W/m$^2$ and the currents of the inverter output (curve 1968), the battery (curve 1970) and the PV array (curve 1972) were observed. As discussed above, when the irradiance is zero, the battery will be in discharging mode hence the battery current was negative. The inverter power is equal to the rated battery power and the PV current was zero. MPP tracking was performed in the inverter controls, thus the inverter current and the PV currents varied in proportion to the irradiance inputs, whereas the battery current was almost constant.

Figure 20:
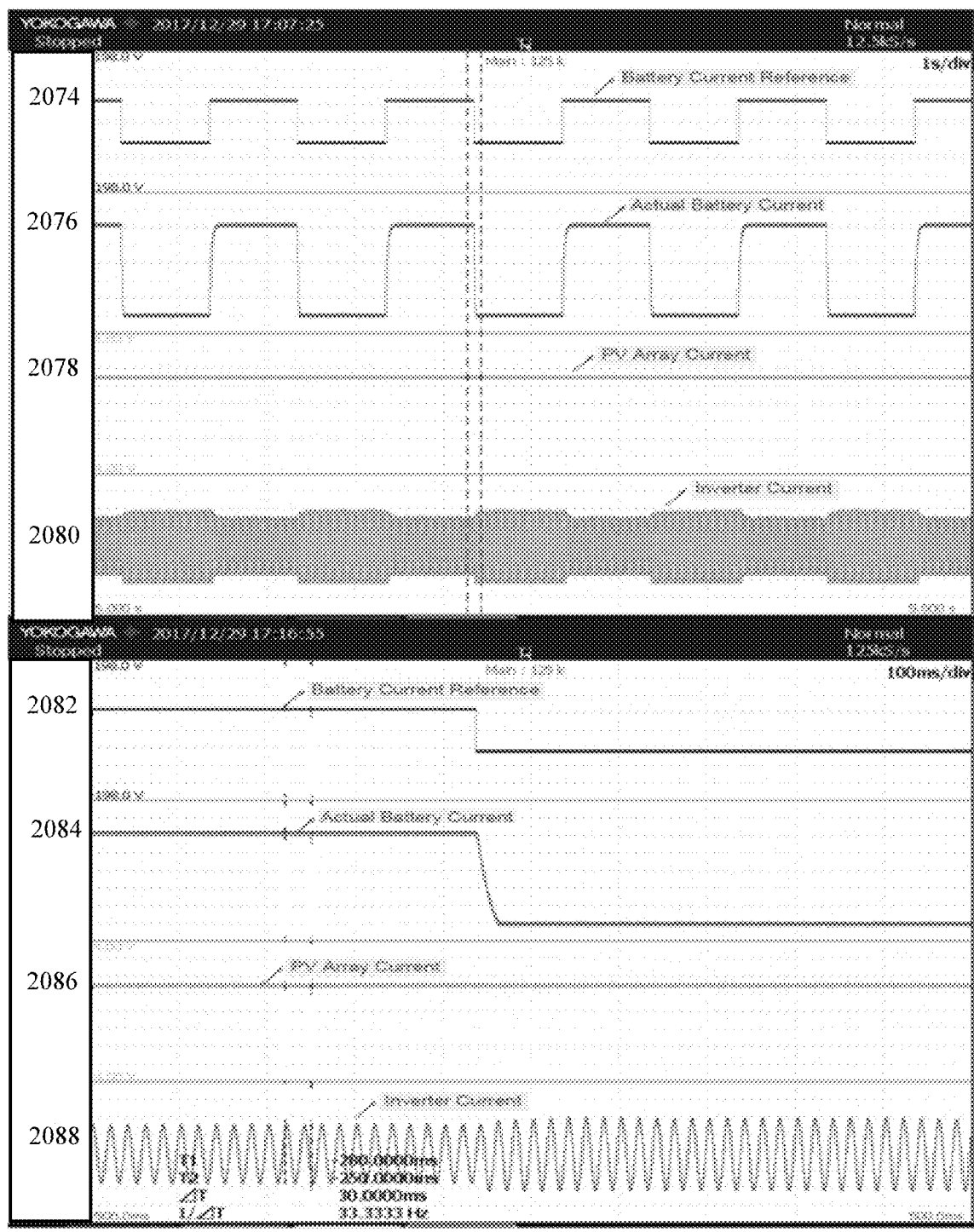
FIG. 20 illustrates the change in battery, PV array and actual inverter currents with change in reference battery current at a constant irradiance of 1000 W/m$^2$ in a bi-directional chopper based ESS.

As shown in FIG. 20, in grid connected mode, the operation of the buck-chopper and the bi-directional hopper based ESS configurations were identical. The only advantage with the bi-directional chopper based system was the ability of the battery to discharge even when the PV array is active, which is advantageous when the load requires a higher current. Response of the inverter current was observed by varying the battery reference current 2074 from +50 ampere to −50 ampere at each 1 second time. Irradiance was maintained constant at 1000 W/m$^2$, thus the PV array current 2078 was constant. The battery operated in charge mode and discharge modes intermittently. When the battery current was negative and additional current was flowing through inverter, the dynamic response 2088 of the system in this condition was also found to be satisfactory.

Figure 21A:
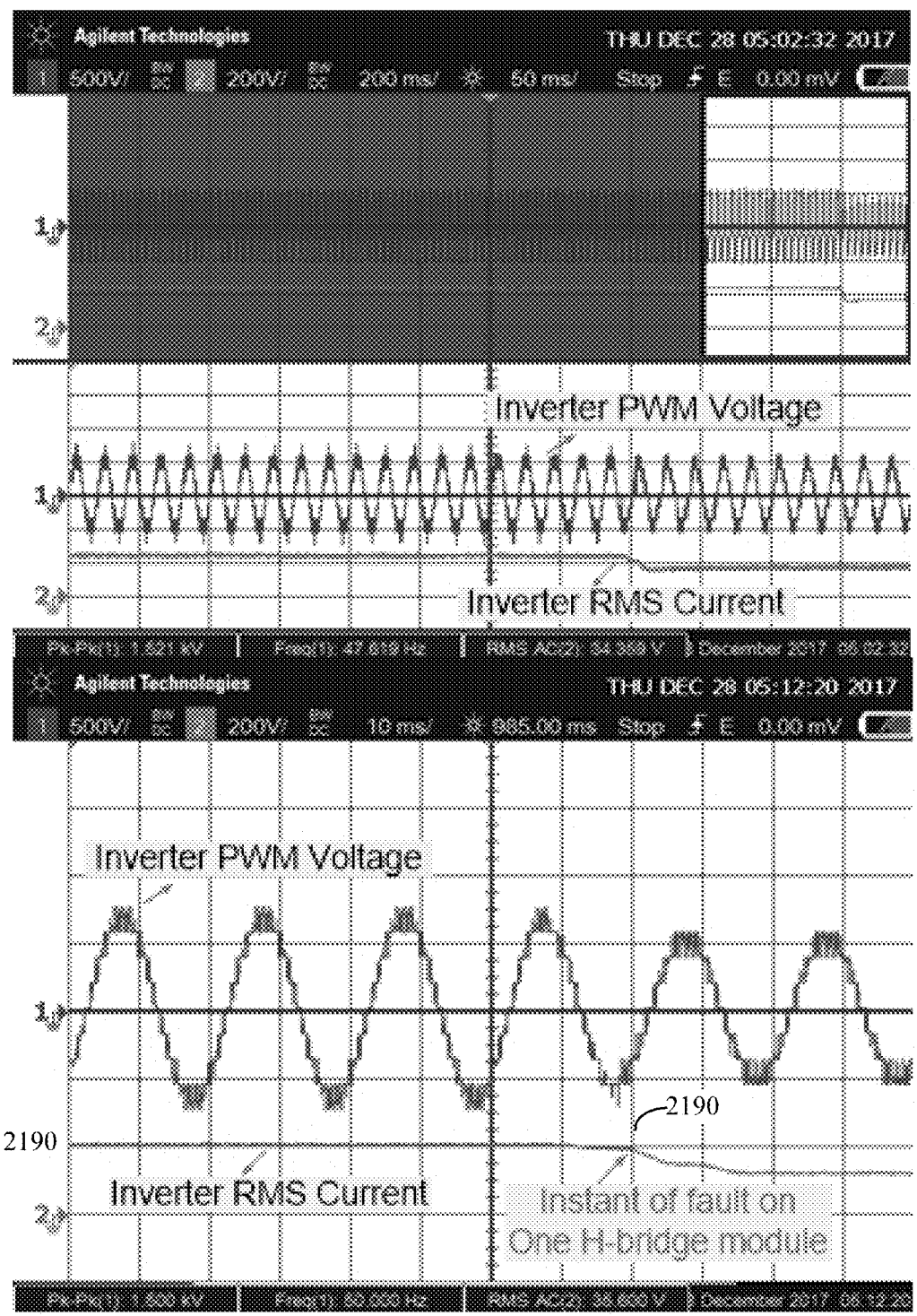
FIGS. 21A-21B illustrate (A) inverter PWM voltage and RMS current during faults in one H-bridge module, (B) grid voltage, internal oscillator voltage and inverter output voltage during change over from grid-connected to standalone mode.

As shown in FIG. 21A, a fault 2190 on an H-bridge module was created to check the performance of the system. The system continued to operate with reduced power.

Figure 21B:
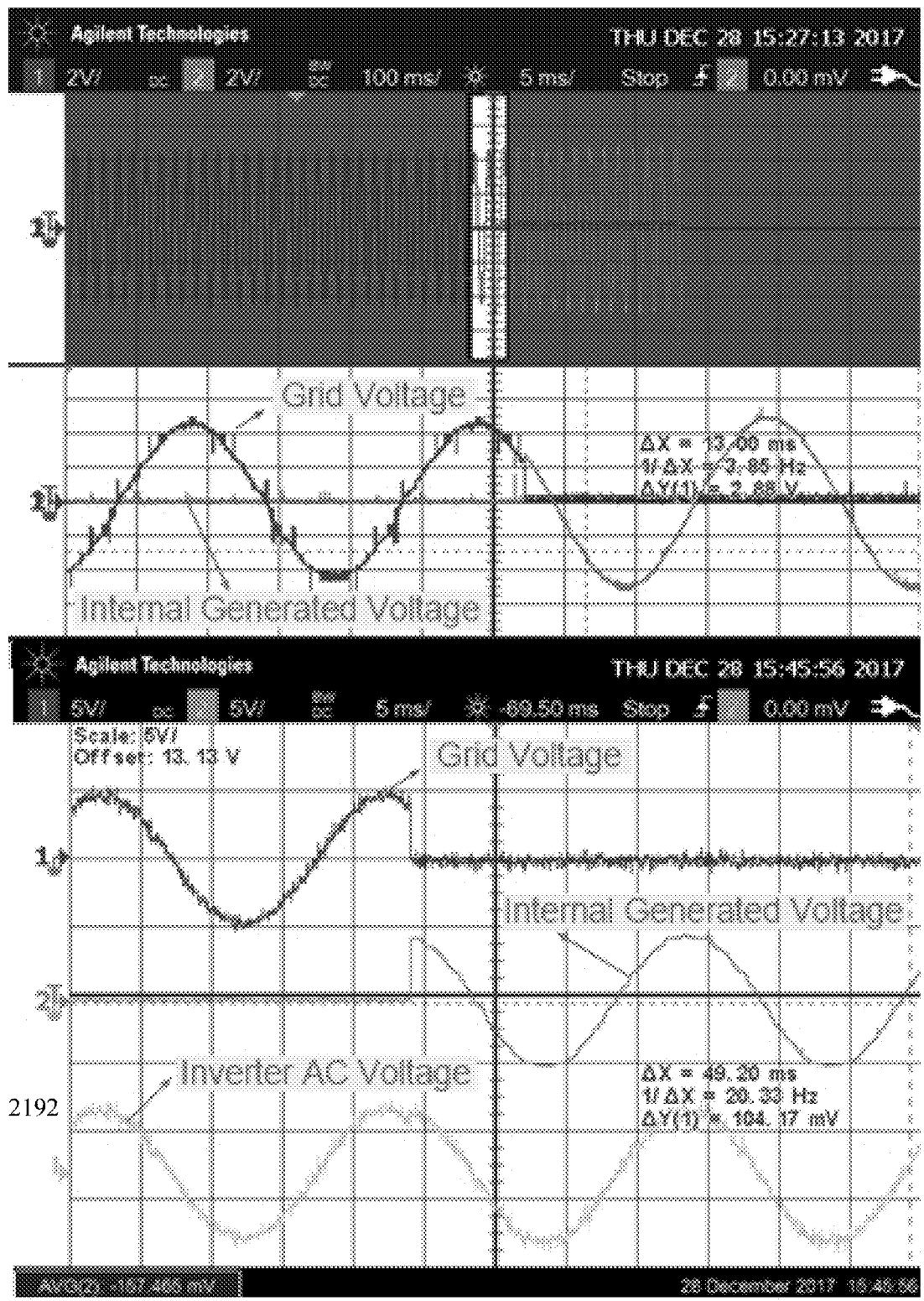

The mode of operation changed from grid-connected to standalone operation and transients in the inverter AC voltage, i.e. input voltage to the load, were observed. Smooth transition in the inverter voltage 2192 was observed during mode transfer as shown in FIG. 21B.

Figure 22A:
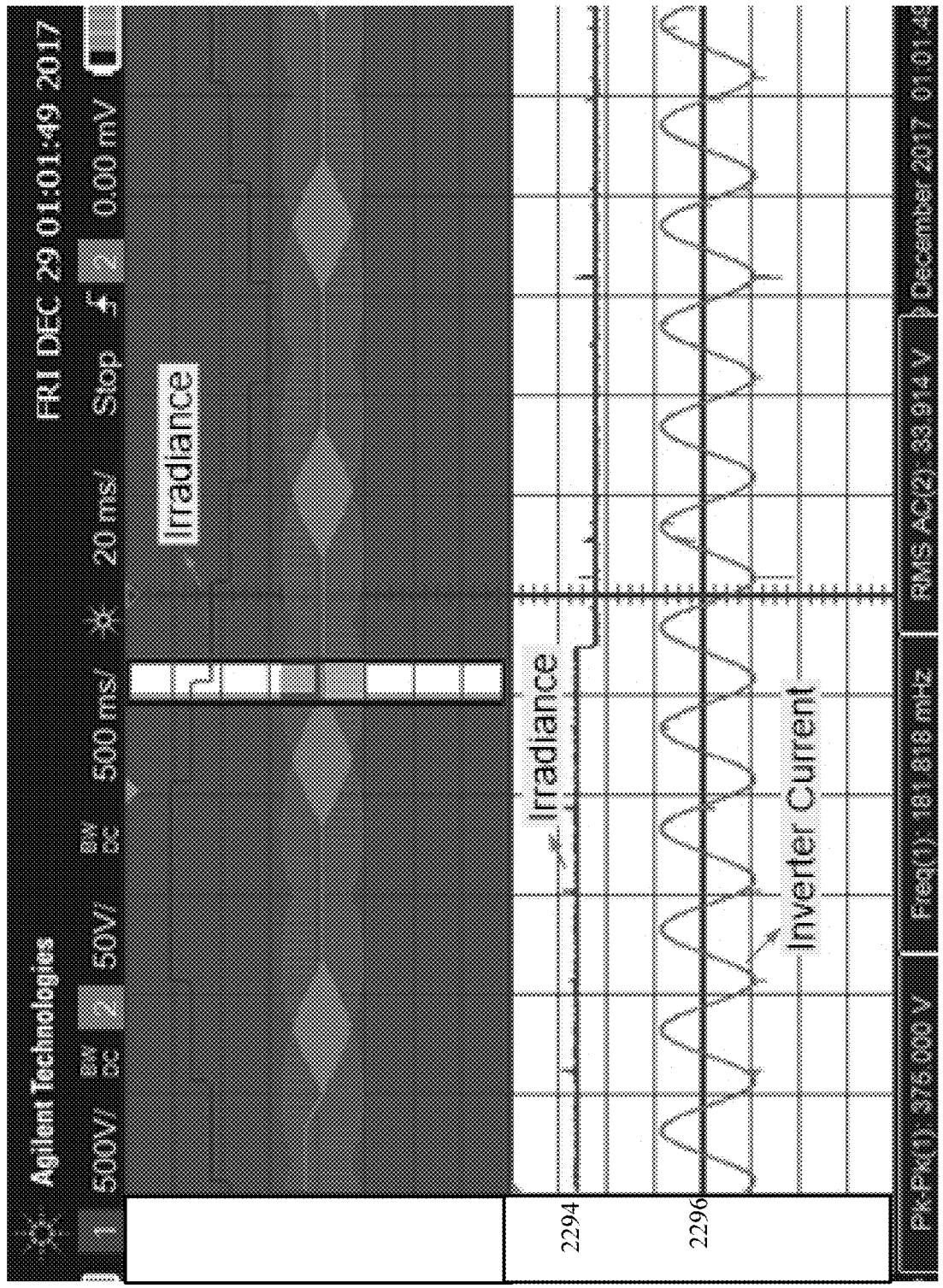
FIGS. 22A-22C illustrate (A) the change in inverter current with change in irradiance, (B) the change in battery current with change in irradiance, (C) the change in inverter PWM voltage with change in irradiance in standalone mode of operation of a buck-chopper based ESS.
Figure 22B:
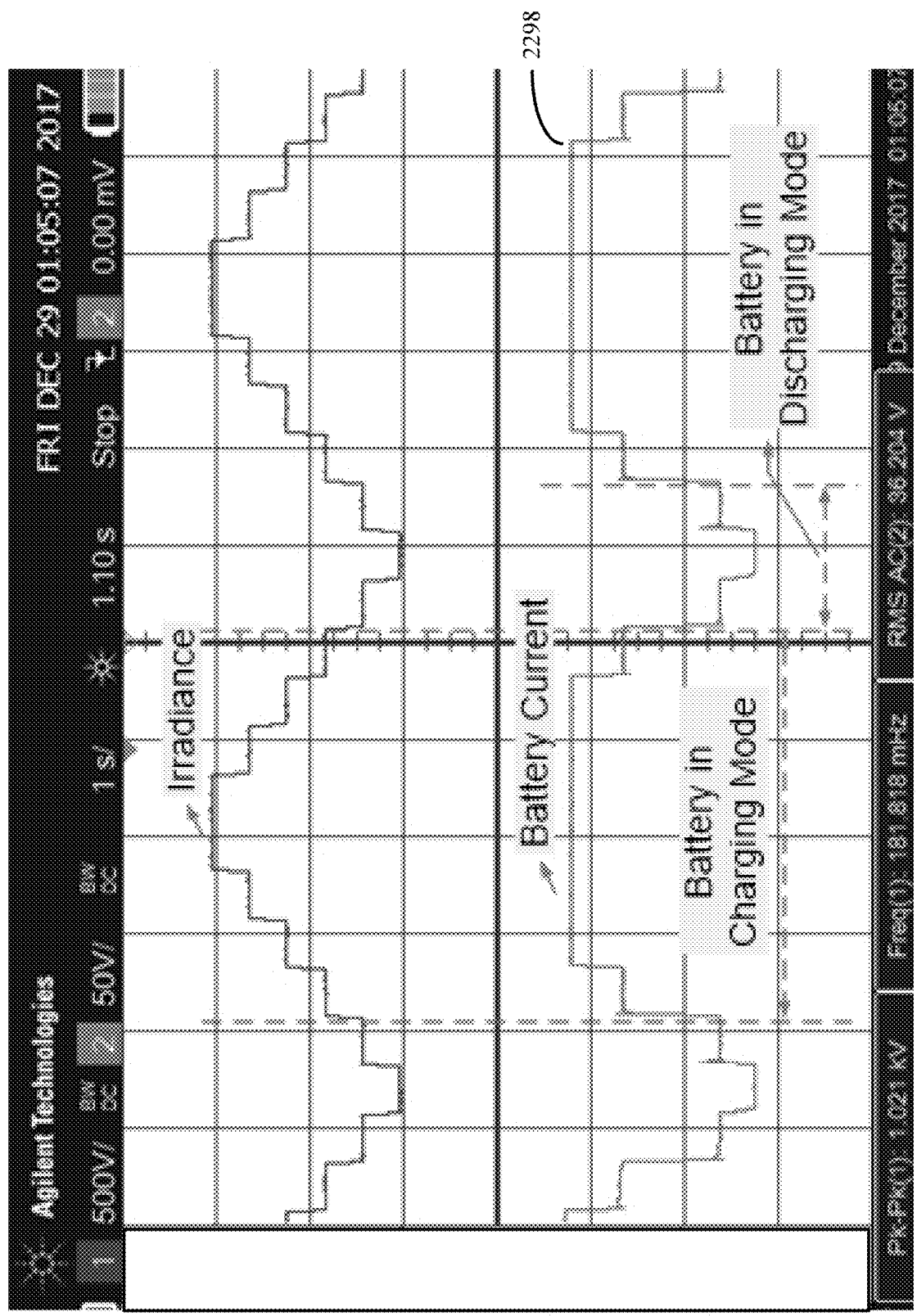
Figure 22C:
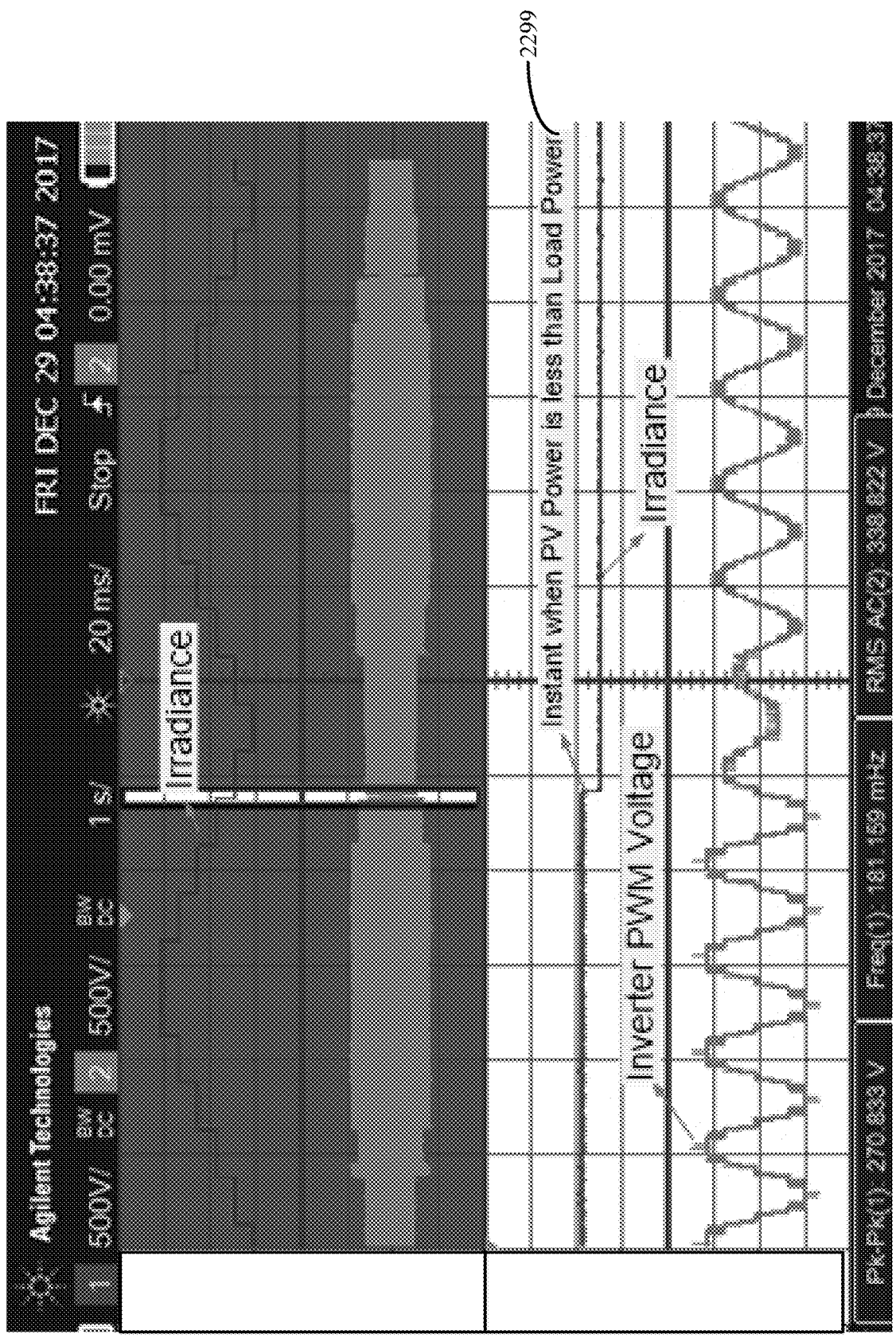

The mode of operation was changed from grid-connected to standalone mode for a buck-chopper based system. Operation of the system for a fixed load was simulated by varying the irradiance value from 1000 to zero W/m$^2$ in steps of 200 W/m$^2$. In standalone mode, when the load was fixed, the inverter current 2296 was constant for all values of irradiance input 2294 as shown in FIG. 22A. MPP tracking was carried out in battery charger controls, hence the battery current varied with the irradiance value. At the instant when the PV array power was less than the load requirement (2299), the battery started discharging (2198) and the battery current became negative as shown in FIG. 22B. At this instant the DC link voltage was clamped to the battery voltage level. Hence the voltage step in inverter PWM voltage reduced at this instant as shown in FIG. 22C.

Figure 23:
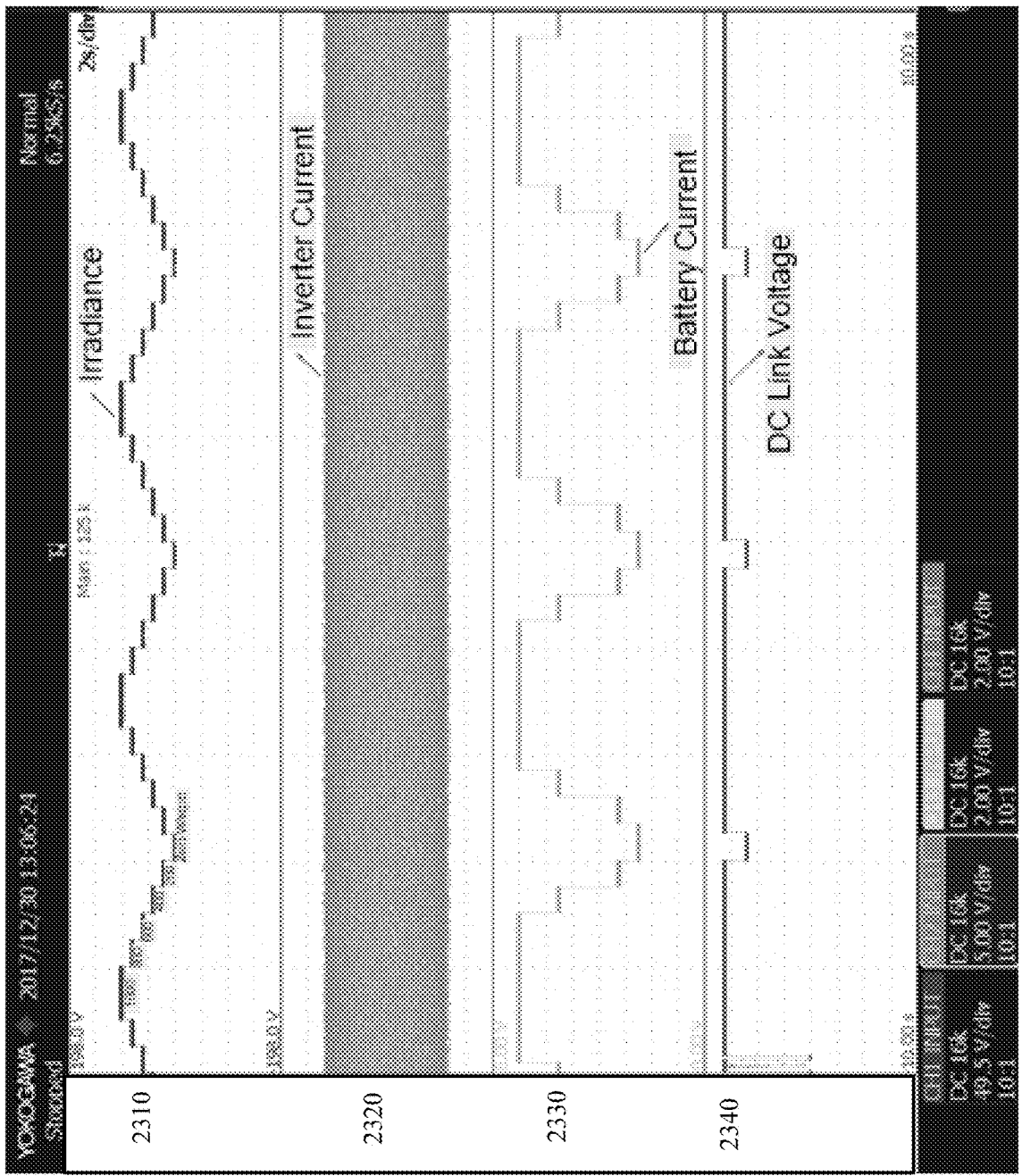
FIG. 23 illustrates the change in battery current, inverter current and DC link voltages with change in irradiance when the bi-directional chopper based ESS is in standalone mode operation.

The mode of operation was changed from grid-connected to standalone mode for a bi-directional chopper based system as shown in FIG. 23. Operation of the system for a fixed load was studied by varying the irradiance values 2310 from 1000 to zero W/m$^2$ in steps of 200 W/m$^2$. Since the load was fixed, the inverter current 2320 was constant for all the values of irradiance inputs. MPP tracking was carried out in battery charger controls hence the battery current 2330 varied with the irradiance value. At the instant when the PV array power was less than the load requirement, the battery started discharging through current control and the DC link voltage 2340 was equal to the PV array MPP voltage. When the irradiance value became zero, the PV array voltage tended to zero, hence the DC link voltage 2340 was clamped to the battery voltage level as shown in FIG. 23.

Through the real-time simulations, it was observed that good steady state and dynamic state responses were achieved by the control algorithm of the present disclosure. Power can be supplied to the grid/load without any interruption during mode change over and during occurrence of a fault on any H-bridge module.

Various configurations of energy saving systems for cascaded H-bridge inverters suitable for large scale PV applications have been described in the present disclosure. The advantages of the chopper based ESS configurations over other ESS configurations were demonstrated. Buck-chopper and bi-directional chopper based systems were compared and a generalized control algorithm was developed which is appropriate for both the configurations. The systems controls were analyzed with the help of a controller in loop simulations by using a real-time simulator. The cost, control complexity and controller hardware requirements for the buck-chopper based system were less than for the bi-directional chopper system. The buck-chopper based ESS configurations are more suited to grid-connected systems and the bi-directional chopper based ESS configuration is more appropriate in a standalone operation. The utilization factor of the PV power conditioning system shows improvement in this configuration and the dynamics of the system also improve under sudden changes in climatic conditions. With the buck chopper and bi-directional chopper configurations, power to the grid/load can be supplied without any interruption. Good power quality and better dV/dt is achieved as the inverter is of cascaded H-bridge configuration. The operation of these systems was described considering equal irradiances on each of the PV arrays. The state of charge of each battery bank was also considered to be equal.

Figure 24:
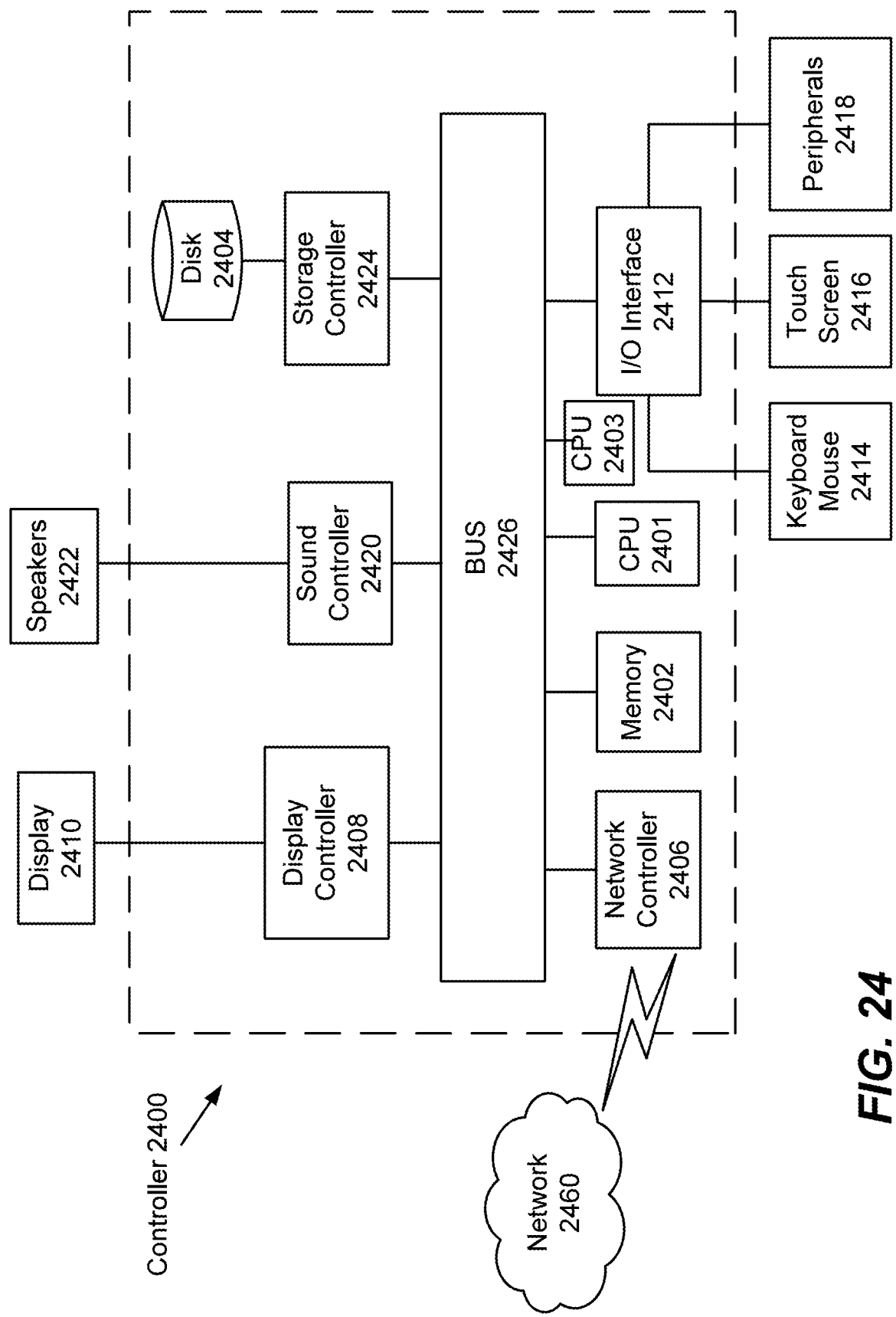
FIG. 24 is an illustration of a non-limiting example of details of computing hardware used in the computing system, according to certain embodiments.

Next, further details of the hardware description of the computing environment of FIG. 16 according to exemplary embodiments is described with reference to FIG. 24. In FIG. 24, a controller 2400 is described is representative of the controllers of the control system 800 of FIG. 8, the current control system 1000 and the simulated control system 1600 of FIG. 16 in which the controller 2400 is a computing device which includes a CPU 2401 which performs the processes described above/below. The process data and instructions may be stored in memory 2402. These processes and instructions may also be stored on a storage medium disk 2404 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 2401, 2403 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 2401 or CPU 2403 may be a Xenon or Core processor from Intel of America or an Opteron processor from AMD of America, or may be other processor types that would be recognized by one of ordinary skill in the art. Alternatively, the CPU 2401, 2403 may be implemented on an FPGA, ASIC, PLD or using discrete logic circuits, as one of ordinary skill in the art would recognize. Further, CPU 2401, 2403 may be implemented as multiple processors cooperatively working in parallel to perform the instructions of the inventive processes described above.

The computing device in FIG. 24 also includes a network controller 2406, such as an Intel Ethernet PRO network interface card from Intel Corporation of America, for interfacing with network 2460. As can be appreciated, the network 2460 can be a public network, such as the Internet, or a private network such as an LAN or WAN network, or any combination thereof and can also include PSTN or ISDN sub-networks. The network 2460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2408, such as a NVIDIA GeForce GTX or Quadro graphics adaptor from NVIDIA Corporation of America for interfacing with display 2410, such as a Hewlett Packard HPL2445w LCD monitor. A general purpose I/O interface 2412 interfaces with a keyboard and/or mouse 2414 as well as a touch screen panel 2416 on or separate from display 2410. General purpose I/O interface also connects to a variety of peripherals 2418 including printers and scanners, such as an OfficeJet or DeskJet from Hewlett Packard.

A sound controller 2420 is also provided in the computing device such as Sound Blaster X-Fi Titanium from Creative, to interface with speakers/microphone 2422 thereby providing sounds and/or music.

The general purpose storage controller 2424 connects the storage medium disk 2404 with communication bus 2426, which may be an ISA, EISA, VESA, PCI, or similar, for interconnecting all of the components of the computing device. A description of the general features and functionality of the display 2410, keyboard and/or mouse 2414, as well as the display controller 2408, storage controller 2424, network controller 2406, sound controller 2420, and general purpose I/O interface 2412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 25.

Figure 25:
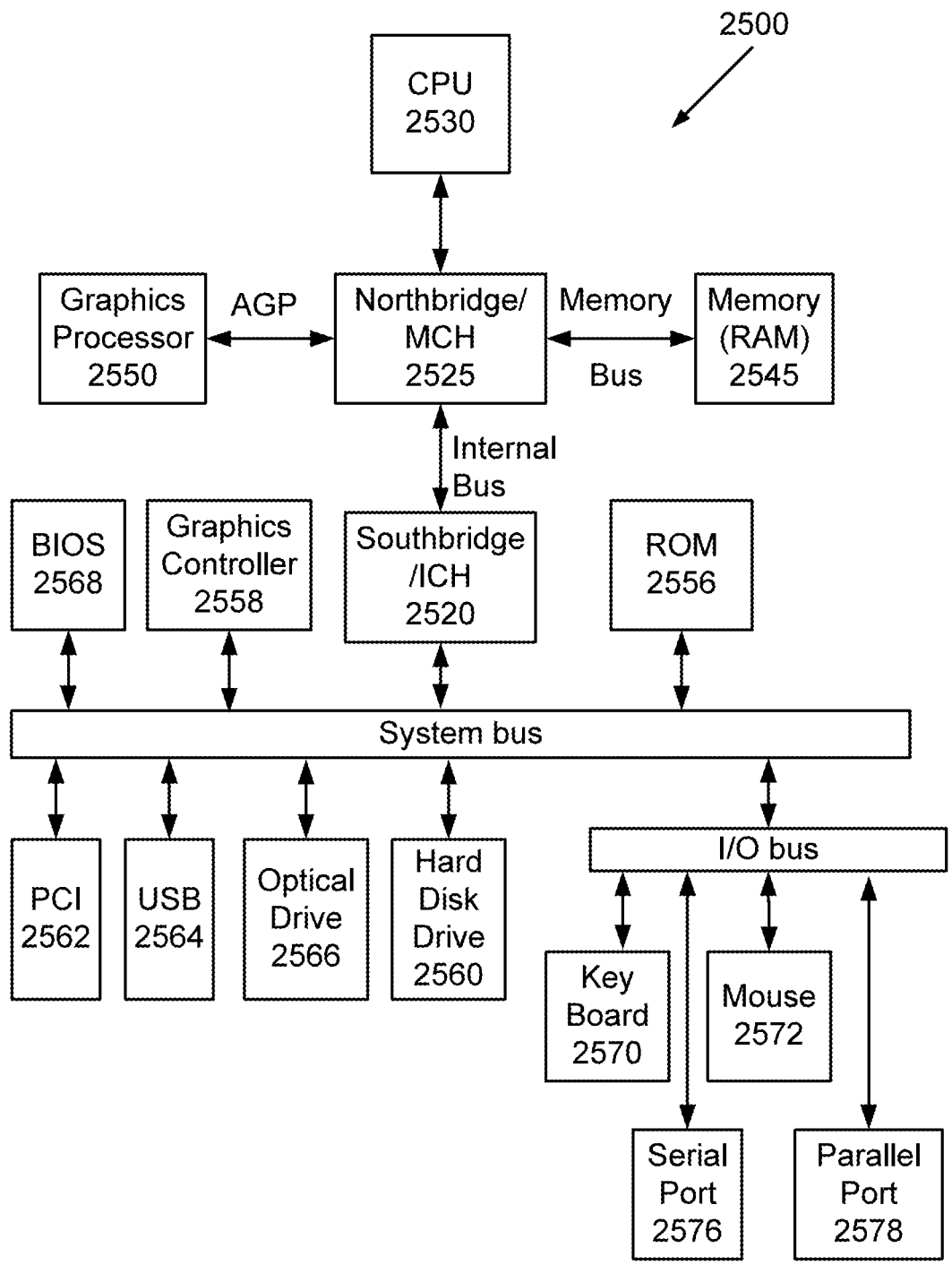
FIG. 25 is an exemplary schematic diagram of a data processing system used within the computing system, according to certain embodiments.

FIG. 25 shows a schematic diagram of a data processing system, according to certain embodiments, for performing the functions of the exemplary embodiments. The data processing system is an example of a computer in which code or instructions implementing the processes of the illustrative embodiments may be located.

In FIG. 25, data processing system 2500 employs a hub architecture including a north bridge and memory controller hub (NB/MCH) 2525 and a south bridge and input/output (I/O) controller hub (SB/ICH) 2520. The central processing unit (CPU) 2530 is connected to NB/MCH 2525. The NB/MCH 2525 also connects to the memory 2545 via a memory bus, and connects to the graphics processor 2550 via an accelerated graphics port (AGP). The NB/MCH 2525 also connects to the SB/ICH 2520 via an internal bus (e.g., a unified media interface or a direct media interface). The CPU Processing unit 2530 may contain one or more processors and even may be implemented using one or more heterogeneous processor systems.

Figure 26:
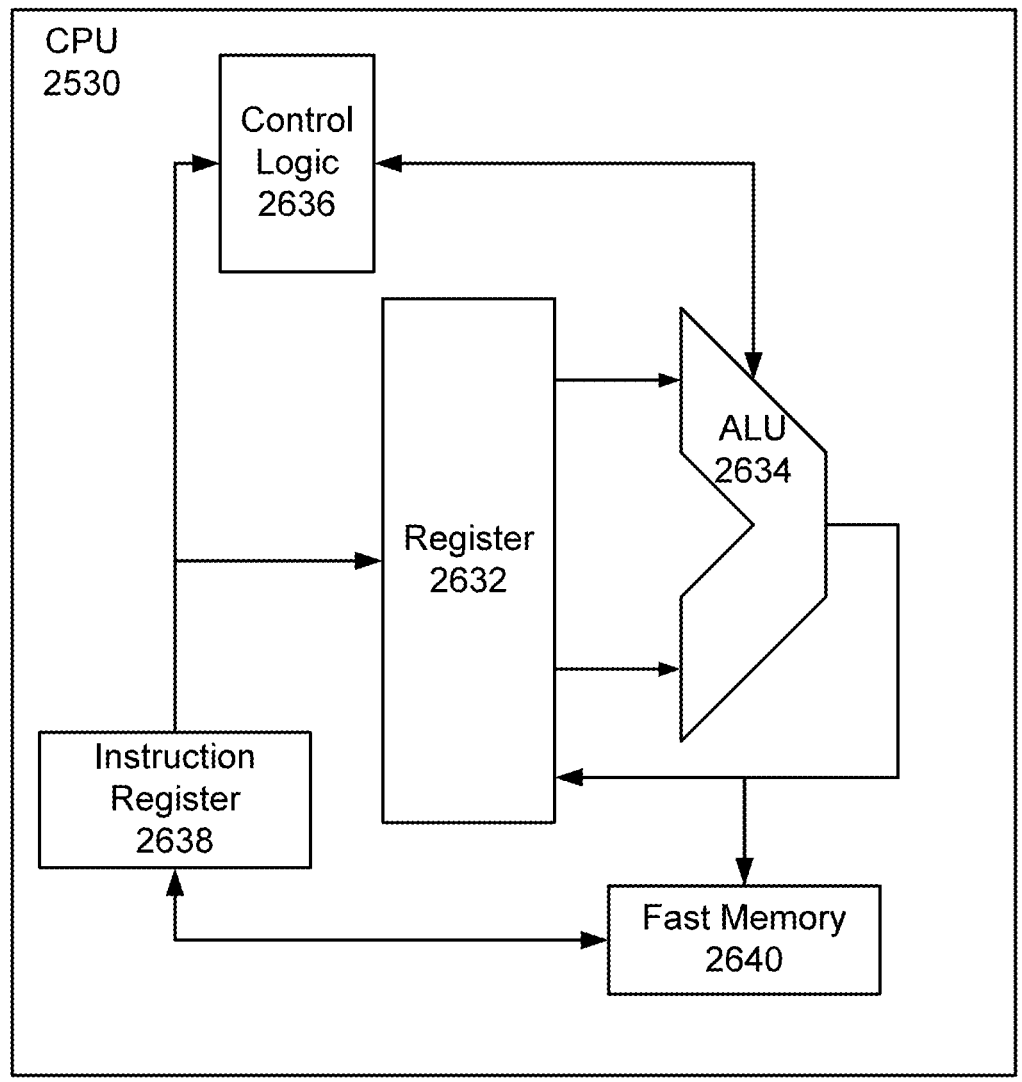
FIG. 26 is an exemplary schematic diagram of a processor used with the computing system, according to certain embodiments.

For example, FIG. 26 shows one implementation of CPU 2530. In one implementation, the instruction register 2638 retrieves instructions from the fast memory 2640. At least part of these instructions are fetched from the instruction register 2638 by the control logic 2636 and interpreted according to the instruction set architecture of the CPU 2530. Part of the instructions can also be directed to the register 2632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2634 that loads values from the register 2632 and performs logical and mathematical operations on the loaded values according to the instructions. The results from these operations can be feedback into the register and/or stored in the fast memory 2640. According to certain implementations, the instruction set architecture of the CPU 830 can use a reduced instruction set architecture, a complex instruction set architecture, a vector processor architecture, a very large instruction word architecture. Furthermore, the CPU 2530 can be based on the Von Neuman model or the Harvard model. The CPU 2530 can be a digital signal processor, an FPGA, an ASIC, a PLA, a PLD, or a CPLD. Further, the CPU 2530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 25, the data processing system 2500 can include that the SB/ICH 2520 is coupled through a system bus to an I/O Bus, a read only memory (ROM) 2556, universal serial bus (USB) port 2564, a flash binary input/output system (BIOS) 2568, and a graphics controller 2558. PCI/PCIe devices can also be coupled to SB/ICH 2588 through a PCI bus 2562.

The PCI devices may include, for example, Ethernet adapters, add-in cards, and PC cards for notebook computers. The hard disk drive 2560 and CD-ROM 2566 can use, for example, an integrated drive electronics (IDE) or serial advanced technology attachment (SATA) interface. In one implementation the I/O bus can include a super I/O (SIO) device.

Further, the hard disk drive (HDD) 2560 and optical drive 2566 can also be coupled to the SB/ICH 2520 through a system bus. In one implementation, a keyboard 2570, a mouse 2572, a parallel port 2578, and a serial port 2576 can be connected to the system bus through the I/O bus. Other peripherals and devices that can be connected to the SB/ICH 2520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 27:
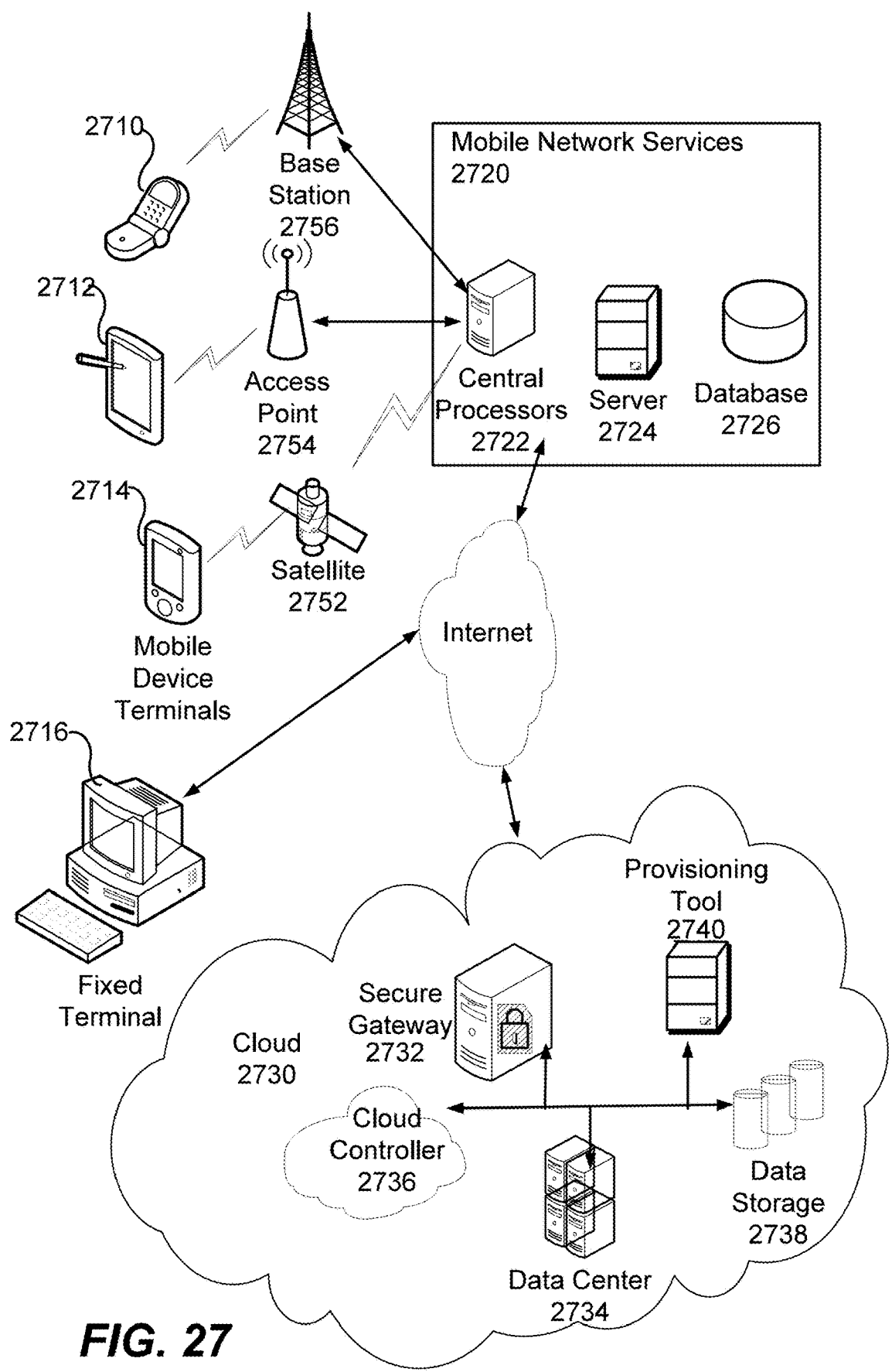
FIG. 27 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 27, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An energy control system for multilevel cascaded H-bridge inverters, comprising: a plurality of cascaded H-bridge inverter blocks, each cascaded H-bridge inverter block including: a photovoltaic array; a battery; a DC-DC converter in parallel with the battery, wherein the DC-DC converter is configured to charge the battery; a DC link operatively connected between the photovoltaic array and the DC-DC converter; an H-bridge inverter operatively connected to the DC link; a computing system including circuitry and at least one processor configured to provide control signals to each H-bridge inverter block to regulate a mode of operation of the energy control system, wherein the mode of operation is one of standalone mode and grid-connected mode; wherein each H-bridge inverter block includes four insulated-gate bipolar transistor (IGBT) inverter switches arranged in an H-bridge configuration, each inverter switch having a controllable gate, wherein each cascaded H-bridge inverter block is operatively connected to a bypass switch, each bypass switch including a controllable bipolar switch and two anti-parallel insulated-gate bipolar transistors (IGBT), each IGBT including a controllable gate; and an LCL filter operatively connected to the plurality of cascaded H-bridge inverter blocks; wherein each bypass switch in a block is configured to connect the H-bridge inverter in the block to the LCL filter; wherein the computing system is configured to generate first gate pulses to each inverter switch controllable gate to provide power to the bypass switch; and wherein the computing system is further configured to compare the power generated at each H-bridge inverter to a minimum power level and generate second gate pulses to actuate the controllable bipolar switch and each IGBT controllable gate switch of the bypass switch, based on the minimum power level, to connect or disconnect the H-bridge inverter to the LCL filter.

2. The energy control system of claim 1, wherein each photovoltaic array generates DC current; wherein each DC-DC converter includes at least one IGBT switch having a pulsed gate; wherein the computing system is configured to provide gate pulses to the at least one pulsed gate, causing the DC-DC converter to either provide current to charge the battery or to discharge the battery.

3. The energy control system of claim 2,
wherein the DC-DC converter is a bi-directional chopper including two IGBT switches, each having a controllable gate;
wherein the computing system further includes:
a closed loop current controller for grid connected mode, the closed loop current controller including:
a first enable input configured to receive a grid-connected mode signal from a user interface;
a maximum power point tracker, MPPT, configured to monitor voltage and current signals from each photovoltaic panel and generate power reference signals;
a first phase locked loop, PLL, configured to monitor a grid voltage and calculate phase angles;
an inverter current monitor configured to generate actual inverter current signals;
a current reference calculator configured to receive the power reference signals and the phase angles and generate inverter current reference signals;
a first comparator configured to compare the actual inverter current signals to the inverter current reference signals and generate current error signals;
a first proportional integral controller configured to integrate the current error signals and generate current modulating signals;
a closed loop voltage controller for standalone mode, the closed loop voltage controller including:
a second enable input configured to receive a standalone mode signal from one of a user interface and the closed loop current controller;
a second phase locked loop, PLL, including a memory, the second PLL configured to monitor grid voltages, calculate phase angles, store a current phase angle and generate a current phase angle signal;
an inverter voltage monitor configured to generate actual inverter voltage signals;
an oscillator configured to receive the current phase angle and generate a next phase angle signal;
a reference generator configured to receive the next phase angle signal and generate an inverter voltage reference signal;
a second comparator configured to compare the actual inverter voltage signals to the inverter voltage reference signals and generate voltage error signals;
a second proportional integral controller configured to integrate the voltage error signals and generate voltage modulating signals;
a healthy H-bridge monitor which monitors each H-bridge inverter of the plurality of cascaded H-bridges inverter blocks, calculates a number of the healthy blocks and generates a number of healthy H-bridges signal;
a gate pulse generator module which receives the current modulating signals, the voltage modulating signals and the number of healthy H-bridges signal, generates carrier waves, compares the carrier waves to the modulating signals, and generates gate pulses to the cascaded H-bridge inverters.

4. The energy control system of claim 3,
wherein the computing system receives the phase angle from the PLL, compares the phase angle to a reference phase angle and generates a standalone mode signal to the second enable input based on the comparison when the phase angle is not equal to the reference phase angle.

5. The energy control system of claim 3,
wherein the second enable signal is received from a user interface.

6. The energy control system of claim 4,
wherein the DC-DC converter is a unidirectional buck chopper including one IGBT switch;
wherein each photovoltaic array includes an MPPT circuit having an enable input for standalone mode, wherein the MPPT monitors the current and voltage values generated by the photovoltaic array, compares the voltage and current values to voltage and current reference values and generates a charging current control signal based on the comparison;
a state of charge (SOC) calculator operatively connected to the battery to receive battery current and voltage measurements, integrate the current and voltage measurements and generate a state of charge signal;
a current reference generator operatively connected to receive the charging current control signal and the state of charge signal, compare the charging current control signal and the state of charge signal, and generate a battery charging current reference based on the minimum of the charging current control signal and the state of charge signal;
a current controller which receives a battery actual current and the battery charging current reference and generates a gate pulse to the one IGBT switch to either charge the battery or discharge the battery.

7. A method for controlling energy in a multilevel cascaded H-bridge inverter connected to a plurality of renewable energy power generators, wherein the renewable energy power generators are any one of a wind generator, a photovoltaic (PV) generator and a wave power generator, comprising:
regulating, by a computing system including circuitry and at least one processor configured for generating control signals, a mode of operation of the energy control system, wherein the mode of operation is one of a standalone mode and a grid-connected mode;

generating, by each the plurality of renewable energy generators, electrical current and voltage;
monitoring, by the computing system, amplitudes of the electrical current and voltage;
connecting a DC-DC converter to each of the plurality of renewable energy generators,
connecting a battery to each DC-DC converter;
comparing, by the computing system, the amplitudes to reference electrical current and voltage amplitudes;
calculating, by the computing system, gate pulse signals based on the comparisons;
generating, by the computing system, the gate pulse signals;
switching, by the gate pulse signals, controllable gates of the DC-DC converter;
charging and discharging the battery based on the switching;
receiving an enable signal for a standalone mode of operation of the multilevel cascaded H-bridge inverter, wherein the DC-DC converter is a buck-chopper converter including an IGBT switch having a controllable gate;
monitoring, by a maximum power point tracker circuit, MPPT, the current and voltage values generated by the renewable energy generator;
comparing, by the MPPT, the voltage and current values to voltage and current reference values and generating a charging current control signal based on the comparison;
receiving, by a state of charge, SOC calculator, the battery current and voltage values;
integrating, by the SOC calculator, the current and voltage measurements;
generating, by the SOC calculator, a state of charge signal based on the integrating;
receiving, by a current reference generator, the charging current control signal and the state of charge signal;
comparing, by the current reference generator, the charging current control signal and the state of charge signal;
generating, by the current reference generator, a battery charging current reference based on the minimum of the charging current control signal and the state of charge signal;
receiving, by a current controller, a battery actual current and the battery charging current reference and generating a gate pulse to the controllable gate of the DC-DC converter to either charge the battery or discharge the battery.

8. The method of claim 7, further comprising
receiving the enable signal from a user input at a user interface.

9. The method of claim 7, further comprising:
receiving, from a user input at a user interface, an enable signal for a grid-connected mode of operation of the multilevel cascaded H-bridge inverter, wherein each DC-DC converter is a bi-directional converter including two IGBT switches, each having a controllable gate;
monitoring, by a maximum power point tracker, MPPT, voltage and current signals from each renewable energy power generator and generating power reference signals;
monitoring a grid voltage, by a first phase locked loop, PLL, and calculating phase angles;
generating, by an inverter current monitor, actual inverter current signals;
receiving, by a current reference calculator, the power reference signals and the phase angles and generating inverter current reference signals;
comparing, by a first comparator, the actual inverter current signals to the inverter current reference signals and generating current error signals;
integrating, by a first proportional integral controller, the current error signals and generating current modulating signals;
receiving, at a second enable input, a standalone mode signal from one of a user interface and the MPPT;
monitoring grid voltages, by a second phase locked loop including a memory, and calculating phase angles, storing a current phase angle and generating a current phase angle signal;
generating, by an inverter voltage monitor, actual inverter voltage signals;
receiving, by an oscillator, the current phase angle and generating a next phase angle signal;
receiving, by a reference generator, the next phase angle signal and generating an inverter voltage reference signal;
comparing, by a second comparator, the actual inverter voltage signals to the inverter voltage reference signals and generating voltage error signals;
integrating, by a second proportional integral controller, the voltage error signals and generating voltage modulating signals;
monitoring, by a healthy H-bridge monitor, each H-bridge inverter of the multilevel cascaded H-bridge inverter, and calculating a number of healthy blocks and generating a number of healthy H-bridges signal;
receiving, by a gate pulse generator module, the current modulating signals, the voltage modulating signals and the number of healthy H-bridges signal, and generating carrier waves, comparing the carrier waves to the modulating signals, and generating gate pulses to the cascaded H-bridge inverters.

10. The method of claim 9, further comprising:
monitoring, by the first phase locked loop, grid voltages and phase angles;
comparing, by the current reference generator, the grid voltages and phase angles to reference grid voltages and phase angles;
generating, by the computing system, a grid fault signal when the grid voltages and phase angles do not equal the reference grid voltages and phase angles;
providing, by the computing system, a standalone mode enable signal based on the grid fault signal.

11. The method of claim 9, further comprising:
receiving a first gate pulse signal at a first IGBT controllable gate of each bi-directional converter;
charging the battery based on the first gate pulse signal;
receiving a second gate pulse signal at a second IGBT controllable gate of each bi-directional converter;
discharging the battery based on the second gate pulse signal.

12. A non-transitory computer readable medium having instructions stored therein that, when executed by one or more processors, cause the one or more processors to perform a method for controlling energy in a multilevel cascaded H-bridge inverter connected to a plurality of photovoltaic arrays, comprising:
regulating, by a computing system including circuitry and at least one processor configured for generating control signals, a mode of operation of the energy control system, wherein the mode of operation is one of a standalone mode and a grid-connected mode, generating, by each the plurality of photovoltaic arrays, electrical current and voltage;

monitoring, by the computing system, amplitudes of the electrical current and voltage;

connecting a DC-DC converter to each of the plurality of photovoltaic arrays;

connecting a battery to each DC-DC converter;

comparing, by the computing system, the amplitudes to reference electrical current and voltage amplitudes;

calculating, by the computing system, gate pulse signals based on the comparisons;

generating, by the computing system, the gate pulse signals;

switching, by the gate pulse signals, controllable gates of the DC-DC converter; and charging and discharging the battery based on the switching;

receiving an enable signal for a standalone mode of operation of the multilevel cascaded H-bridge inverter, wherein the DC-DC converter is a buck-chopper converter including an IGBT switch having a controllable gate;

monitoring, by a maximum power point tracker circuit, MPPT, the current and voltage values generated by the photovoltaic array;

comparing, by the MPPT, the voltage and current values to voltage and current reference values and generating a charging current control signal based on the comparison;

receiving, by a state of charge, SOC calculator, the battery current and voltage values;

integrating, by the SOC calculator, the current and voltage measurements;

generating, by the SOC calculator, a state of charge signal based on the integrating;

receiving, by a current reference generator, the charging current control signal and the state of charge signal;

comparing, by the current reference generator, the charging current control signal and the state of charge signal;

generating, by the current reference generator, a battery charging current reference based on the minimum of the charging current control signal and the state of charge signal;

receiving, by a current controller, a battery actual current and the battery charging current reference and generating a gate pulse to the controllable gate of the DC-DC converter to either charge the battery or discharge the battery.

13. The non-transitory computer readable medium of claim 12, further comprising:

receiving, from a user input at a user interface, an enable signal for a grid-connected mode of operation of the multilevel cascaded H-bridge inverter, wherein each DC-DC converter is a bi-directional converter including two IGBT switches, each having a controllable gate;

monitoring, by a maximum power point tracker, MPPT, voltage and current signals from each photovoltaic array and generating power reference signals;

monitoring a grid voltage, by a first phase locked loop, PLL, and calculating phase angles;

generating, by an inverter current monitor, actual inverter current signals;

receiving, by a current reference calculator, the power reference signals and the phase angles and generating inverter current reference signals;

comparing, by a first comparator, the actual inverter current signals to the inverter current reference signals and generating current error signals;

integrating, by a first proportional integral controller, the current error signals and generating current modulating signals;

integrating, by first proportional integral controller, the current error signals and generating current modulating signals;

receiving, at a second enable input, a standalone mode signal from one of a user interface and the MPPT;

monitoring grid voltages, by a second phase locked loop including a memory, and calculating phase angles, storing a current phase angle and generating a current phase angle signal;

generating, by an inverter voltage monitor, actual inverter voltage signals;

receiving, by an oscillator, the current phase angle and generating a next phase angle signal;

receiving, by a reference generator, the next phase angle signal and generating an inverter voltage reference signal;

comparing, by a second comparator, the actual inverter voltage signals to the inverter voltage reference signals and generating voltage error signals;

integrating, by a second proportional integral controller, the voltage error signals and generating voltage modulating signals;

monitoring, by a healthy H-bridge monitor, each H-bridge inverter of the multilevel cascaded H-bridge inverter, and calculating a number of healthy blocks and generating a number of healthy H-bridges signal;

receiving, by a gate pulse generator module, the current modulating signals, the voltage modulating signals and the number of healthy H-bridges signal, and generating carrier waves, comparing the carrier waves to the modulating signals, and generating gate pulses to the cascaded H-bridge inverters.

14. The non-transitory computer readable medium of claim 13, further comprising:

monitoring, by the first phase locked loop, grid voltages and phase angles;

comparing, by the current reference generator, the grid voltages and phase angles to reference grid voltages and phase angles;

generating, by the computing system, a grid fault signal when the grid voltages and phase angles do not equal the reference grid voltages and phase angles;

providing, by the computing system, a standalone mode enable signal based on the grid fault signal;

receiving a first gate pulse signal at a first IGBT controllable gate of each bi-directional converter;

charging the battery based on the first gate pulse signal;

receiving a second gate pulse signal at a second IGBT controllable gate of each bi-directional converter;

discharging the battery based on the second gate pulse signal.

* * * * *